(12) United States Patent
Watanabe et al.

(10) Patent No.: US 11,754,875 B2
(45) Date of Patent: Sep. 12, 2023

(54) LIQUID CRYSTAL DISPLAY PANEL AND 3D DISPLAY DEVICE

(71) Applicant: Sharp Kabushiki Kaisha, Sakai (JP)

(72) Inventors: Kouichi Watanabe, Sakai (JP);
Shinichi Terashita, Sakai (JP);
Fumikazu Shimoshikiryoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/722,437

(22) Filed: Apr. 18, 2022

(65) Prior Publication Data
US 2022/0373839 A1    Nov. 24, 2022

(30) Foreign Application Priority Data

May 14, 2021   (JP) .................. 2021-082563
Feb. 18, 2022  (JP) .................. 2022-024034

(51) Int. Cl.
| | | |
|---|---|---|
| G02F 1/1335 | (2006.01) | |
| G02F 1/1343 | (2006.01) | |
| G02B 30/52 | (2020.01) | |
| G02F 1/1337 | (2006.01) | |

(52) U.S. Cl.
CPC ....... *G02F 1/133531* (2021.01); *G02B 30/52* (2020.01); *G02F 1/133512* (2013.01); *G02F 1/133746* (2021.01); *G02F 1/134336* (2013.01)

(58) Field of Classification Search
None
See application file for complete search history.

(56) References Cited

U.S. PATENT DOCUMENTS

| | | | |
|---|---|---|---|
| 2004/0125297 A1* | 7/2004 | Lee | G02F 1/133707 349/129 |
| 2007/0139584 A1* | 6/2007 | Jin | G02F 1/1323 349/74 |
| 2013/0208216 A1* | 8/2013 | Hayano | G02F 1/133753 349/96 |

(Continued)

FOREIGN PATENT DOCUMENTS

| | | | |
|---|---|---|---|
| JP | 2008058606 A | * | 3/2008 |
| JP | 2011-53345 A | | 3/2011 |

(Continued)

*Primary Examiner* — Shan Liu
(74) *Attorney, Agent, or Firm* — KEATING & BENNETT, LLP

(57) ABSTRACT

The liquid crystal display panel sequentially includes: a first polarizing plate; a first substrate; a first alignment film; a liquid crystal layer containing liquid crystal molecules; a second alignment film; a second substrate; and a second polarizing plate. The liquid crystal display panel is a normally black liquid crystal display panel capable of shifting into a transparent display state. The first alignment film and the second alignment film have been subjected to alignment treatment such that a first domain and a second domain in which alignment vectors are different from each other are arranged side by side in a column direction. In a plan view, a liquid crystal alignment axis of the first domain and a liquid crystal alignment axis of the second domain obliquely intersect a polarization axis of the first polarizing plate and a polarization axis of the second polarizing plate and are parallel to each other.

24 Claims, 53 Drawing Sheets

(56) References Cited

U.S. PATENT DOCUMENTS

| | | | |
|---|---|---|---|
| 2016/0106231 A1* | 4/2016 | Dunn | A47F 3/001 345/87 |
| 2017/0097513 A1 | 4/2017 | Bell et al. | |
| 2017/0103716 A1* | 4/2017 | Kita | A47F 3/001 |
| 2017/0115527 A1* | 4/2017 | Kita | G02F 1/1347 |
| 2019/0121151 A1 | 4/2019 | Bell et al. | |
| 2019/0302538 A1* | 10/2019 | Shimoshikiryoh | G02F 1/134309 |
| 2021/0012725 A1 | 1/2021 | Ozaki | |

FOREIGN PATENT DOCUMENTS

| | | |
|---|---|---|
| JP | 2019-502962 A | 1/2019 |
| JP | 2021-15154 A | 2/2021 |
| WO | 2015/190461 A1 | 12/2015 |

* cited by examiner

FIG.6

| | Horizontal alignment (horizontal electric field) mode (Positive liquid crystal) | Horizontal alignment (horizontal electric field) mode (Negative liquid crystal) | Vertical alignment (vertical electric field) mode |
|---|---|---|---|
| With no voltage applied | 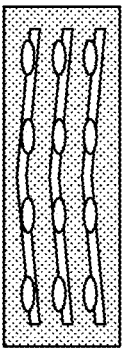<br>Transmission image: Not blurred | 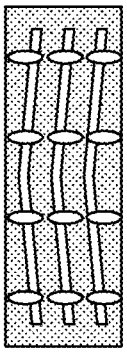<br>Transmission image: Not blurred | 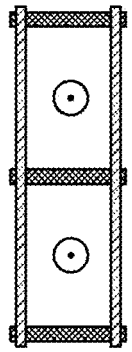<br>Transmission image: Not blurred |
| With voltage applied | 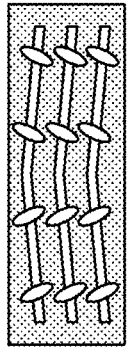<br>Transmission image: Blurred | 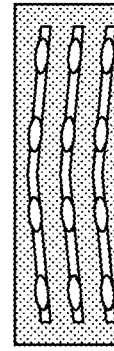<br>Transmission image: Blurred | 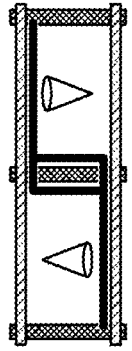<br>Transmission image: Not blurred |

FIG.7

|  | Normally black (NB) | Normally white (NW) |
|---|---|---|
| White luminance (cd/m$^2$) | 720 | 840 |
| Black luminance (cd/m$^2$) | 0.1644 | 79.91 |
| NTSCxy ratio | 71.39% | 43.76% |
| Contrast ratio | 4380 | 11 |
| Degree of transparency of image in see-through mode | Poor | Good |
| Increase in size and reduction in cost | Average<br>Size restriction of polarizing plate (difficult with 120-inch or larger plate) | Good |

FIG.8

| Alignment mode | | 1D | 2D-ECB/parallel alignment | 2D-ECB/mountain-shaped alignment | 4D-RTN |
|---|---|---|---|---|---|
| Top: Polarization axis, viewing angle characteristics Center: Alignment diagram Bottom: Incident polarization axis | | Horizontally symmetrical Vertically asymmetrical | Horizontally symmetrical Vertically symmetrical | Horizontally symmetrical Vertically asymmetrical | Horizontally symmetrical Vertically symmetrical |
| Refractive index in-plane distribution | Liquid crystal alignment axis | Horizontal | Constant | Constant | Periodically changed | Periodically changed |
| | | Vertical | Constant | Constant | Constant | Periodically changed |
| | Refractive index | Horizontal | Narrow | Narrow | Narrow | Wide |
| | | Vertical | Narrow | Narrow | Narrow | Wide |
| Blurriness | | | Good | Good | Average(Two images) | Poor(Four images) |

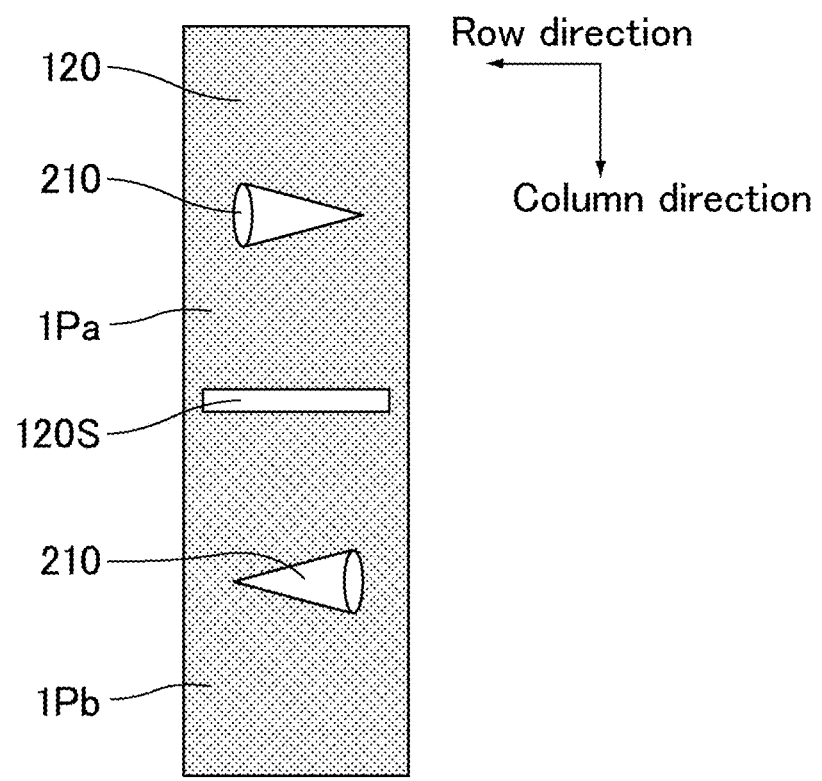

FIG.12

| Alignment mode | 2D-ECB/ normally facing | 2D-ECB/ oppositely facing |
|---|---|---|
| Alignment diagram UV2AII exposure Polarization axis | | |
| Liquid crystal alignment axis — Horizontal | Constant | Constant |
| Liquid crystal alignment axis — Vertical | Constant | Constant |
| Refractive index in-plane distribution — Horizontal | Narrow | Narrow |
| Refractive index in-plane distribution — Vertical | Narrow | Narrow |
| Blurriness | Good | Good |

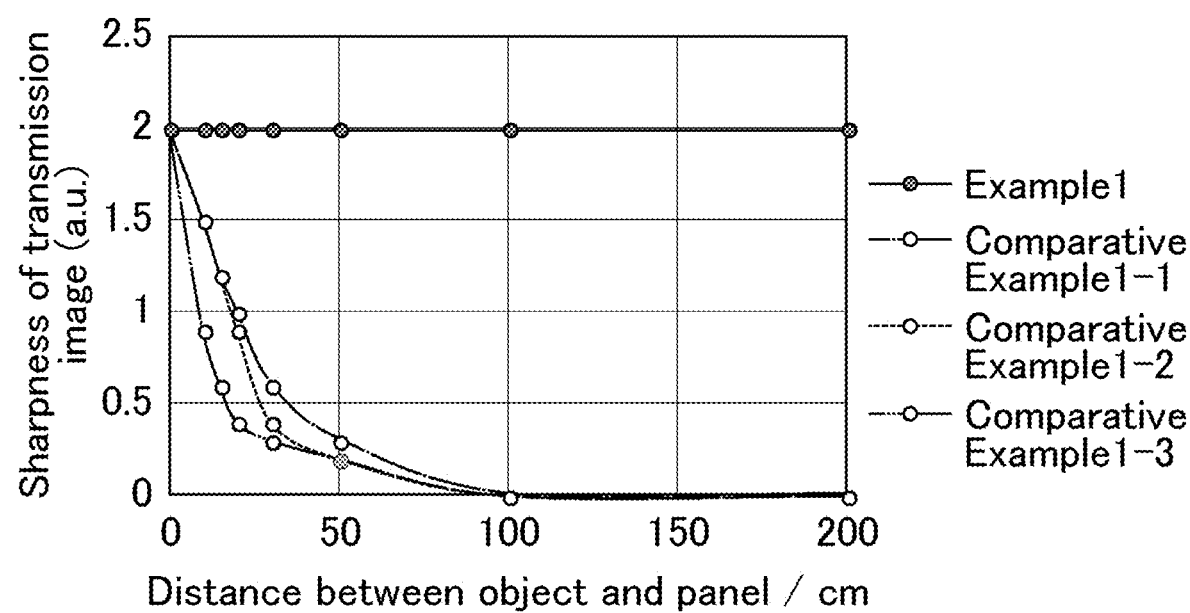

FIG.20

| Cell | Example2-1 | Example2-2 | Example1 | Comparative Example1-1 |
|---|---|---|---|---|
| Alignment mode | 2D-ECB normally facing | 2D-ECB oppositely facing | 2D-ECB horizontally parallel | 2D-ECB mountain-shaped |
| Polarizing plate | ↙10Xa ↙10Xb | ↗10Xa ↘10Xb | ↙10Xb ↙10Xa | ↙10Xb ↘10Xa |
| Number of liquid crystal alignment axes | 1 | 1 | 1 | 2 |
| Alignment image (with no slit) | | | | |
| Arrows indicate liquid crystal alignment directions | 1Pa, 210, 1Pb, 210Xa, 210Xb | 1Pa, 210, 1Pb, 210Xa, 210Xb | 1Pa, 210, 1Pb, 210Xa, 210Xb | 1Pa, 210, 1Pb, 210Xa, 210Xb |

FIG.23
Example1
Tilt 88.6 degrees
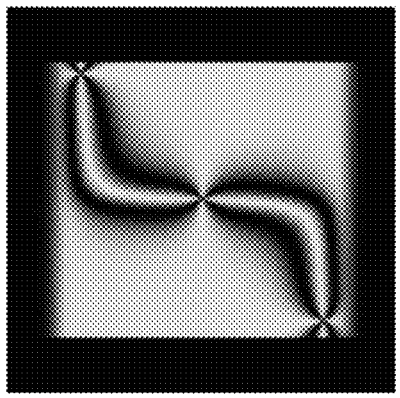
Example3-1
Tilt 85.0 degrees
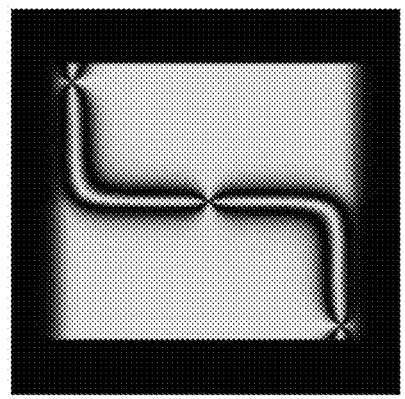
FIG.24
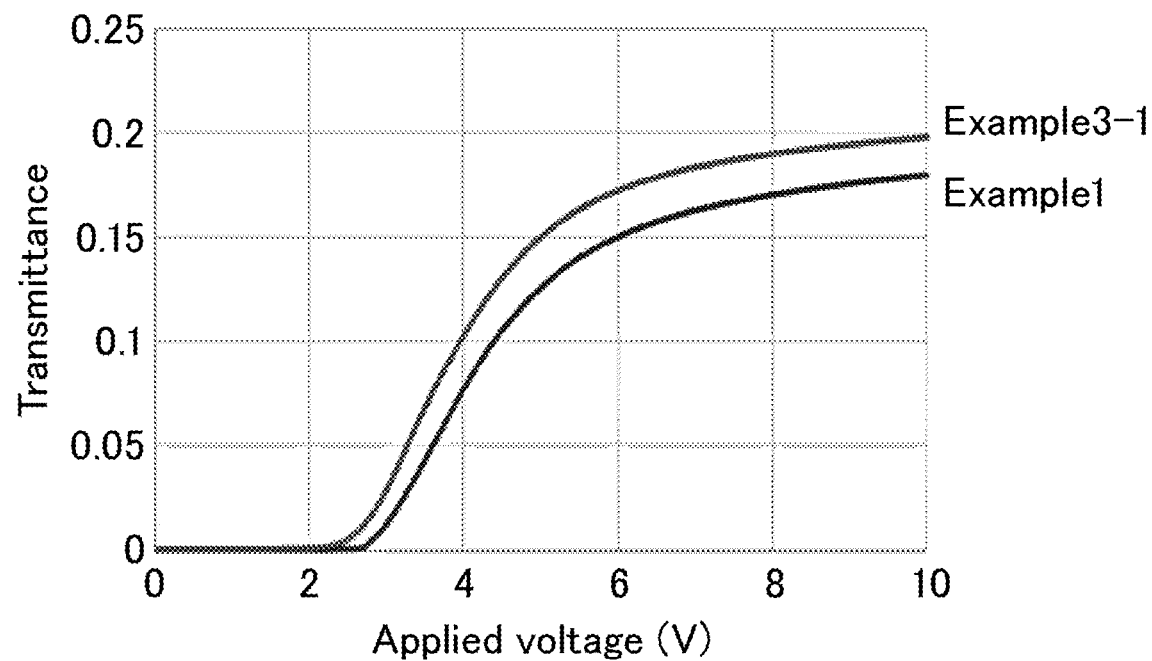

FIG.40
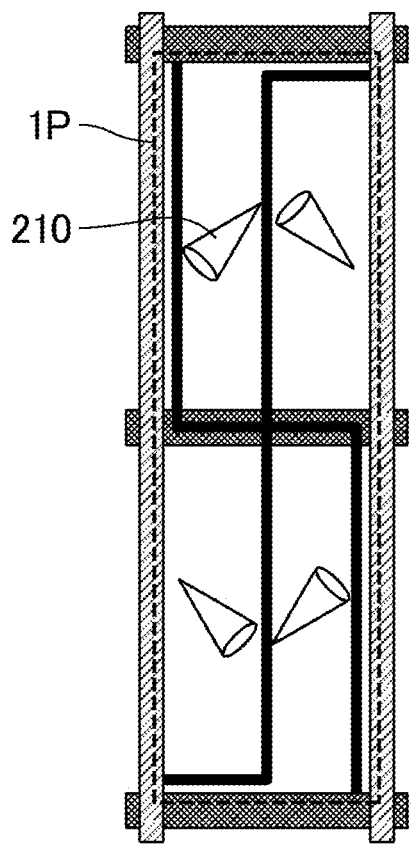
1P
210
FIG.41
(Back surface side) (Viewing surface side)
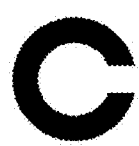
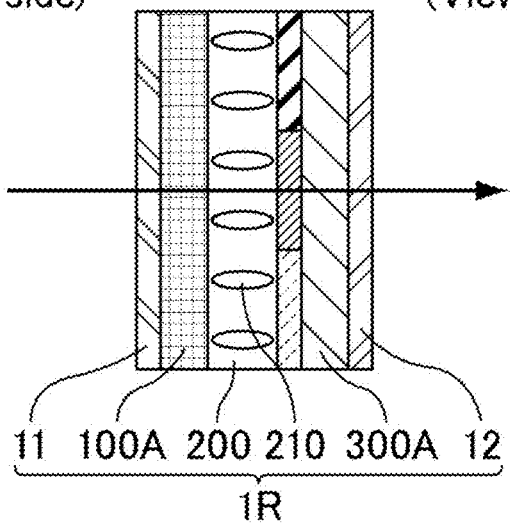
11 100A 200 210 300A 12
1R
Actual display state (Back surface side)   (Viewing surface side)

Actual display state

FIG.52
Polarizing plate absorption axis 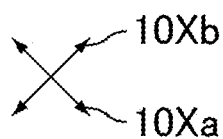
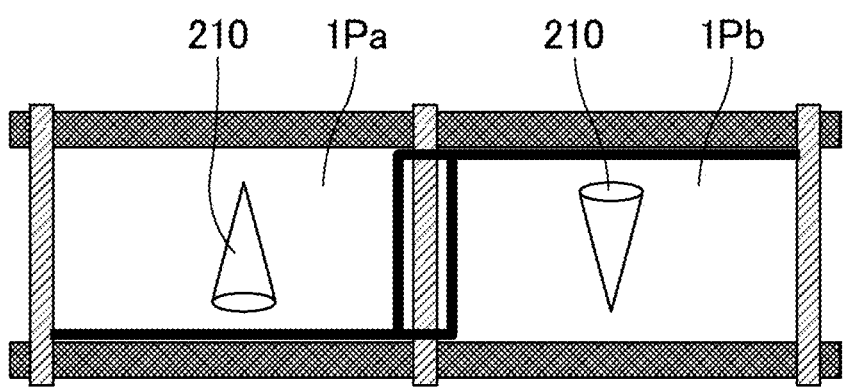
Enlarged pixel alignment diagram
Incident polarization axis
Refractive index distribution diagram
FIG.53
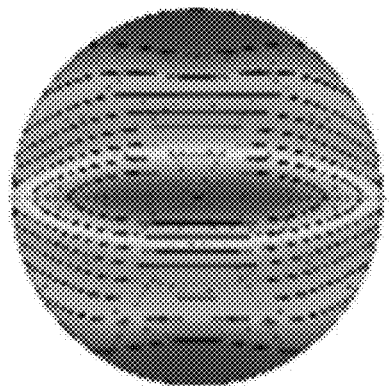
○ Horizontally symmetrical
○ Vertically symmetrical FIG.54
Polarizing plate absorption axis
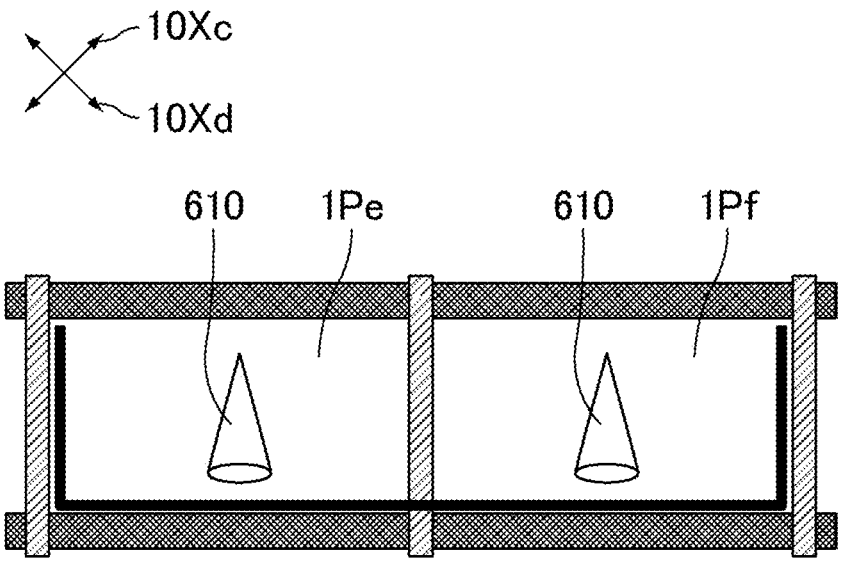
Enlarged pixel alignment diagram
Incident polarization axis Refractive index distribution diagram
FIG.55
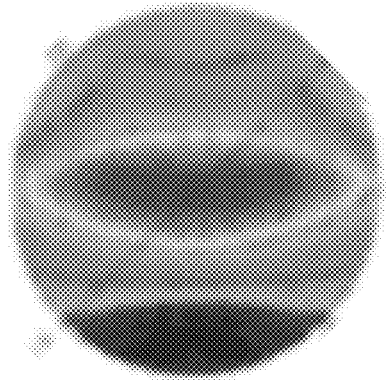
○ Horizontally symmetrical
× Vertically asymmetrical

FIG.56
Polarizing plate absorption axis
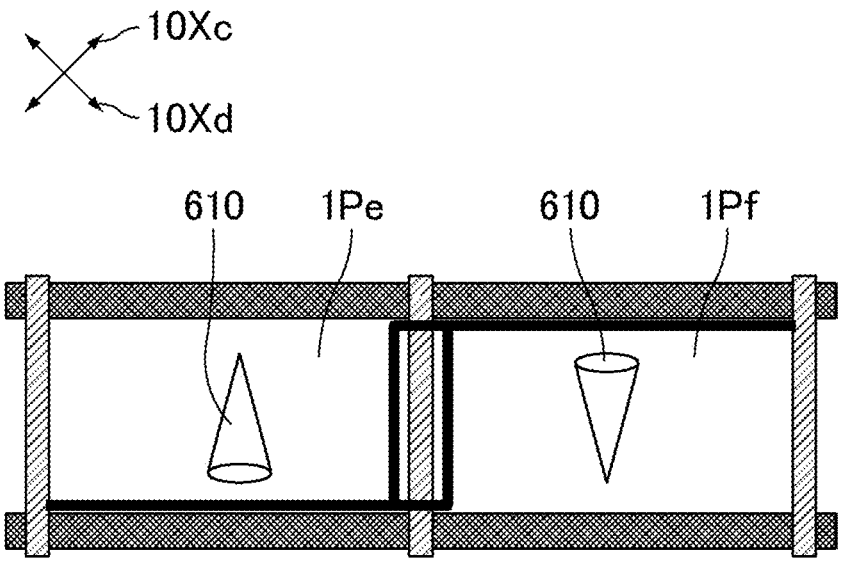
Enlarged pixel alignment diagram
Incident polarization axis
Refractive index distribution diagram
FIG.57
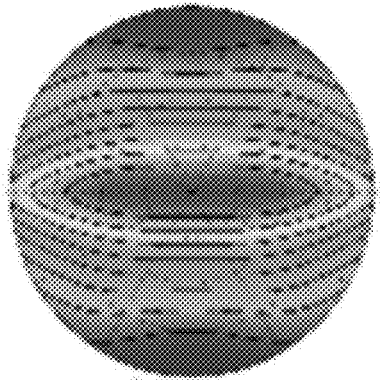
○ Horizontally symmetrical
○ Vertically symmetrical

FIG.58
Polarizing plate absorption axis
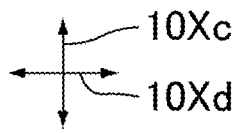
Enlarged pixel alignment diagram
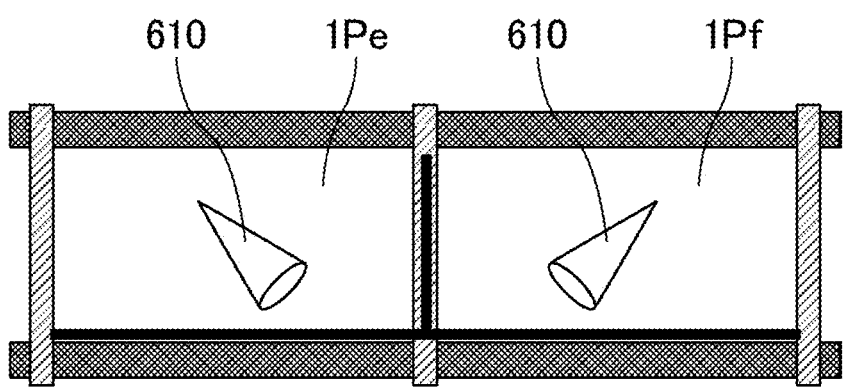
Incident polarization axis Refractive index distribution diagram
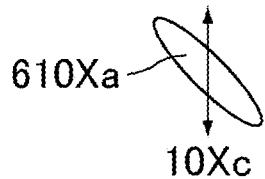 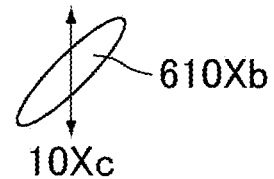
FIG.59
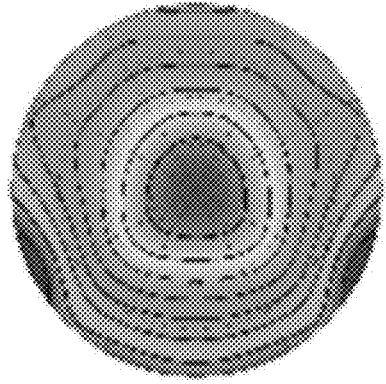
○ Horizontally symmetrical
× Vertically asymmetrical FIG.60
Polarizing plate absorption axis 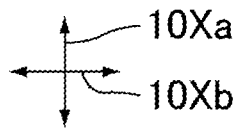
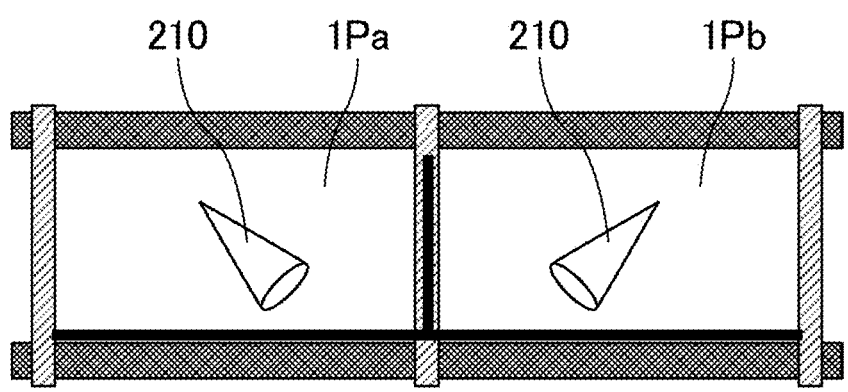
Enlarged pixel alignment diagram
Incident polarization axis
Refractive index distribution diagram
FIG.61
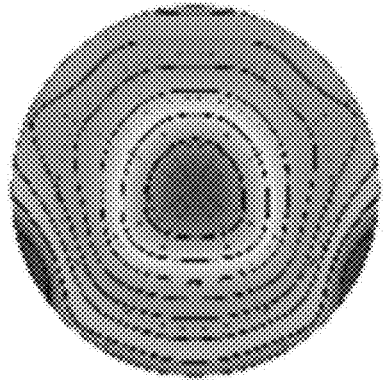
○ Horizontally symmetrical
× Vertically asymmetrical

FIG.62
Polarizing plate absorption axis 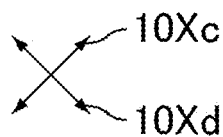
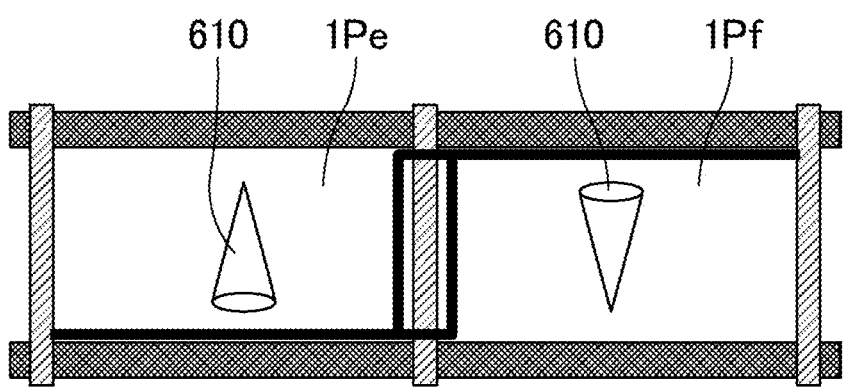
Enlarged pixel alignment diagram
Incident polarization axis
Refractive index distribution diagram
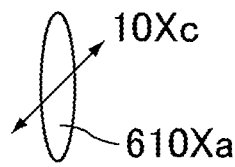 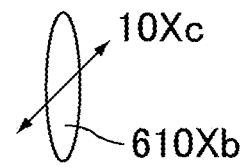
FIG.63
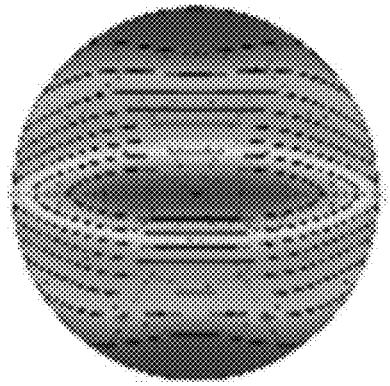
○ Horizontally symmetrical
○ Vertically symmetrical FIG.64
Polarizing plate absorption axis 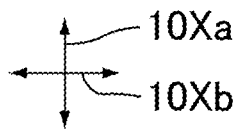
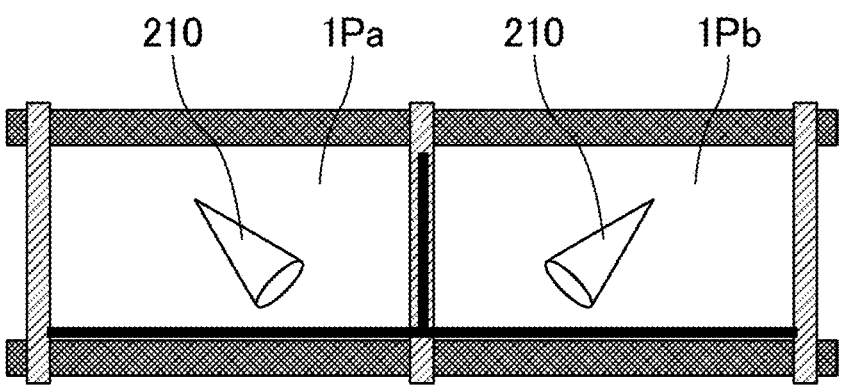
Enlarged pixel alignment diagram
Incident polarization axis
Refractive index distribution diagram
FIG.65
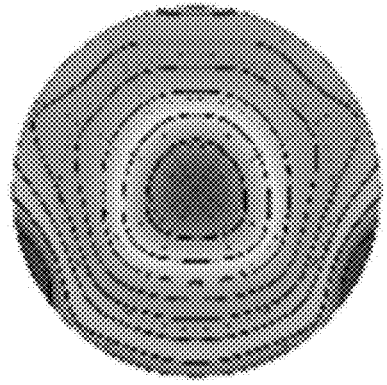
○ Horizontally symmetrical
× Vertically asymmetrical FIG.66
Polarizing plate absorption axis
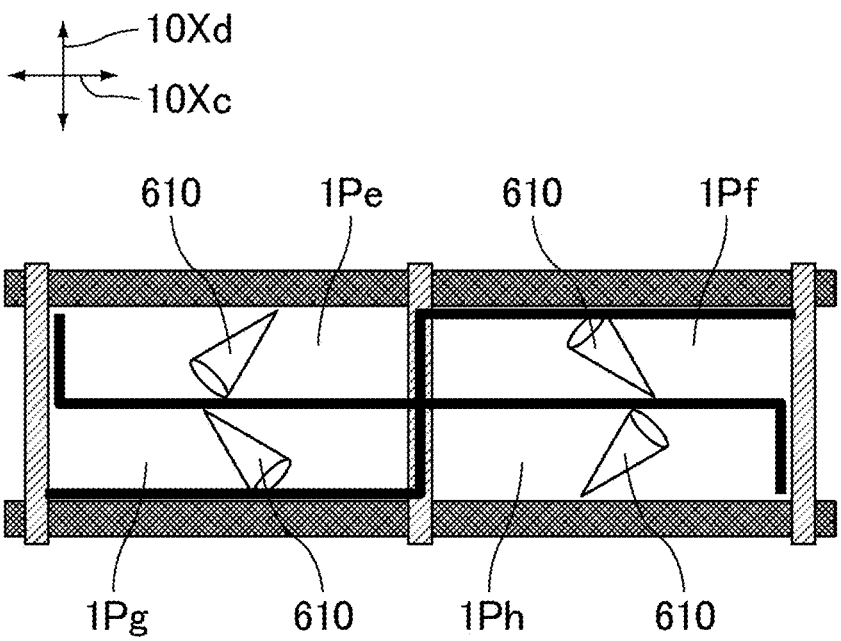
Enlarged pixel alignment diagram
Incident polarization axis
Refractive index distribution diagram
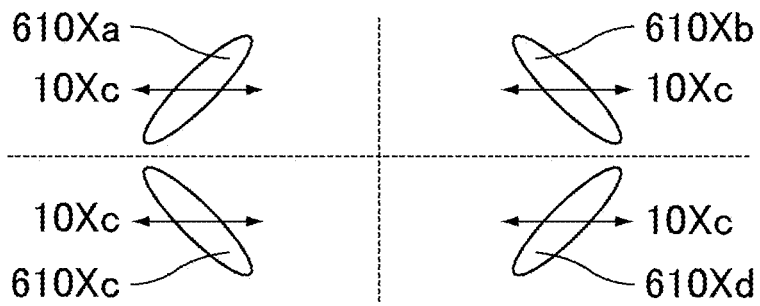
FIG.67
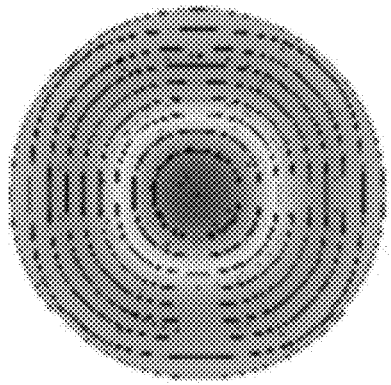
○ Horizontally symmetrical
○ Vertically symmetrical FIG.68
Polarizing plate absorption axis 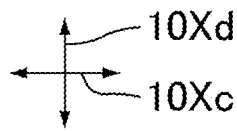
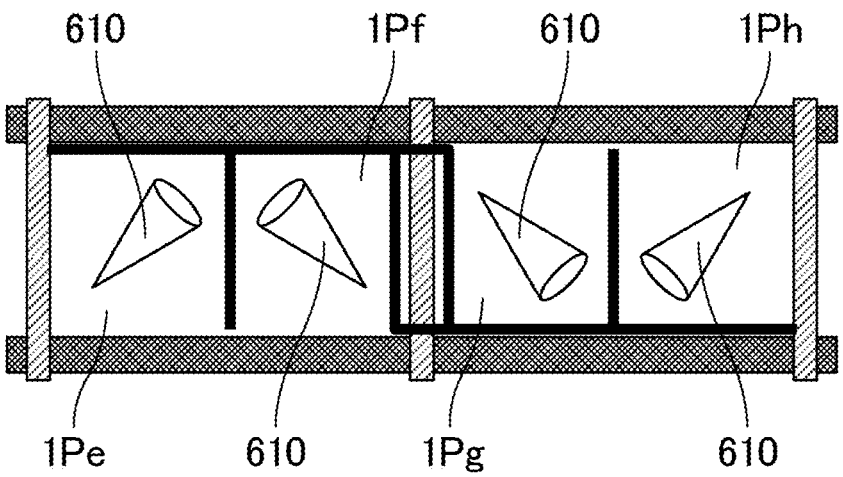
Enlarged pixel alignment diagram
Incident polarization axis Refractive index distribution diagram
FIG.69
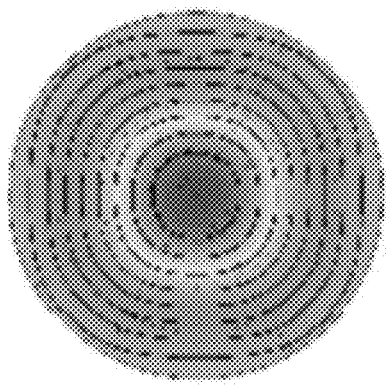
○ Horizontally symmetrical
○ Vertically symmetrical FIG.70
Polarizing plate absorption axis
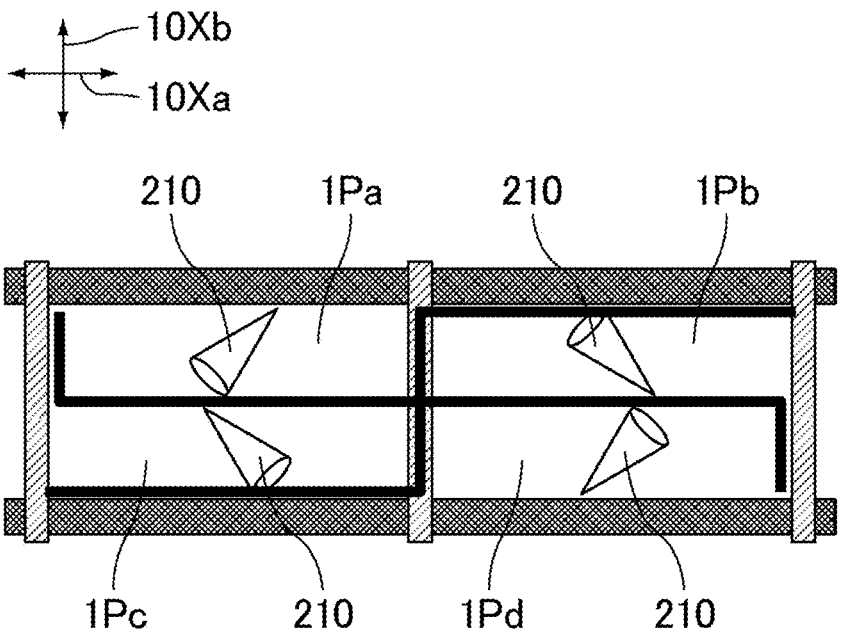
Enlarged pixel alignment diagram
Incident polarization axis
Refractive index distribution diagram
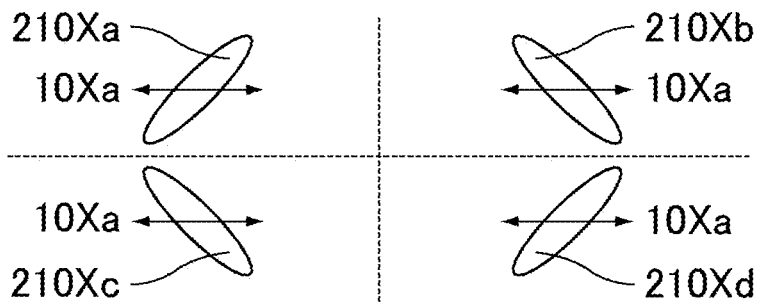
FIG.71
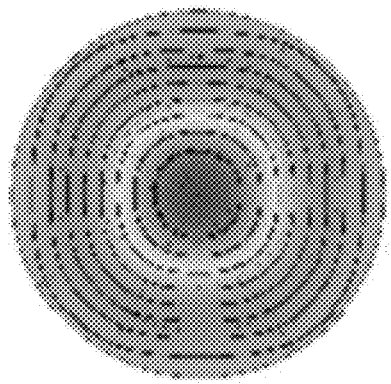
○ Horizontally symmetrical
○ Vertically symmetrical

FIG.72
Polarizing plate absorption axis
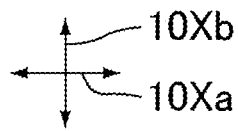
Enlarged pixel alignment diagram
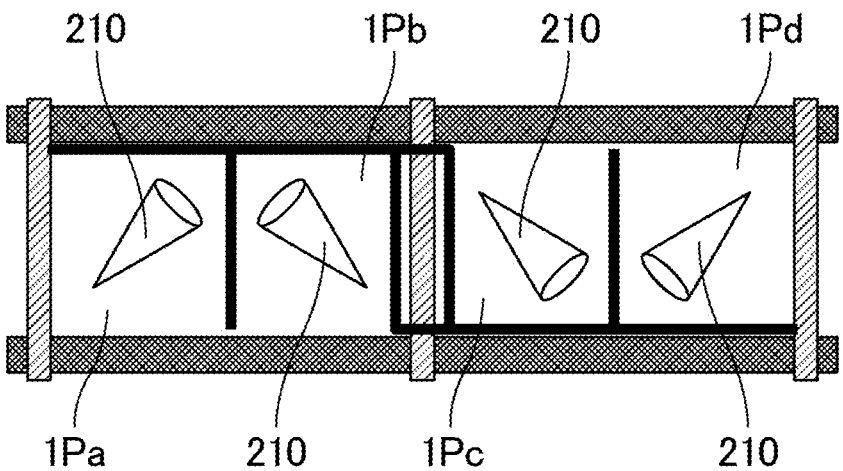
Incident polarization axis Refractive index distribution diagram
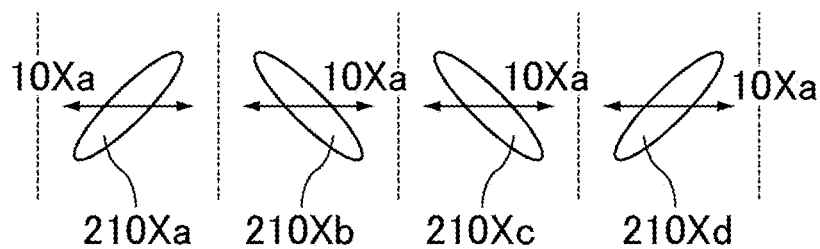
FIG.73
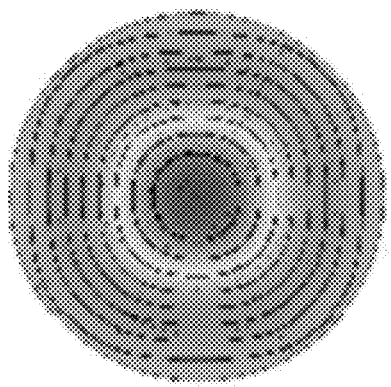
○ Horizontally symmetrical
○ Vertically symmetrical FIG.74
Polarizing plate
absorption axis
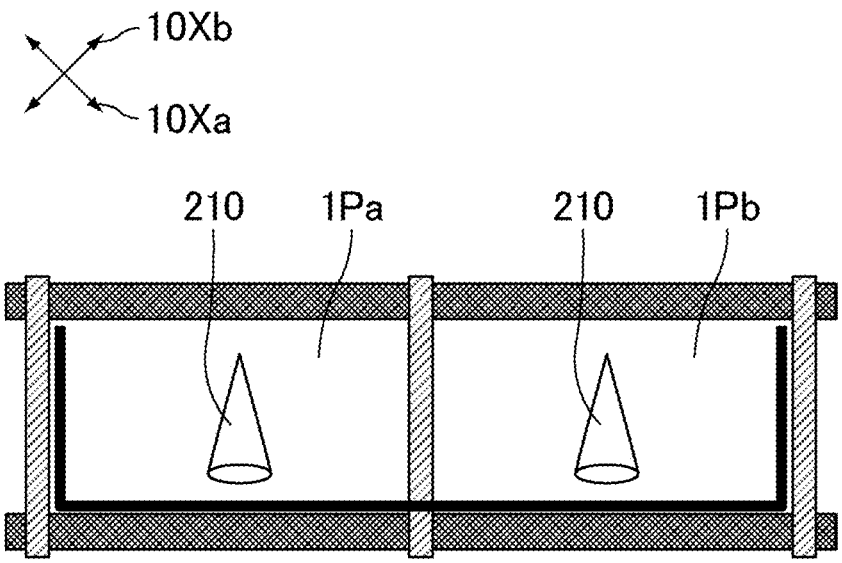
Enlarged pixel
alignment
diagram
Incident
polarization axis
Refractive index
distribution
diagram
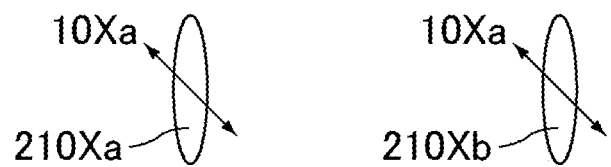
FIG.75
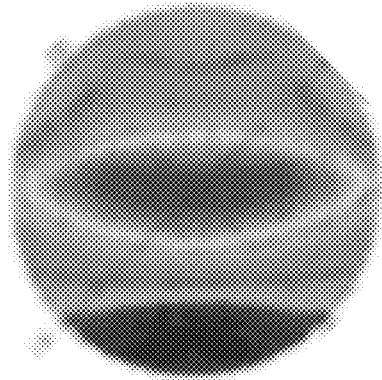
○ Horizontally symmetrical
× Vertically asymmetrical

LIQUID CRYSTAL DISPLAY PANEL AND 3D DISPLAY DEVICE

CROSS-REFERENCE TO RELATED APPLICATIONS

The present application claims priority under 35 U.S.C. § 119 to Japanese Patent Application No. 2021-082563 filed on May 14, 2021 and Japanese Patent Application No. 2022-024034 filed on Feb. 18, 2022, the contents of which are incorporated herein by reference in their entirety.

BACKGROUND OF THE INVENTION

Field of the Invention

The disclosure relates to liquid crystal display panels and 3D display devices.

Description of Related Art

FIG. 38 is a schematic cross-sectional view of a typical liquid crystal display device. A liquid crystal display device utilizes a liquid crystal composition to display an image. A typical display method thereof includes, as shown in FIG. 38, irradiating a liquid crystal display panel 1R including a liquid crystal composition sealed between a thin film transistor (TFT) substrate 100A and a color filter (CF) substrate 300A with light from a backlight 3A, and applying voltage to the liquid crystal composition to change the alignment of liquid crystal molecules, thus controlling the amount of light passing through the liquid crystal display panel 1R. The typical liquid crystal display device 1000A in FIG. 38 mainly includes the liquid crystal display panel 1R that controls passing of light (light transmission) and blocking of light in each pixel and a light source (backlight 3A) on the back surface of the liquid crystal display panel 1R. An object (e.g., the chair in FIG. 38) on the back surface side of the backlight 3A is not seen from the viewing surface side.

See-through displays configured to be capable of running in a transparent display state (see-through display state) where the background can be seen through the display device have been used as display devices for information display or digital signage.

FIG. 39 is a schematic cross-sectional view of a see-through display. A see-through display 1000R in FIG. 39 lacks the backlight 3A unlike the typical liquid crystal display device 1000A and, as shown in FIG. 39, for example, irradiates the liquid crystal display panel 1R placed in a see-through display box 2A with light from light sources (e.g., light emitting diodes (LEDs) 3B) on the sides. The see-through display box 2A inside which light from the light sources is scattered and reflected functions as a backlight. Also, there is nothing that obstructs the vision on the back surface side of the liquid crystal display panel 1R, so that an image displayed on the liquid crystal display panel 1R and the background (e.g., the chair in FIG. 39) can be observed at the same time.

Since see-through displays allow the background, i.e., the back surface side of the display panel, to be seen therethrough as described above, the displays can show information overlaid with the background on their display panel. See-through displays therefore can provide new display which had not been provided by conventional display devices.

A technique relating to see-through displays is disclosed in WO 2015/190461 A, for example. WO 2015/190461 A discloses a display device including: a display panel capable of being in a transparent display state where a background scene is viewable through the display panel; a panel light source that irradiates the display panel with colored light of a plurality of colors in a time division manner; a rear side light source placed on a rear surface side of the display panel, the rear side light source being capable of emitting colored light of a plurality of colors in a time division manner; and a control circuit that controls emission timings of the colored light from the panel light source and from the rear side light source, wherein the panel light source and the rear side light source are synchronized by the control circuit such that colored light of different colors are not emitted at a same timing.

JP 2021-15154 A discloses a display device including: a display panel to which a plurality of line images are written; and an RGB light source configured to irradiate the display panel with light, wherein a display period of a frame image includes six subframe periods SFL1 to SFL6, the line image of a color component corresponding to a combination of light rays emitted during two consecutive subframe periods is written during the writing period of the preceding subframe period of the two consecutive subframe periods, and the subframe periods SFL1, SFL3, and SFL5 including writing periods SFL11, SFL31, and SFL51 during which the line image is written to a first pixel row and the subframe periods SFL2, SFL4, and SFL6 including writing periods SFL21, SFL41, and SFL61 during which the line image is written to a second pixel row adjacent to the first pixel row are provided alternately and consecutively.

Meanwhile, techniques for displaying a 3D image on a see-through display have drawn attention. A technique relating to a 3D image is disclosed in, for example, JP 2019-502962 T. JP 2019-502962 T discloses a multi-display system (e.g., a display including multiple display panels) including at least a first display and a second display (e.g., display panels or display layers) substantially parallel to each other such that three-dimensional (3D) features are shown to the viewer. The first and second displays have different color filter patterns as viewed from the viewpoint of the viewer of the display device in order to reduce moiré interference.

JP 2011-053345 A discloses a technique of displaying a stereoscopic image using the depth-fused 3D (DFD) visual illusion by displaying two stereoscopic source images having different brightness values with these two stereoscopic source images superimposed with each other.

BRIEF SUMMARY OF THE INVENTION

FIG. 40 is a schematic plan view of the tilt azimuths of liquid crystal molecules in a 4D-RTN mode liquid crystal display panel. Alignment division techniques having been studied include a technique of dividing each single pixel into multiple alignment regions (domains) and aligning the liquid crystal molecules at different azimuths in different alignment regions to improve the viewing angle characteristics. The alignment of a pixel is divided by, for example, a method that divides each single pixel 1P into four alignment regions of 2 rows×2 columns. Four domain-reverse twisted nematic (4D-RTN) modes have been examined in which the liquid crystal alignment is divided into four domains (a square or rectangle with a cross inside) as shown in FIG. 40. FIG. 40 shows the liquid crystal molecules 210 as pins (circular cones) for easy understanding of the tilt azimuths of the liquid crystal molecules 210. The bottom surface of a circular cone indicates the viewer's side and the vertex of the circular cone indicates the back surface side.

FIG. 41 shows the liquid crystal alignment in a 4D-RTN mode normally white liquid crystal display panel and a transmission image. FIG. 42 is a schematic view of the relationship between the liquid crystal alignment axis and the polarization axes in the 4D-RTN mode normally white liquid crystal display panel. The present inventors examined a 4D-RTN mode normally white liquid crystal display panel 1R shown in FIG. 40 and FIG. 41 in order to improve the viewing angle characteristics of a see-through display. The 4D-RTN mode normally white liquid crystal display panel 1R includes, sequentially from the back surface side toward the viewing surface side, a first polarizing plate 11, a TFT substrate 100A, a liquid crystal layer 200 containing liquid crystal molecules 210, a CF substrate 300A, and a second polarizing plate 12. The polarization axis of the first polarizing plate 11 and the polarization axis of the second polarizing plate 12 were parallel to each other.

As a result of examination of the transmission image in the transparent display state (white display state) of the liquid crystal display panel 1R in FIG. 41, a clear transmission image was observed as shown in FIG. 41. In a normally white liquid crystal display panel, liquid crystal molecules are aligned almost vertically with no voltage applied to provide the transparent display state. Thus, as shown in FIG. 42, there is only one liquid crystal alignment axis 210X for the liquid crystal molecules 210 (only one azimuth angle on which the refractive index is dependent) relative to polarization axes 10X of the polarizing plates, so that the transmission image is not blurred. The contrast ratio, however, was as low as about 10.

FIG. 43 shows the liquid crystal alignment in a 4D-RTN mode normally black liquid crystal display panel and a transmission image. FIG. 44 is a schematic view of the relationship between the liquid crystal alignment axis and the polarization axes in the 4D-RTN mode normally black liquid crystal display panel. The present inventors examined a 4D-RTN mode normally black liquid crystal display panel 1R. In the 4D-RTN mode normally black liquid crystal display panel 1R, the polarization axis of the first polarizing plate 11 and the polarization axis of the second polarizing plate 12 were perpendicular to each other.

As a result of examination of the transmission image in the transparent display state of the liquid crystal display panel 1R in FIG. 43, the transmission image appeared unclear as multiple images of the transmission image were observed as shown in FIG. 43. This is presumably caused by the divided alignment in each single pixel. In the 4D-RTN mode normally black liquid crystal display panel 1R, as shown in FIG. 44, the liquid crystal alignment axis 210X of the liquid crystal molecules 210 periodically changes relative to the polarization axes 10X of the polarizing plates with voltage applied to provide the transparent display state. This causes division (splitting) of the light. Also, the light spreads under the lens effect attributed to the distribution of the refractive index in the plane of the liquid crystal layer 200. These factors split the transmission image into four images in white display with voltage applied as shown in FIG. 43 in the 4D-RTN mode normally black liquid crystal display panel 1R, blurring the transmission image. In other words, refraction caused by the transmittance distribution and the phase distribution blurs the transmission image. Meanwhile, the contrast ratio was as high as 3000 or higher as the display panel is a normally black one.

WO 2015/190461 A, JP 2021-15154 A, JP 2019-502962 T, and JP 2011-053345 A mention nothing about techniques of reducing a decrease in contrast ratio, improving the viewing angle characteristics, and preventing or reducing blurriness of a transmission image through a see-through display.

In response to the above issues, an object of the present invention is to provide a liquid crystal display panel capable of providing see-through display, reducing a decrease in contrast ratio, improving the viewing angle characteristics, and preventing or reducing blurriness of a transmission image in a transparent display state, and a 3D display device including the liquid crystal display panel.

(1) One embodiment of the present invention is directed to a liquid crystal display panel sequentially including: a first polarizing plate; a first substrate including pixel electrodes arranged in a matrix pattern in a row direction and a column direction; a first alignment film; a liquid crystal layer containing liquid crystal molecules; a second alignment film; a second substrate including a common electrode; and a second polarizing plate, the liquid crystal display panel being a normally black liquid crystal display panel capable of shifting into a transparent display state where a background is seen through the liquid crystal display panel, wherein the first alignment film and the second alignment film have been subjected to alignment treatment such that a first domain and a second domain in which alignment vectors are different from each other are arranged side by side in a column direction, where each of the alignment vectors is defined to point from a first substrate side long-axis end of each of the liquid crystal molecules as a start point to a second substrate side long-axis end of the liquid crystal molecule as an end point, and in a plan view of the first domain and the second domain, a liquid crystal alignment axis of the first domain and a liquid crystal alignment axis of the second domain obliquely intersect a polarization axis of the first polarizing plate and a polarization axis of the second polarizing plate and are parallel to each other.

(2) In an embodiment of the present invention, the liquid crystal display panel includes the structure (1), and the liquid crystal alignment axis of the first domain and the liquid crystal alignment axis of the second domain are parallel to the row direction.

(3) In an embodiment of the present invention, the liquid crystal display panel includes the structure (2), and each of the pixel electrodes is provided with a slit having a width of more than 0 μm and 4.5 μm or less in a boundary between the first domain and the second domain.

(4) In an embodiment of the present invention, the liquid crystal display panel includes the structure (1), and the liquid crystal alignment axis of the first domain and the liquid crystal alignment axis of the second domain are oblique to the row direction.

(5) In an embodiment of the present invention, the liquid crystal display panel includes the structure (4), in a plan view of the first domain and the second domain, the start point of the alignment vector of the first domain and the start point of the alignment vector of the second domain oppose each other, and each of the pixel electrodes is provided with a slit having a width of 3 μm or more and 5 μm or less in a boundary between the first domain and the second domain.

(6) In an embodiment of the present invention, the liquid crystal display panel includes the structure (1), (2), (3), (4), or (5), and the liquid crystal molecules have a pre-tilt angle of 81° or more and 89° or less.

(7) In an embodiment of the present invention, the liquid crystal display panel includes the structure (1), (2), (3), (4), (5), or (6), and further includes a light shielding member in a boundary between the first domain and the second domain.

(8) Another embodiment of the present invention is directed to a 3D display device including: the liquid crystal display panel according to (1), (2), (3), (4), (5), (6), or (7); and a back surface side liquid crystal display panel at the back of the liquid crystal display panel, the liquid crystal display panel sequentially including, from the back surface side toward the viewing surface side, the first polarizing plate, the liquid crystal layer, and the second polarizing plate, the back surface side liquid crystal display panel sequentially including, from the back surface side toward the viewing surface side, a third polarizing plate, a back surface side liquid crystal layer, and a fourth polarizing plate, wherein in a plan view, a polarization axis of the first polarizing plate and a polarization axis of the fourth polarizing plate are parallel to each other.

(9) In an embodiment of the present invention, the 3D display device includes the structure (8), and a distance between the liquid crystal display panel and the back surface side liquid crystal display panel is 5 cm or longer.

(10) In an embodiment of the present invention, the 3D display panel includes the structure (8) or (9), and further includes a light source including light-emitting elements that irradiate the liquid crystal display panel with light and emit light rays of different colors, wherein the liquid crystal display panel displays an image based on a field-sequential color system.

The present invention can provide a liquid crystal display panel capable of providing see-through display, reducing a decrease in contrast ratio, improving the viewing angle characteristics, and preventing or reducing blurriness of a transmission image in a transparent display state, and a 3D display device including the liquid crystal display panel.

BRIEF DESCRIPTION OF THE DRAWINGS

FIG. 6 is a table comparing the blurriness levels of a transmission image between with no voltage applied and with voltage applied, in a vertical alignment mode liquid crystal display panel and horizontal alignment mode liquid crystal display panels.

FIG. 7 is a table comparing the normally black mode and the normally white mode in a VA mode see-through display.

FIG. 8 is a table comparing the blurriness levels of a transmission image by alignment mode of the liquid crystal display panel.

FIG. 9 is a schematic plan view of a pixel electrode in the liquid crystal display panel of Embodiment 1.

FIG. 12 is a table comparing the blurriness levels of a transmission image by alignment mode of the liquid crystal display panel of Embodiment 2.

FIG. 19 is a graph of the sharpness of the transmission image through the liquid crystal display panels of Example 1 and Comparative Examples 1-1 to 1-3.

FIG. 20 is a comparison table of the evaluation results of a transmission image through the liquid crystal display panels of Example 1, Examples 2-1 and 2-2, and Comparative Example 1-1.

FIG. 23 shows the simulation results of dark lines in the liquid crystal display panels of Examples 1 and 3-1.

FIG. 24 is a graph of transmittance versus applied voltage in the liquid crystal display panels of Examples 1 and 3-1.

FIG. 40 is a schematic plan view of the tilt azimuths of liquid crystal molecules in a 4D-RTN mode liquid crystal display panel.

FIG. 41 shows the liquid crystal alignment in a 4D-RTN mode normally white liquid crystal display panel and a transmission image.

FIG. 52 is a schematic plan view of a pixel in a liquid crystal display panel (front panel) in a 3D display device of Example 6.

FIG. 53 shows the simulation result of the viewing angle characteristics of the liquid crystal display panel (front panel) in the 3D display device of Example 6.

FIG. 54 is a schematic plan view of a pixel in the back surface side liquid crystal display panel (rear panel) in the 3D display device of Example 6.

FIG. 55 shows the simulation result of the viewing angle characteristics of the back surface side liquid crystal display panel (rear panel) in the 3D display device of Example 6.

FIG. 56 is a schematic plan view of a pixel in a back surface side liquid crystal display panel (rear panel) in a 3D display device of Example 7.

FIG. 57 shows the simulation result of the viewing angle characteristics of the back surface side liquid crystal display panel (rear panel) in the 3D display device of Example 7.

FIG. 58 is a schematic plan view of a pixel in a back surface side liquid crystal display panel (rear panel) in a 3D display device of Comparative Example 5.

FIG. 59 shows the simulation result of the viewing angle characteristics of the back surface side liquid crystal display panel (rear panel) in the 3D display device of Comparative Example 5.

FIG. 60 is a schematic plan view of a pixel in a liquid crystal display panel (front panel) in a 3D display device of Comparative Example 6.

FIG. 61 shows the simulation results of the viewing angle characteristics of the liquid crystal display panel (front panel) in the 3D display device of Comparative Example 6.

FIG. 62 is a schematic plan view of a pixel in the back surface side liquid crystal display panel (rear panel) in the 3D display device of Comparative Example 6.

FIG. 63 shows the simulation result of the viewing angle characteristics of the back surface side liquid crystal display panel (rear panel) in the 3D display device of Comparative Example 6.

FIG. 64 is a schematic plan view of a pixel in a liquid crystal display panel (front panel) of a 3D display device of Comparative Example 7.

FIG. 65 shows the simulation result of the viewing angle characteristics of the liquid crystal display panel (front panel) in the 3D display device of Comparative Example 7.

FIG. 66 is a schematic plan view of a pixel in a back surface side liquid crystal display panel (rear panel) in a 3D display device of Comparative Example 8.

FIG. 67 shows the simulation result of the viewing angle characteristics of the back surface side liquid crystal display panel (rear panel) in the 3D display device of Comparative Example 8.

FIG. 68 is a schematic plan view of a pixel in a back surface side liquid crystal display panel (rear panel) in a 3D display device of Comparative Example 9.

FIG. 69 shows the simulation results of the viewing angle characteristics of the back surface side liquid crystal display panel (rear panel) in the 3D display device of Comparative Example 9.

FIG. 70 is a schematic plan view of a pixel in a liquid crystal display panel (front panel) in a 3D display device of Comparative Example 10.

FIG. 71 shows the simulation result of the viewing angle characteristics of the liquid crystal display panel (front panel) in the 3D display device of Comparative Example 10.

FIG. 72 is a schematic plan view of a pixel in a liquid crystal display panel (front panel) in a 3D display device of Comparative Example 11.

FIG. 73 shows the simulation result of the viewing angle characteristics of the liquid crystal display panel (front panel) in the 3D display device of Comparative Example 11.

FIG. 74 is a schematic plan view of a pixel in a liquid crystal display panel (front panel) in a 3D display device of Comparative Example 12.

FIG. 75 shows the simulation result of the viewing angle characteristics of the liquid crystal display panel (front panel) in the 3D display device of Comparative Example 12.

DETAILED DESCRIPTION OF THE INVENTION

Hereinafter, embodiments of the present invention are described. The present invention is not limited to the following embodiments, and the design of the present invention can be modified as appropriate within the range satisfying the configuration of the present invention.

Embodiment 1

Figure 1:
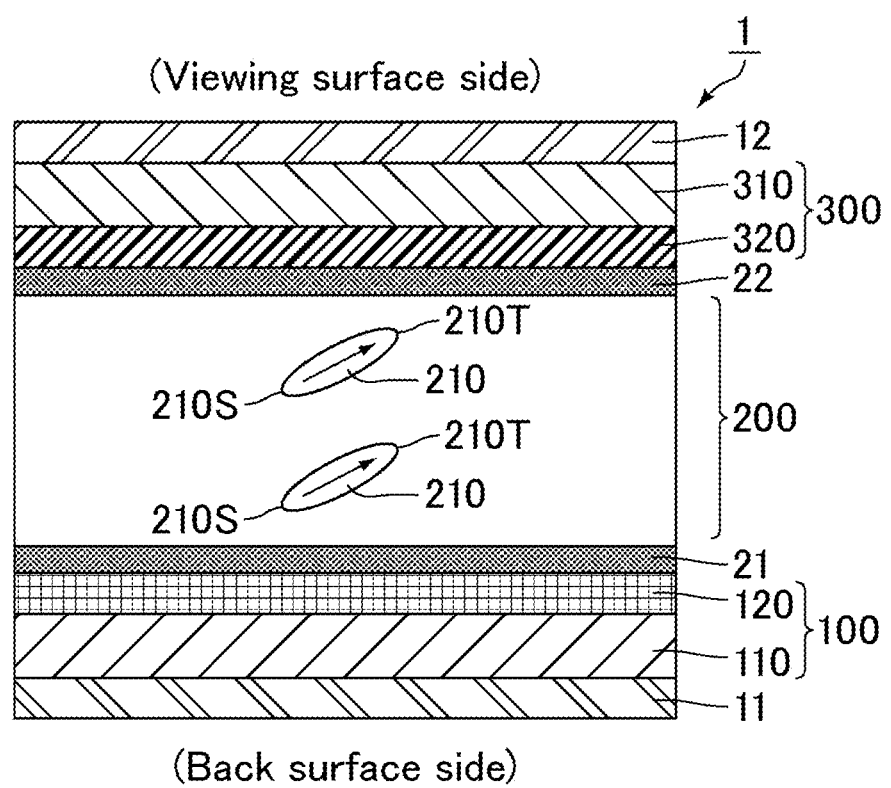
FIG. 1 is a schematic cross-sectional view of an example of a liquid crystal display panel of Embodiment 1.

FIG. 1 is a schematic cross-sectional view of an example of a liquid crystal display panel of Embodiment 1. As shown in FIG. 1, a liquid crystal display panel 1 of the present embodiment sequentially includes, from the back surface side toward the viewing surface side, a first polarizing plate 11, a first substrate 100, a first alignment film 21, a liquid crystal layer 200 containing liquid crystal molecules 210, a second alignment film 22, a second substrate 300, and a second polarizing plate 12. The first substrate 100 includes an insulating substrate 110 and pixel electrodes 120 disposed in a matrix pattern in the row direction and the column direction. The second substrate 300 includes an insulating substrate 310 and a common electrode 320.

Figure 2:
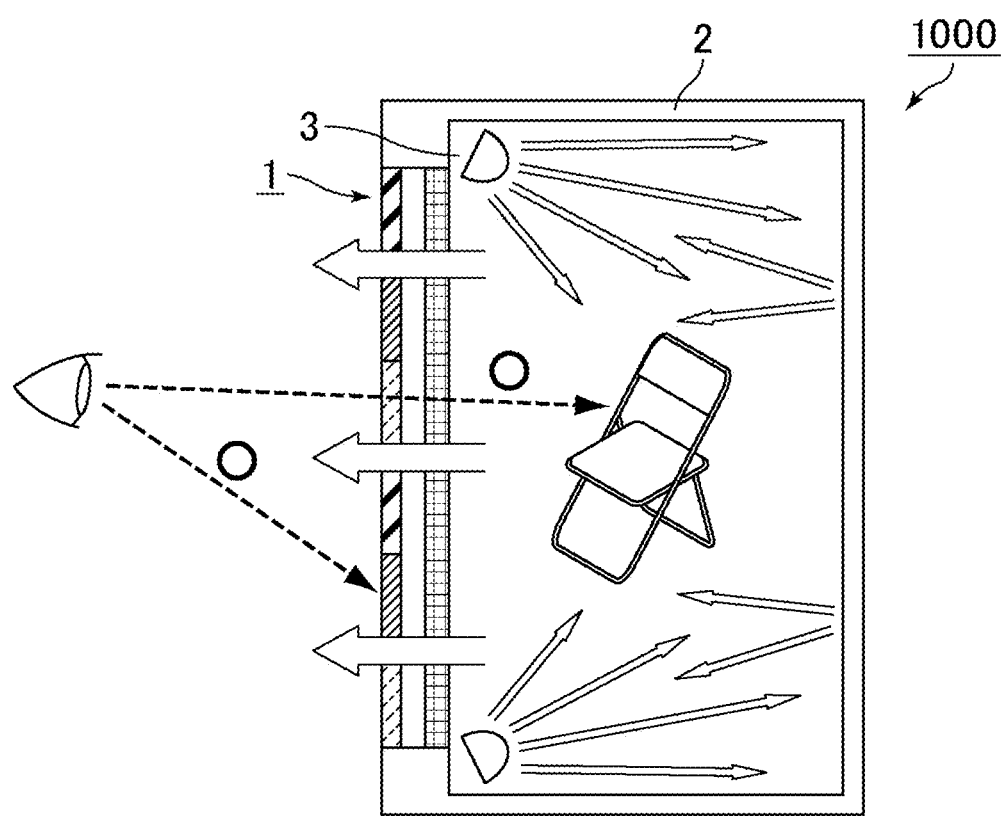
FIG. 2 is a schematic cross-sectional view of a see-through display including the liquid crystal display panel of Embodiment 1.

FIG. 2 is a schematic cross-sectional view of a see-through display including the liquid crystal display panel of Embodiment 1. The display method of the liquid crystal display panel 1 of the present embodiment is described, taking a see-through display including the liquid crystal display panel 1 of the present embodiment as an example. A see-through display 1000 in FIG. 2 includes a box-type case 2, a liquid crystal display panel 1 on one side surface of the case 2, and light sources 3 on an inner side surface of the case 2. The see-through display 1000 irradiates the liquid crystal display panel 1 on one side surface of the case 2 with light from the light sources 3 (for example, LEDs) at the corners of the case 2. This configuration scatters and reflects light from the light sources inside the case 2, and thus causes the light to be incident on the back surface side of the liquid crystal display panel 1 and then to travel toward the viewing surface side of the liquid crystal display panel 1.

The light from the light sources 3 is incident on the liquid crystal display panel 1 and the alignment of the liquid crystal molecules 210 in the liquid crystal layer 200 is switched, so that the amount of light passing through the liquid crystal display panel 1 is controlled. The liquid crystal display panel 1 is configured to display an image on the panel surface in the image display state while allowing the background to be seen therethrough in the transparent display state. This configuration allows see-through display. When the liquid crystal display panel 1 is in the transparent display state, the viewer can see the background (here, the inside of the case 2) through the liquid crystal display panel 1. The liquid crystal display panel 1 can switch between the image display state and the transparent display state by pixel. Thus, the operation is also possible which allows the background to be seen through the panel only in part of the plane of the panel.

The see-through display 1000 can be used in the fields of smartglasses, vehicles, digital signage, building materials, smart home appliances, and amusement devices, for example. In the field of smartglasses, for example, the see-through display 1000 can be applied to a head mounted display to provide the mixed reality (MR) or virtual reality (VR), for example. In the field of vehicles, for example, the see-through display 1000 can be applied to a head-up display to enable display of information such as a map, speed, and traffic information as well as to enable use of the display as a sun visor, a blind, or a shade. In the field of digital signage, for example, the see-through display 1000 can be applied to a vending machine, an information sign, and a platform door or gate to enable advertisement display that blends into the surroundings. In the field of building materials, for example, the see-through display 1000 can be applied to a showcase, a shop window, and a partition to display description and images, for example, on these sites. In the field of smart home appliances, the see-through display 1000 can be applied to a transparent television and a refrigerator to reduce a sense of oppression from the television and refrigerator by switching the mode to the transparent display state when they are not used. In the field of amusement devices, the see-through display 1000 can be applied to a gaming screen, a pachinko gaming device, and a slot machine to enhance the visual effects.

The alignment of the liquid crystal molecules 210 is switched by applying voltage to the liquid crystal layer 200 using the pixel electrodes 120 and the common electrode 320. With no voltage applied between the pixel electrodes 120 and the common electrode 320, the first alignment film 21 and the second alignment film 22 control the initial alignment of the liquid crystal molecules 210. The expression "with no voltage applied between the pixel electrodes 120 and the common electrode 320" encompasses a state where voltage is not substantially applied between the pixel electrodes 120 and the common electrode 320, and refers to a state where the voltage applied to the liquid crystal layer 200 is lower than the threshold voltage.

The liquid crystal display panel 1 is in the normally black mode. This configuration can increase the contrast ratio of the liquid crystal display panel 1. The normally black mode is a display mode that provides black display with no voltage applied and provides white display with voltage applied.

The liquid crystal molecules 210 may be aligned substantially vertically or substantially horizontally, and preferably substantially vertically, to the main surface of the first substrate 100 or the second substrate 300 with no voltage applied. The following example describes the present embodiment, taking the case where the liquid crystal molecules 210 are substantially vertically aligned as an example. The state where the liquid crystal molecules 210 are aligned substantially vertically to the main surface of the first substrate 100 or the second substrate 300 means that the pre-tilt angle of the liquid crystal molecules 210 relative to the main surface of the first substrate 100 or the second substrate 300 is 75° or greater and smaller than 90°. The state where the liquid crystal molecules 210 are aligned substantially horizontally to the main surface of the first substrate 100 or the second substrate 300 means that the pre-tilt angle of the liquid crystal molecules 210 relative to the main surface of the first substrate 100 or the second substrate 300 is 0° or greater and 15° or smaller. The pre-tilt angle of the liquid crystal molecules means the angle at which the long axis of each liquid crystal molecule is tilted to the main surface of the corresponding substrate with no voltage applied to the liquid crystal layer. The main surface of a substrate means a substrate plane. The polarization axis may be the absorption axis or transmission axis of a polarizing plate.

Application of voltage between the pixel electrodes 120 and the common electrode 320 generates vertical electric fields in the liquid crystal layer 200, further significantly tilting the liquid crystal molecules 210 at the same tilt azimuth as in the state with no voltage applied.

Herein, the tilt azimuth of the liquid crystal molecules 210 is described as appropriate using an alignment vector in which in a plan view of the liquid crystal display panel 1, the first substrate 100 side long-axis end of each liquid crystal molecule 210 is defined as a start point (hereinafter, also referred to as the "liquid crystal director tail") 210S and the second substrate 300 side long-axis end of the liquid crystal molecule 210 as an end point (hereinafter, also referred to as the "liquid crystal director head") 210T. The alignment vector is in the same direction as the tilt azimuth of the liquid crystal molecules 210 relative to the first alignment film 21 on the first substrate 100 side and is in the opposite direction to the tilt azimuth of the liquid crystal molecules 210 relative to the second alignment film 22 on the second substrate 300 side. The "azimuth" as used herein means the direction in a view projected onto a substrate surface without consideration of an inclination angle (polar angle, pre-tilt angle) from the direction normal to the substrate surface. Voltage application to the liquid crystal molecules 210, aligned substantially vertically to a substrate (aligned at a slight angle) with no voltage applied, significantly tilts the liquid crystal molecules 210 at the same tilt azimuth as in the state with no voltage applied. Thus, the start point 210S and the end point 210T of the alignment vector may be determined while voltage is applied to the liquid crystal layer 200.

Figure 3:
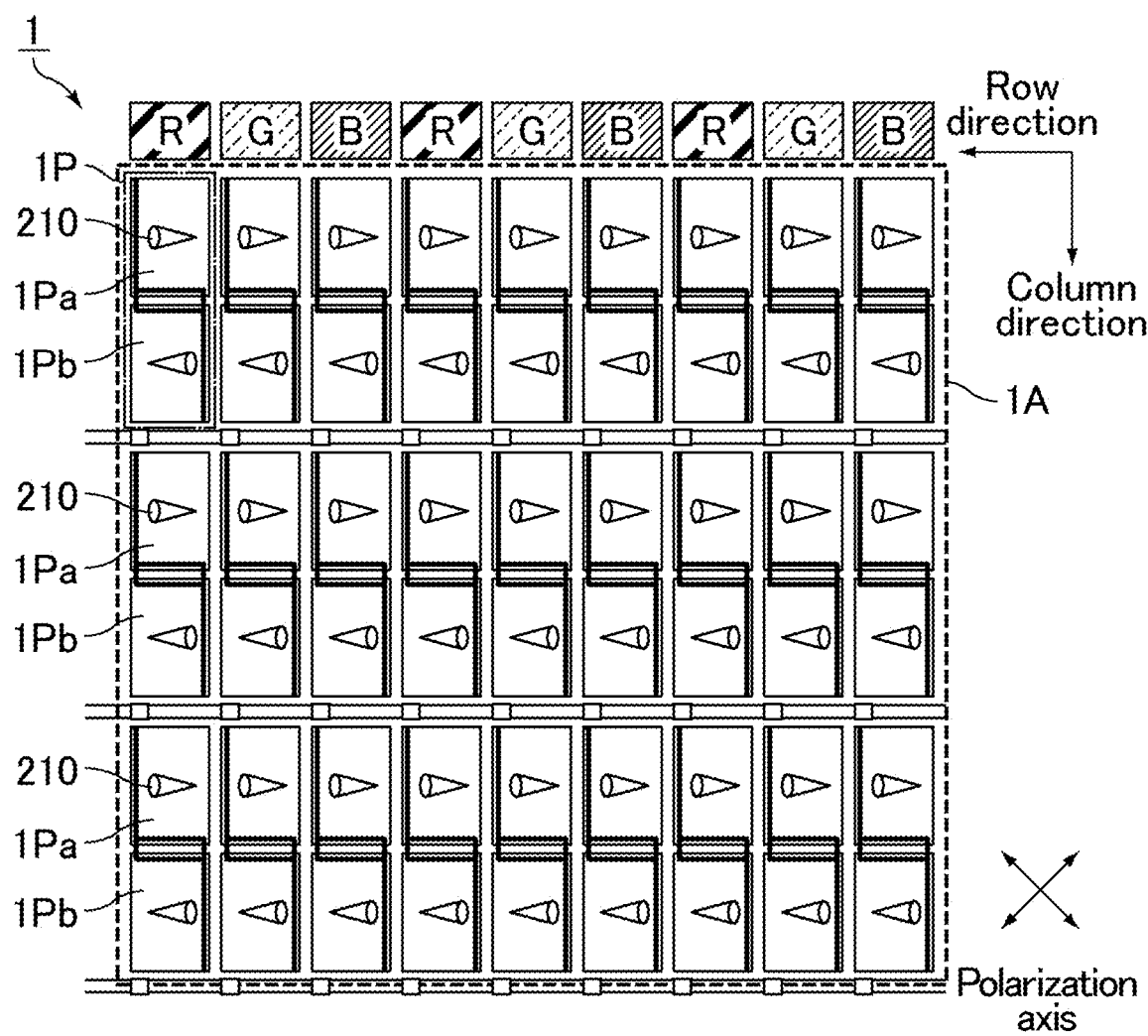
FIG. 3 is a schematic plan view of the tilt azimuths of liquid crystal molecules in a liquid crystal layer in the liquid crystal display panel of Embodiment 1.
Figure 4:
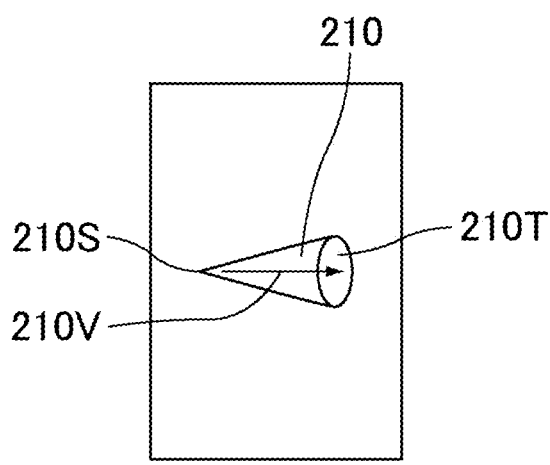
FIG. 4 shows the relationship between a tilt azimuth of liquid crystal molecules and an alignment vector.

FIG. 3 is a schematic plan view of the tilt azimuths of liquid crystal molecules in a liquid crystal layer in the liquid crystal display panel of Embodiment 1. FIG. 4 shows the relationship between a tilt azimuth of liquid crystal molecules and an alignment vector. As shown in FIG. 3, the liquid crystal display panel 1 of the present embodiment includes the pixels 1P arranged in a matrix pattern in the row direction and the column direction. A pixel means a display unit region superimposed with a single pixel electrode 120. There are pixels superimposed with red (R) color filters, pixels superimposed with green (G) color filters, and pixels superimposed with blue (B) color filters. In FIG. 3, the portion surrounded by the dashed dotted line corresponds to a single pixel. The present embodiment employs the second substrate 300 in which color filters are arranged in the order of red (R), green (G), and blue (B) in lines extending in the column direction. The row direction intersects the column direction. The row direction is preferably perpendicular to the column direction. More preferably, as shown in FIG. 3, the row direction is the same as the horizontal direction of a display portion 1A on which an image is displayed in the liquid crystal display panel 1, while the column direction is the same as the vertical direction of the display portion 1A.

FIG. 3 shows the liquid crystal molecules 210 as pins (circular cones) for easy understanding of the tilt azimuths of the liquid crystal molecules 210. The bottom surface of a circular cone indicates the second substrate 300 side (viewer's side) and the vertex of the circular cone indicates the first substrate 100 side.

As shown in FIG. 3 and FIG. 4, the first alignment film 21 and the second alignment film 22 have been subjected to alignment treatment such that a first domain 1Pa and a second domain 1Pb in which the alignment vectors 210V are different from each other are arranged side by side (adjacent to each other) in the column direction.

This configuration can achieve favorable viewing angle characteristics. Specifically, the first alignment film 21 and the second alignment film 22 have been subjected to alignment treatment such that, in each pixel 1P superimposed with a single pixel electrode 120, the first domain 1Pa and the second domain 1Pb in which the alignment vectors 210V are different from each other are arranged side by side (adjacent to each other) in the column direction.

Inside each pixel 1P, the first domain 1Pa and the second domain 1Pb in which the alignment vectors are different from each other are arranged side by side (adjacent to each other) in the column direction. These domains can be formed by performing different alignment treatments on the first alignment film 21 and the second alignment film 22. With voltage applied, the liquid crystal molecules 210 in each domain are tilted at an angle according to the alignment vector of the domain.

The alignment vector in each domain can be defined by the orientation of the liquid crystal molecules 210 at the center of the domain in a plan view and at the center of the liquid crystal layer 200 in a cross-sectional view.

Figure 5:
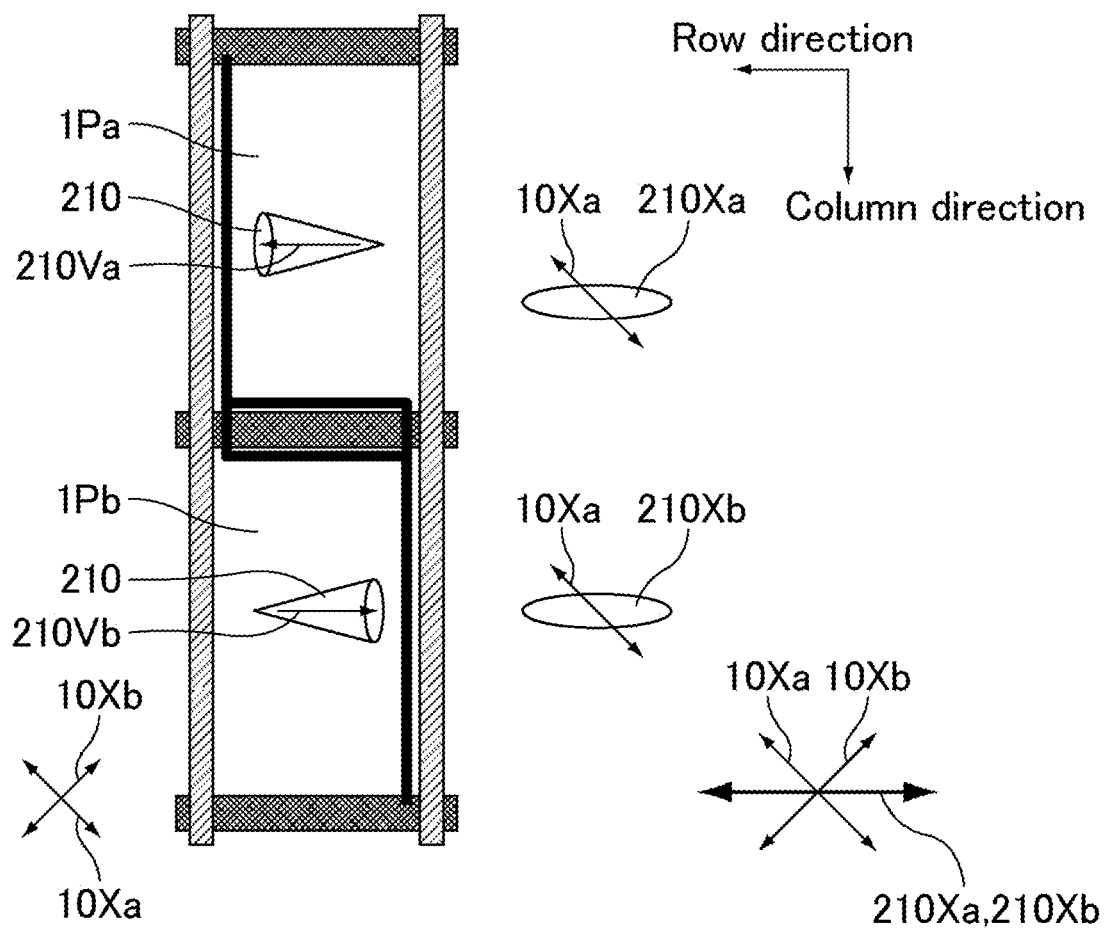
FIG. 5 is a schematic view of the relationship between the liquid crystal alignment axes and the polarization axes in the liquid crystal display panel of Embodiment 1.

FIG. 5 is a schematic view of the relationship between the liquid crystal alignment axes and the polarization axes in the liquid crystal display panel of Embodiment 1. As shown in FIG. 5, in a plan view of the first domain 1Pa and the second domain 1Pb, a liquid crystal alignment axis 210Xa in the first domain 1Pa and a liquid crystal alignment axis 210Xb in the second domain 1Pb obliquely intersect a polarization axis 10Xa of the first polarizing plate 11 and a polarization axis 10Xb of the second polarizing plate 12 and are parallel to each other. This configuration allows the liquid crystal alignment axis 210Xa in the first domain 1Pa and the liquid crystal alignment axis 210Xb in the second domain 1Pb to intersect the polarization axis 10Xa of the first polarizing plate 11 at the same azimuth angle, and intersect the polarization axis 10Xb of the second polarizing plate 12 at the same azimuth angle. It is thus possible to prevent or reduce a periodical change in azimuth angle of the liquid crystal alignment axes 210Xa and 210Xb relative to the polarization axes 10Xa and 10Xb of the respective polarizing plates 11 and 12 in each pixel 1P, preventing or reducing blurriness of a transmission image.

Herein, when two axes (directions) "obliquely intersect" each other, the angle (absolute value) formed by the axes or directions is greater than 3° and smaller than 87°, preferably 15° or greater and 75° or smaller, more preferably 25° or greater and 65° or smaller, particularly preferably 35° or greater and 55° or smaller. Also herein, when two axes (directions) are "parallel to each other", the angle (absolute value) formed by the axes or directions is 0° or greater and 3° or smaller, preferably 0° or greater and 1° or smaller, more preferably 0° or greater and 0.5° or smaller, particularly preferably 0° (perfectly parallel). Also herein, when two axes (directions) are "perpendicular to each other", the angle (absolute value) formed by the axes or directions is 87° or greater and 90° or smaller, preferably 89° or greater and 90° or smaller, more preferably 89.5° or greater and 90° or smaller, particularly preferably 90° (perfectly perpendicular). The angle formed by two axes (directions) refers to an acute angle in any case where the angle is not 90°.

The following describes a transmission image observed through a liquid crystal display panel in a vertical alignment mode in which the liquid crystal molecules are aligned vertically (substantially vertically) to the main surfaces of the substrates with no voltage applied, and through a liquid crystal display panel in the horizontal alignment mode in which the liquid crystal molecules are aligned horizontally to the main surfaces of the substrates with no voltage applied. FIG. 6 is a table comparing the blurriness levels of a transmission image between with no voltage applied and with voltage applied, in a vertical alignment mode liquid crystal display panel and horizontal alignment mode liquid crystal display panels. FIG. 6 shows a fringe field switching (FFS) mode employing a positive liquid crystal and an FFS mode containing a negative liquid crystal as examples of the horizontal alignment (horizontal electric field) mode, while showing the liquid crystal display panel 1 of the present embodiment, which is specifically one in a 2 domain electrically controlled birefringence (2D-ECB)/parallel alignment mode, as an example of the vertical alignment (vertical electric field) mode.

As shown in FIG. 6, with no voltage applied, the liquid crystal molecules are uniaxially aligned in both the vertical alignment mode and the horizontal alignment mode, and thus the transmission image is not blurred. With voltage applied, some liquid crystal molecules 210 in the horizontal alignment mode rotate in the plane of the liquid crystal layer 200 to cause uneven alignment, and thus the transmission image is blurred. Here, the blurriness of the transmission image in the vertical alignment mode can be prevented or reduced by employing an alignment mode which does not cause uneven liquid crystal alignment with voltage applied (for example, the 2D-ECB/parallel alignment mode as in the present embodiment).

In comparison between the normally black mode and the normally white mode for a vertical alignment (VA) mode liquid crystal display panel, which is an example of the vertical alignment mode liquid crystal display panel, for example, differences shown in FIG. 7 are found. FIG. 7 is a table comparing the normally black mode and the normally white mode in a VA mode see-through display.

As shown in FIG. 7, the normally black mode achieves a low black luminance and a high contrast ratio, but provides a blurred transmission image on a see-through display. The normally white mode achieves a high transmittance, but exhibits a low contrast ratio due to a high black luminance. The liquid crystal display panel 1 of the present embodiment can provide a less blurred transmission image in the normally black mode which exhibits a high contrast ratio.

As shown in FIG. 5, the liquid crystal alignment axis 210Xa in the first domain 1Pa and the liquid crystal alignment axis 210Xb in the second domain 1Pb are parallel to the row direction. This configuration enables excellent viewing angle characteristics with a horizontally symmetrical viewing angle.

FIG. 8 is a table comparing the blurriness levels of a transmission image by alignment mode of the liquid crystal display panel. As shown in FIG. 8, a 1D mode liquid crystal display panel provides a single liquid crystal alignment axis (liquid crystal alignment axis 210Xa) that is constant in the horizontal direction and the vertical direction. This presumably prevents or reduces a periodical change in liquid crystal alignment axis to prevent or reduce blurriness of a transmission image.

However, since there is only one domain (domain 1Pa) in each pixel, the 1D mode liquid crystal display panel cannot improve the viewing angle characteristics.

A 2D-ECB/mountain-shaped alignment mode liquid crystal display panel including two domains (domains 1Pa and 1Pb) provides two liquid crystal alignment axes (liquid crystal alignment axes 210Xa and 210Xb). This mode presumably produces a periodical change in the horizontal direction to provide a blurred transmission image appearing as two images.

A 4 domain reverse twisted nematic (4D-RTN) mode liquid crystal display panel including four domains (domains 1Pa, 1Pb, 1Pc, 1Pd) provides four liquid crystal alignment axes (liquid crystal alignment axes 210Xa, 210Xb, 210Xc, 210Xd). Since a periodical change in liquid crystal alignment axis occurs in both the horizontal direction and the vertical direction in a normally black (NB) liquid crystal display panel, the transmission image is presumably blurred to appear as four images. Meanwhile, a 4D-RTN mode normally white (NW) liquid crystal display panel provides a constant liquid crystal alignment axis in the horizontal direction and the vertical direction to reduce a periodical change in liquid crystal alignment axis. This presumably prevents or reduces blurriness of a transmission image. However, the normally white mode cannot achieve a high contrast ratio.

In contrast, a 2D-ECB/parallel alignment mode liquid crystal display panel, which is the liquid crystal display panel of the present embodiment, provides a constant liquid crystal alignment axis in the horizontal direction and the vertical direction to reduce a periodical change in liquid crystal alignment axis. The liquid crystal display panel is therefore capable of preventing or reducing blurriness of a transmission image and increasing the contrast ratio as it is in the normally black mode.

FIG. 9 is a schematic plan view of a pixel electrode in the liquid crystal display panel of Embodiment 1. As shown in FIG. 3 and FIG. 9, each pixel electrode 120 is provided with a slit 120S having a width of more than 0 µm and 4.5 µm or less in the boundary between a first domain 1Pa and a second domain 1Pb.

The liquid crystal display panel 1 of the present embodiment has excellent viewing angle characteristics owing to the pixels each including multiple domains. However, when pixels each including multiple domains are used, there may be a region with discontinuous alignment of the liquid crystal molecules 210 in the boundary between adjacent domains. In such a region, the liquid crystal molecules 210 cannot be aligned in the desired direction. This may lead to insufficient transmission of light in the display state, causing the region to be recognized as a dark portion. A linear dark portion is called a dark line. A dark line decreases the luminance of the pixel, thus decreasing the light use efficiency of the liquid crystal display panel. The position and size of the dark line are apt to vary by pixel. The dark lines therefore make the optical characteristics of the pixels uneven to ultimately decrease the evenness of display in observation of the entire liquid crystal display panel. Various dark lines are generated because the alignment in the boundary between adjacent domains depends on the relationship between the alignment axes in the adjacent domains, for example. Such various dark lines can be prevented by providing a structure to determine (fix) the positions of the dark lines. The shape of the dark lines can be stabilized by using the slits 120S.

In other words, in the liquid crystal display panel 1 of the present embodiment, the slit 120S having a width of more than 0 µm and 4.5 µm or less is provided in the boundary between the first domain 1Pa and the second domain 1Pb in each pixel electrode 120, so that electric field distortion due to the slit 120S occurs in the vicinity of the boundary between the first domain 1Pa and the second domain 1Pb. As a result, the continuous alignment change in the boundary between the first domain 1Pa and the second domain 1Pb can be intentionally limited to 90° or smaller to fix the dark line, and thus the luminance of the dark line portion can be increased.

The pre-tilt angle of the liquid crystal molecules 210 is preferably 81° or greater and 89° or smaller. A dark line portion is generated between the first domain 1Pa and the second domain 1Pb in which the alignment vectors are different. This dark line portion can be reduced in width by a pre-tilt angle of the liquid crystal molecules 210 of 81° or greater and 89° or smaller because with such a pre-tilt angle, the alignment controlling force for the liquid crystal molecules 210 near the first substrate 100 and those near the second substrate 300 increases, which contributes to better matching of the liquid crystal alignment axes of the liquid crystal molecules. As a result, the transmittance can be increased. In addition, in consideration of the trade-off relationship between the mode efficiency and the properties including the black luminance and the contrast ratio, the pre-tilt angle of the liquid crystal molecules 210 is more preferably 85° or greater and 88° or smaller.

Figure 10:
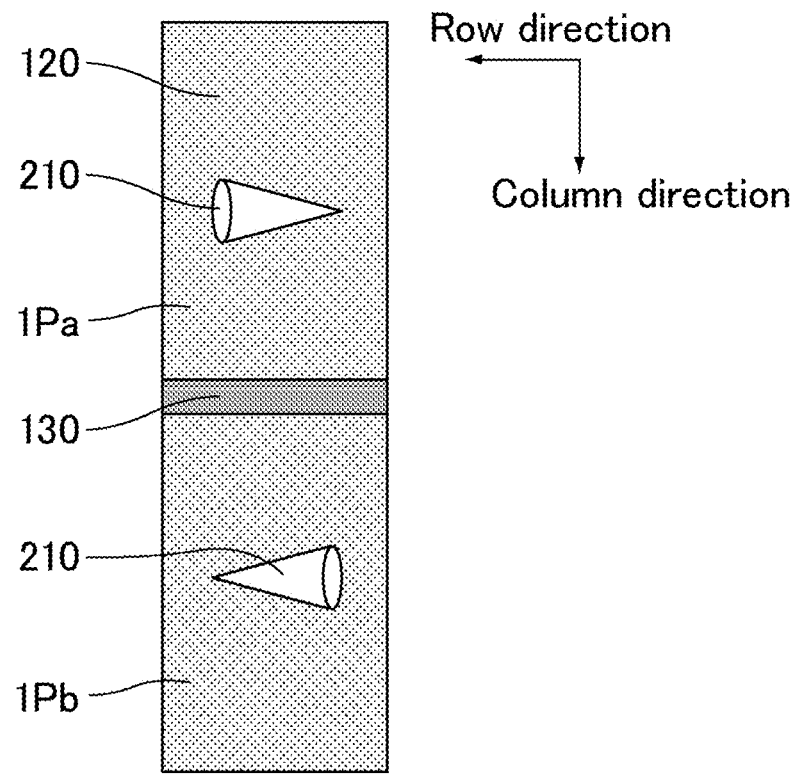
FIG. 10 is a schematic plan view of a pixel electrode and a light shielding member in the liquid crystal display panel of Embodiment 1.

FIG. 10 is a schematic plan view of a pixel electrode and a light shielding member in the liquid crystal display panel of Embodiment 1. As shown in FIG. 10, a light shielding member 130 is preferably provided in the boundary between the first domain 1Pa and the second domain 1Pb. Since the liquid crystal alignment continuously varies in the boundary between the first domain 1Pa and the second domain 1Pb, the liquid crystal alignment axis 210Xa in the first domain 1Pa and the liquid crystal alignment axis 210Xb in the second domain 1Pb may not be parallel to each other to cause a dark line. Here, with the light shielding member 130 in the boundary between the first domain 1Pa and the second domain 1Pb, the dark line portion can be shielded from light and blurriness can be further reduced.

Examples of the light shielding member 130 include a black matrix.

Next, the structure of the liquid crystal display panel 1 of the present embodiment is summarized. The first substrate 100 may be, for example, a thin film transistor (TFT) substrate. The TFT substrate can be one commonly used in the field of liquid crystal display panels. The TFT substrate includes an insulating substrate and, on the insulating substrate in the display region, parallel gate lines extending in the row direction and parallel source lines extending in the direction intersecting the gate lines via an insulating film (in the column direction). The gate lines and the source lines as a whole form a grid pattern to define each pixel. At the intersection point of a source line and a gate line is disposed a thin film transistor serving as a switching element.

The liquid crystal layer 200 contains liquid crystal molecules 210 that align substantially vertically to the main surface of the first substrate 100 or the second substrate 300 with no voltage applied. The liquid crystal layer 200 controls the amount of light transmission based on the change in alignment of the liquid crystal molecules 210 in response to the electric field generated inside the liquid crystal layer 200 by voltage applied between the pixel electrodes 120 and the common electrode 320. The anisotropy of dielectric constant (Δε) of the liquid crystal molecules 210 defined by the following formula may be positive or negative. In the present embodiment employing the liquid crystal molecules 210 that align substantially vertically to the main surface of the first substrate 100 or the second substrate 300 with no voltage applied, the liquid crystal molecules 210 preferably have a negative anisotropy of dielectric constant. Liquid crystal molecules having a positive anisotropy of dielectric constant are also referred to as a positive liquid crystal, while liquid crystal molecules having a negative anisotropy of dielectric constant are also referred to as a negative liquid crystal. The long axis direction of a liquid crystal molecule is the slow axis direction.

$$\Delta\varepsilon = (\text{dielectric constant in long axis direction}) - (\text{dielectric constant in short axis direction})$$

The second substrate 300 includes the common electrode 320 and may be a color filter substrate (CF substrate), for example. The CF substrate may be one commonly used in the field of liquid crystal display panels.

The CF substrate may have a structure including, on a transparent substrate, components such as a black matrix formed in a grid pattern and color filters formed inside the grid cells, i.e., pixels. The black matrix may include a portion superimposed on the boundary of each pixel such that a cell of the grid is formed for the pixel, and may also include a portion crossing the center of each pixel in the short-side direction such that a cell of the grid is formed for each half pixel. A black matrix formed to be superimposed on dark line regions can reduce the chances of dark line observation. The black matrix may be made of any material as long as it has a light-shielding property. Suitable examples include resin materials containing a black pigment and metal materials having a light-shielding property. The black matrix is formed by, for example, photolithography which includes applying a photosensitive resin containing a black pigment to form a film, followed by processes such as exposure and development.

The common electrode 320 opposes the pixel electrodes 120 across the liquid crystal layer 200. A vertical electric field is generated between the common electrode 320 and the pixel electrodes 120 to tilt the liquid crystal molecules 210, so that display can be provided. The color filters may be arranged in each column in the order of red (R), green (G), and blue (B), in the order of yellow (Y), red (R), green (G), and blue (B), or in the order of red (R), green (G), blue (B), and green (G) in each column, for example.

The pixel electrodes 120 and the common electrode 320 may be transparent electrodes and may each be made of, for example, a transparent conductive material such as indium tin oxide (ITO), indium zinc oxide (IZO), zinc oxide (ZnO), or tin oxide (SnO), or an alloy of any of these metals.

The liquid crystal display panel 1 includes the first alignment film 21 between the first substrate 100 and the liquid crystal layer 200 and the second alignment film 22 between the second substrate 300 and the liquid crystal layer 200. The first alignment film 21 and the second alignment film 22 are preferably photo-alignment films formed from a photo-alignment film material and made to function to align the liquid crystal molecules 210 in a certain direction by a photo-alignment treatment. The photo-alignment film material encompasses general materials that undergo structural change when irradiated with light (electromagnetic waves) such as ultraviolet light or visible light, and thereby exhibit an ability of controlling the alignment of the nearby liquid crystal molecules 210 (alignment controlling force) or change the level and/or direction of the alignment controlling force. The photo-alignment material contains, for example, a photo-reactive site which undergoes a reaction such as dimerization (formation of dimers), isomerization, photo-Fries rearrangement, or decomposition when irradiated with light. Examples of the photo-reactive site (functional group) which is dimerized and isomerized when irradiated with light include cinnamate, cinnamoyl, 4-chalcone, coumarin, and stilbene. Examples of the photo-reactive site (functional group) which is isomerized when irradiated with light include azobenzene. Examples of the photo-reactive site which is photo-Fries rearranged when irradiated with light include phenolic ester structures. Examples of the photo-reactive site which is decomposed when irradiated with light include dianhydrides containing a cyclobutane ring, such as 1,2,3,4-cyclobutanetetracarboxylic-1,2:3,4-dianhydride (CBDA). The photo-alignment film material is preferably a vertically alignable one that can be used in a vertical alignment mode. Examples of the photo-alignment film material include materials containing a photo-reactive site, such as polyamides (polyamic acids), polyimides, polysiloxane derivatives, methyl methacrylate, and polyvinyl alcohols.

The present embodiment may employ the polymer sustained alignment (PSA) technique. The PSA technique seals a liquid crystal composition containing a photo-polymerizable monomer between the first substrate 100 and the second substrate 300 and then irradiates the liquid crystal layer 200 with light to polymerize the photo-polymerizable monomer, thereby forming a polymer on the surfaces of the first alignment film 21 and the second alignment film 22 and utilizing the polymer to fix the initial tilt (pre-tilt) of the liquid crystal molecules.

The liquid crystal display panel 1 of the present embodiment includes the first substrate 100 and the second substrate 300 bonded to each other with a sealant surrounding the liquid crystal layer 200, and the liquid crystal layer 200 is held in the predetermined region. The sealant can be, for example, an epoxy resin containing an inorganic or organic filler and a curing agent.

The polarization axis of the first polarizing plate 11 and the polarization axis of the second polarizing plate 12 may be perpendicular to each other (i.e., may be in crossed Nicols) or parallel to each other (i.e., may be parallel Nicols). Yet, the polarization axes are preferably perpendicular to each other.

Typical examples of the first polarizing plate 11 and the second polarizing plate 12 include polarizers (absorptive polarizing plates) obtained by adsorbing a dichroic anisotropic material such as an iodine complex (or a dye) on a polyvinyl alcohol film and aligning the material. Typically, each surface of a polyvinyl alcohol film is laminated with a protective film such as a triacetyl cellulose film for practical use. The first polarizing plate 11 and the second polarizing plate 12 may be in crossed Nicols where the polarization axes thereof are perpendicular to each other. An optical film such as a retardation film may be disposed between the first polarizing plate 11 and the first substrate 100 or between the second polarizing plate 12 and the second substrate 300.

The light sources 3 may be any light sources that emit light including only visible light or light including both visible light and ultraviolet light. In order to provide color display on the liquid crystal display panel, a light source emitting white light is suitable. Suitable kinds of the light sources 3 include light emitting diodes (LEDs). The "visible light" as used herein means light (electromagnetic waves) having a wavelength of 380 nm or longer and shorter than 800 nm.

The liquid crystal display panel 1 of the present embodiment has a structure including, as well as the components described above, components including external circuits such as a tape-carrier package (TCP) and a printed circuit board (PCB); optical films such as a viewing angle-increasing film and a luminance-increasing film; and a bezel (frame). Some components may be incorporated into another component. Components other than those described above are not particularly limited and are not described here because such components can be those commonly used in the field of liquid crystal display panels.

The method of producing the liquid crystal display panel 1 of the present embodiment is not particularly limited, and may be a method commonly used in the field of liquid crystal display panels. For example, the alignment treatment for the first alignment film 21 and the second alignment film 22 is performed by a photo-alignment treatment irradiating the target with light (electromagnetic waves) such as ultraviolet light or visible light. The photo-alignment treatment can be performed with, for example, a device having a light source for irradiating the first alignment film 21 and the second alignment film 22 with light and a function to conduct continuous scanning exposure for the pixels. Specific modes of the scanning exposure include a mode of irradiating a substrate surface with light from a light source while moving the substrate; a mode of irradiating a substrate surface with light from a light source while moving the light source; and a mode of irradiating a substrate surface with light from a light source while moving the light source and the substrate.

Embodiment 2

In the present embodiment, features unique to the present embodiment are mainly described, and the same features as those in the above embodiment are not described again. Embodiment 1 describes a mode in which the liquid crystal alignment axis 210Xa in the first domain 1Pa and the liquid crystal alignment axis 210Xb in the second domain 1Pb are parallel to the row direction. The present embodiment describes a liquid crystal display panel in which the liquid crystal alignment axis 210Xa in the first domain 1Pa and the liquid crystal alignment axis 210Xb in the second domain 1Pb are oblique to the row direction.

Figure 11:
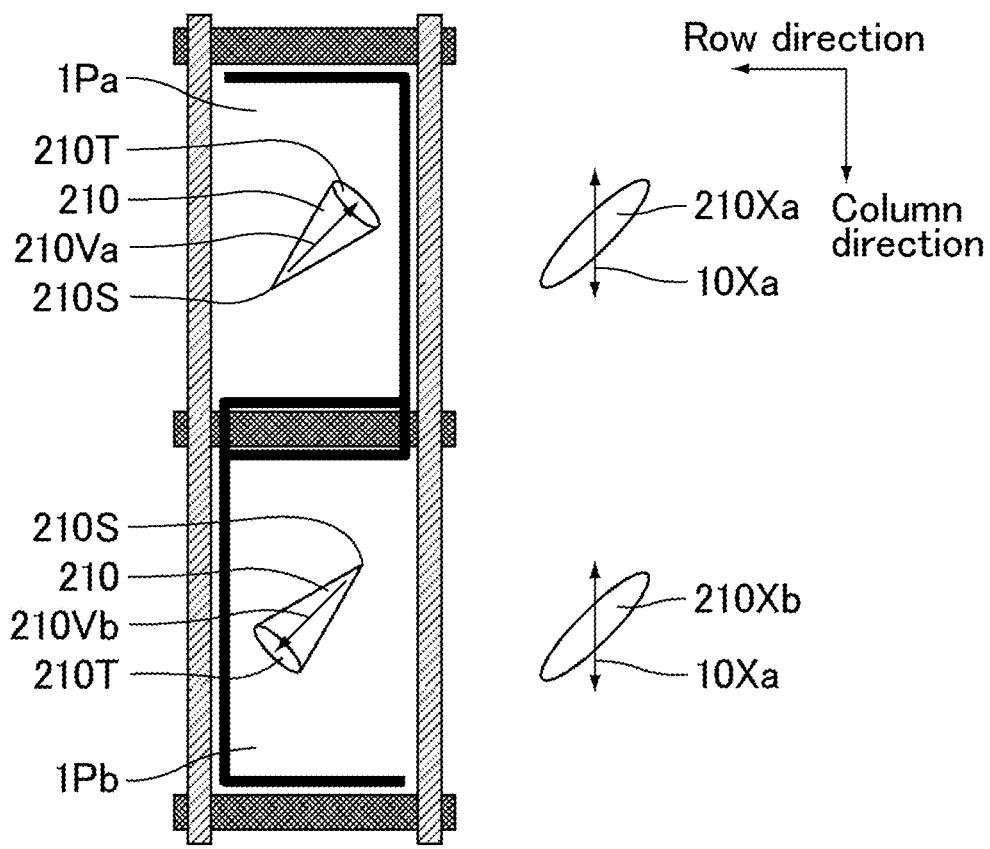
FIG. 11 is a schematic view of the relationship between the liquid crystal alignment axis and the polarization axis in a liquid crystal display panel of Embodiment 2.

FIG. 11 is a schematic view of the relationship between the liquid crystal alignment axis and the polarization axis in a liquid crystal display panel of Embodiment 2. As shown in FIG. 11, in the liquid crystal display panel 1 of the present embodiment, the liquid crystal alignment axis 210Xa in the first domain 1Pa and the liquid crystal alignment axis 210Xb in the second domain 1Pb are oblique to the row direction. This configuration enables the polarization axis of one of the first polarizing plate 11 and the second polarizing plate 12 to be parallel to the row direction while enabling the polarization axis of the other of the first polarizing plate 11 and the second polarizing plate 12 to be parallel to the column direction. Such polarizing plates therefore can reduce waste in cutting the polarizing plates from a large-sized polarizing plate to reduce the cost for a liquid crystal display panel, as compared with polarizing plates whose polarization axes are oblique to the row direction and the column direction.

FIG. 12 is a table comparing the blurriness levels of a transmission image by alignment mode of the liquid crystal display panel of Embodiment 2. Examples of the liquid crystal display panel of Embodiment 2 include those in the two alignment modes shown in FIG. 12, i.e., the 2D-ECB/normally facing mode and the 2D-ECB/oppositely facing mode. In each of these alignment modes, the liquid crystal alignment axes 210Xa and 210Xb are constant in the horizontal direction and the vertical direction. Thus, a periodical change in liquid crystal alignment axis is reduced, so that blurriness of a transmission image can be prevented or reduced.

Figure 13:
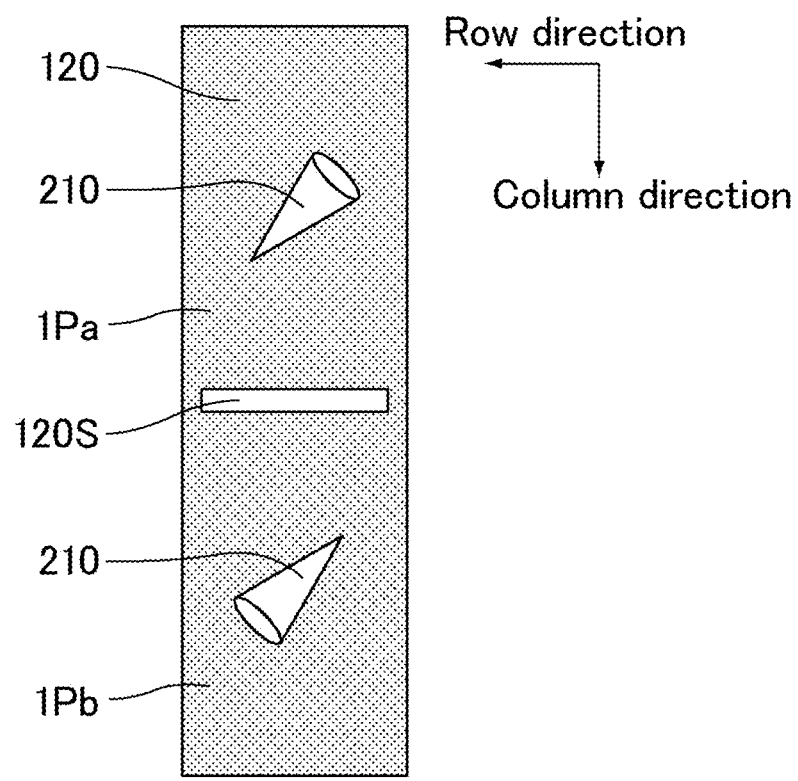
FIG. 13 is a schematic plan view of a pixel electrode in the liquid crystal display panel of Embodiment 2.

FIG. 13 is a schematic plan view of a pixel electrode in the liquid crystal display panel of Embodiment 2. As shown in FIG. 11 and FIG. 13, in a plan view of the first domain 1Pa and the second domain 1Pb, start points 210S of an alignment vector 210Va in the first domain 1Pa and an alignment vector 210Vb in the second domain 1Pb face each other. The pixel electrode 120 is provided with a slit 120S having a width of 3 µm or greater and 5 µm or smaller in the boundary between the first domain 1Pa and the second domain 1Pb. This configuration may cause electric field distortion due to the slit 120S in the vicinity of the boundary between the first domain 1Pa and the second domain 1Pb. As a result, the continuous alignment change in the boundary between the first domain 1Pa and the second domain 1Pb can be intentionally limited to 90° or smaller to substantially eliminate double dark lines, and thus the luminance of the dark line portion can be increased.

Modified Example 1

Figure 14:
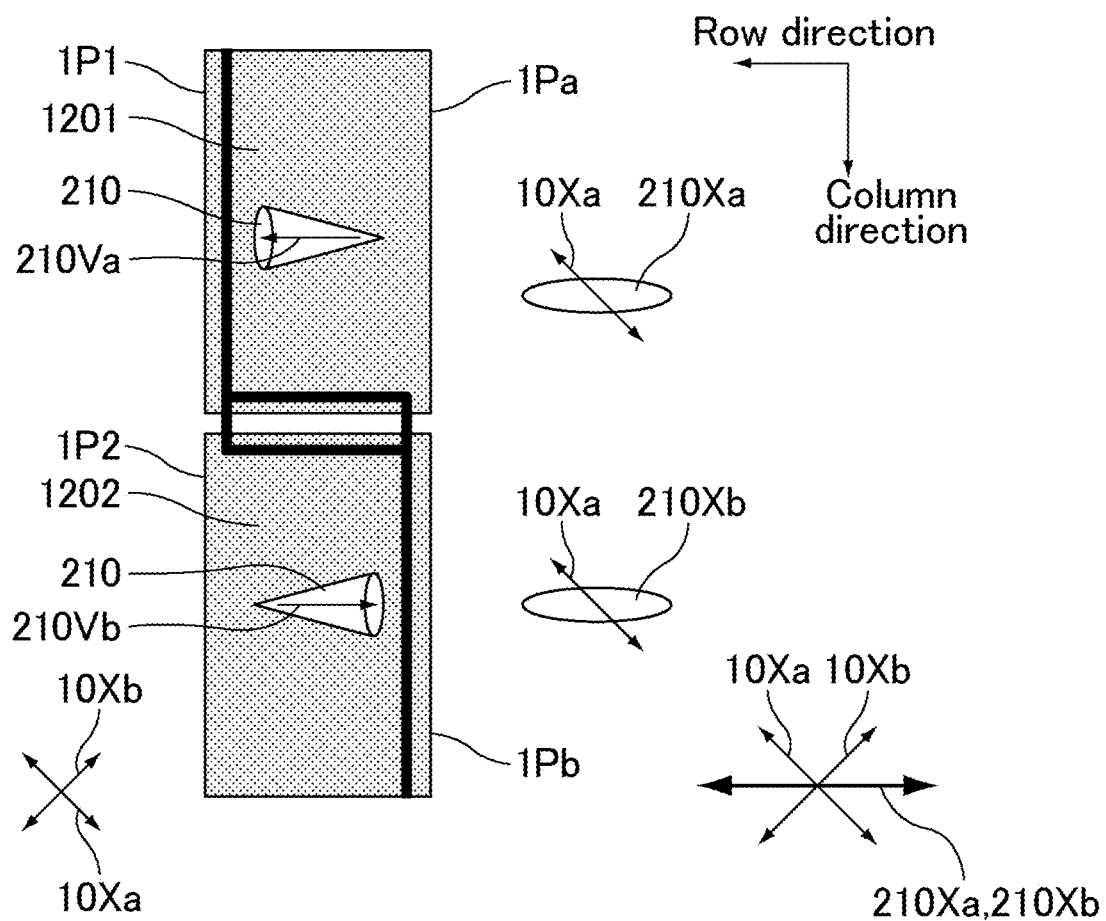
FIG. 14 is a schematic view of the relationship between the liquid crystal alignment axes and the polarization axes in a liquid crystal display panel of Modified Example 1.

FIG. 14 is a schematic view of the liquid crystal alignment axes and the polarization axes in a liquid crystal display panel of Modified Example 1. In Embodiments 1 and 2, the case is described where the first alignment film 21 and the second alignment film 22 have been subjected to alignment treatment such that the first domain 1Pa and the second domain 1Pb in which the alignment vectors 210V are different from each other are arranged side by side (adjacent to each other) in the column direction inside each pixel 1P superimposed with a single pixel electrode 120. As shown in FIG. 14, the first alignment film 21 and the second alignment film 22 may be subjected to alignment treatment such that only the first domain 1Pa is in one of a first pixel 1P1 and a second pixel 1P2 respectively superimposed with pixel electrodes 1201 and 1202 adjacent to each other in the column direction (for example, the first pixel 1P1 in FIG. 14) and only the second domain 1Pb is in the other of the first pixel 1P1 and the second pixel 1P2 (for example, the second pixel 1P2 in FIG. 14). This configuration also achieves the same effect as Embodiments 1 and 2. While each pixel in Embodiments 1 and 2 includes multiple domains, each pixel in the present modified example includes a single domain.

Figure 15:
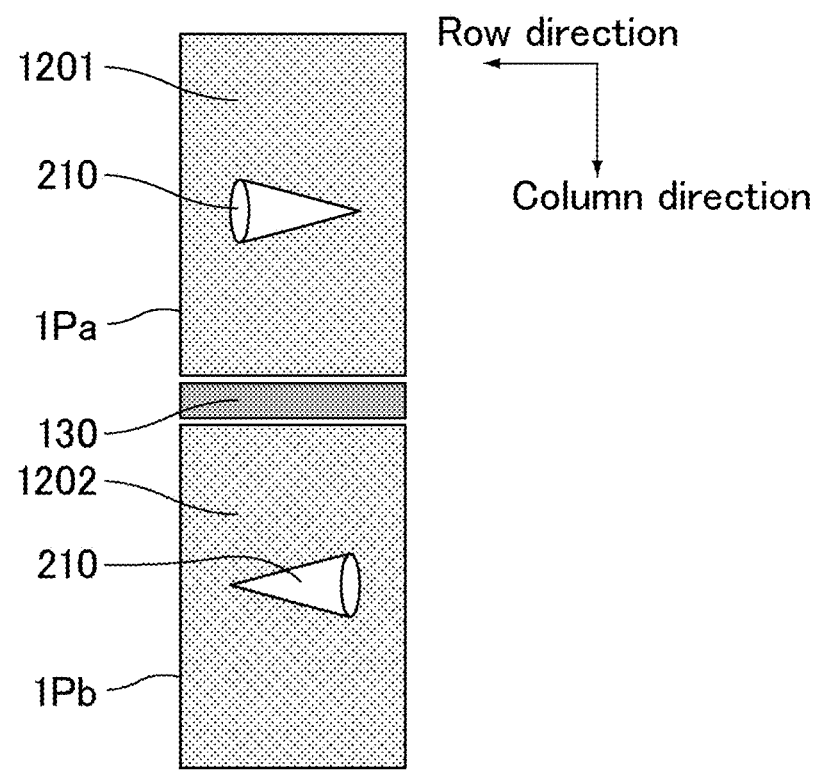
FIG. 15 is a schematic plan view of a pixel electrode and a light shielding member in the liquid crystal display panel of Modified Example 1.

FIG. 15 is a schematic plan view of a pixel electrode and a light shielding member in the liquid crystal display panel of Modified Example 1. As shown in FIG. 15, a light shielding member 130 is preferably disposed in the boundary between the first domain 1Pa and the second domain 1Pb, i.e., between the first pixel 1P1 and the second pixel 1P2. Since the liquid crystal alignment continuously varies in the boundary between the first domain 1Pa and the second domain 1Pb, the liquid crystal alignment axis 210Xa in the first domain 1Pa and the liquid crystal alignment axis 210Xb in the second domain 1Pb may not be parallel to each other to cause a dark line. Here, with the light shielding member 130 in the boundary between the first domain 1Pa and the second domain 1Pb, the dark line portion can be shielded from light and blurriness can be further reduced.

Modified Example 2

In Embodiment 1 and Embodiment 2, the mode is described where the light sources 3 are disposed at the corners of the case 2. The light sources 3 may be disposed at any positions that do not obstruct the vision from the back surface side of the liquid crystal display panel 1 in the transparent display state. For example, the light sources 3 may be disposed on the ceiling of the case 2.

Modified Example 3

In Embodiment 1 and Embodiment 2, the mode is described where the liquid crystal display panel 1 is on one side surface of the box-type case 2 and the light sources 3 are in the case 2. The liquid crystal display panel 1 can be used as a see-through display without being disposed in the case 2 including the light sources 3, as long as there is light to be incident on the back surface side of the liquid crystal display panel 1. For example, even when used as a partition screen, the liquid crystal display panel 1 can be used as a see-through display as long as there is light to be incident on the back surface side of the liquid crystal display panel 1 (for example, light from indoor lighting or outdoor sunlight).

Embodiment 3

In the present embodiment, features unique to the present embodiment are mainly described, and the same features as those in Embodiments 1 to 2 and Modified Examples 1 to 3 are not described again. In the present embodiment, a 3D display device including the liquid crystal display panel 1 having a see-through function is described.

Figure 45:
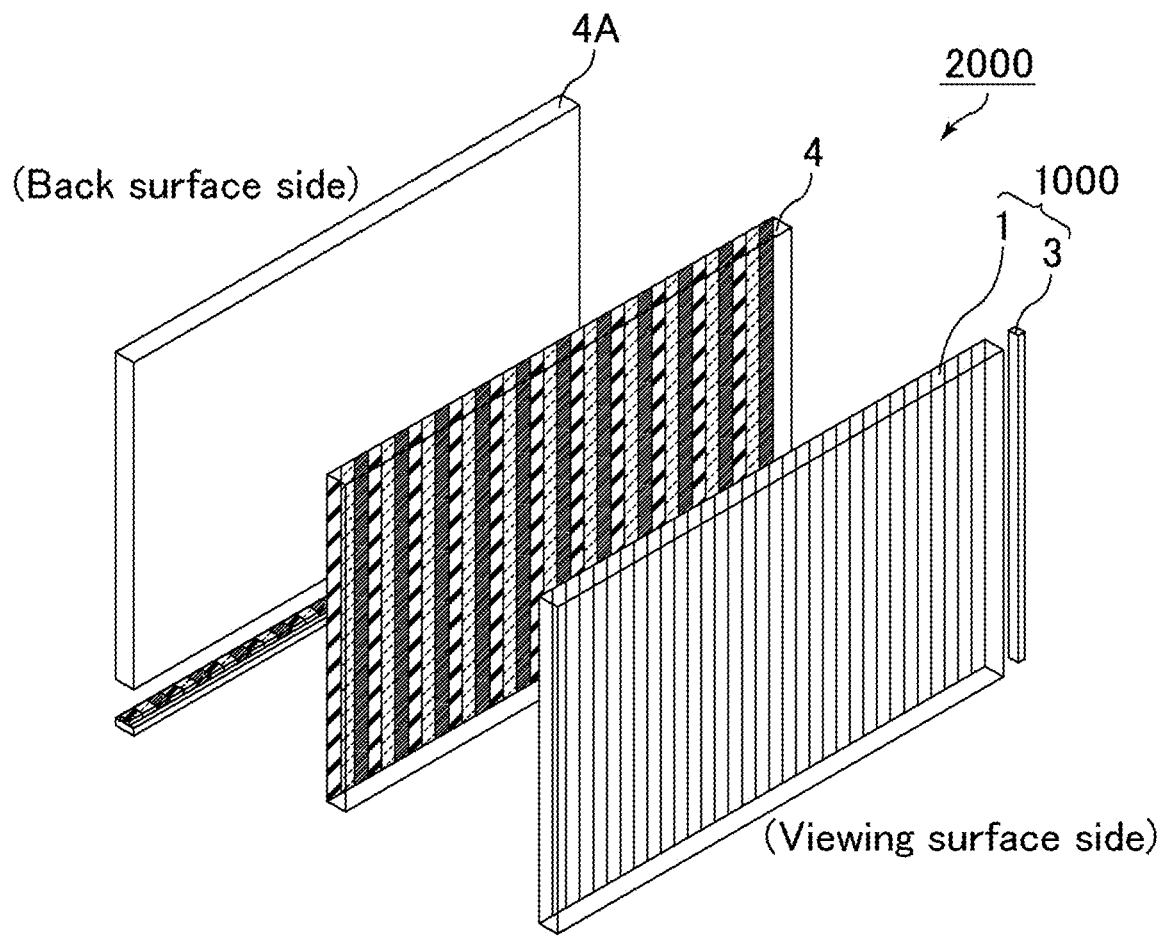
FIG. 45 is a schematic perspective view of a 3D display device of Embodiment 3.
Figure 46:
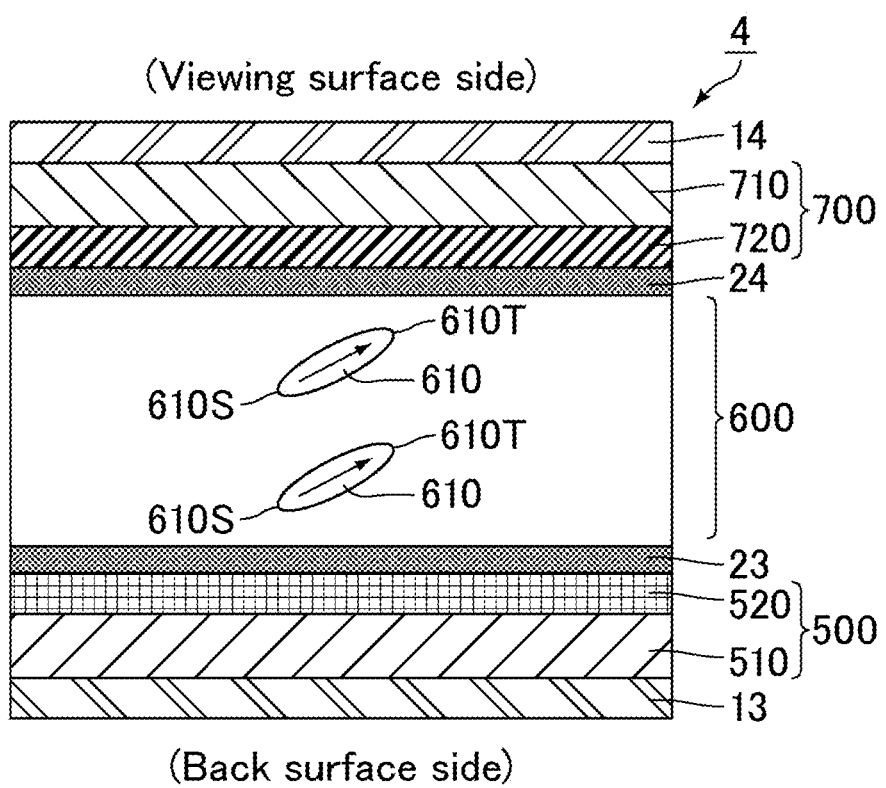
FIG. 46 is a schematic cross-sectional view of a back surface side liquid crystal display panel in the 3D display device of Embodiment 3.
Figure 47:
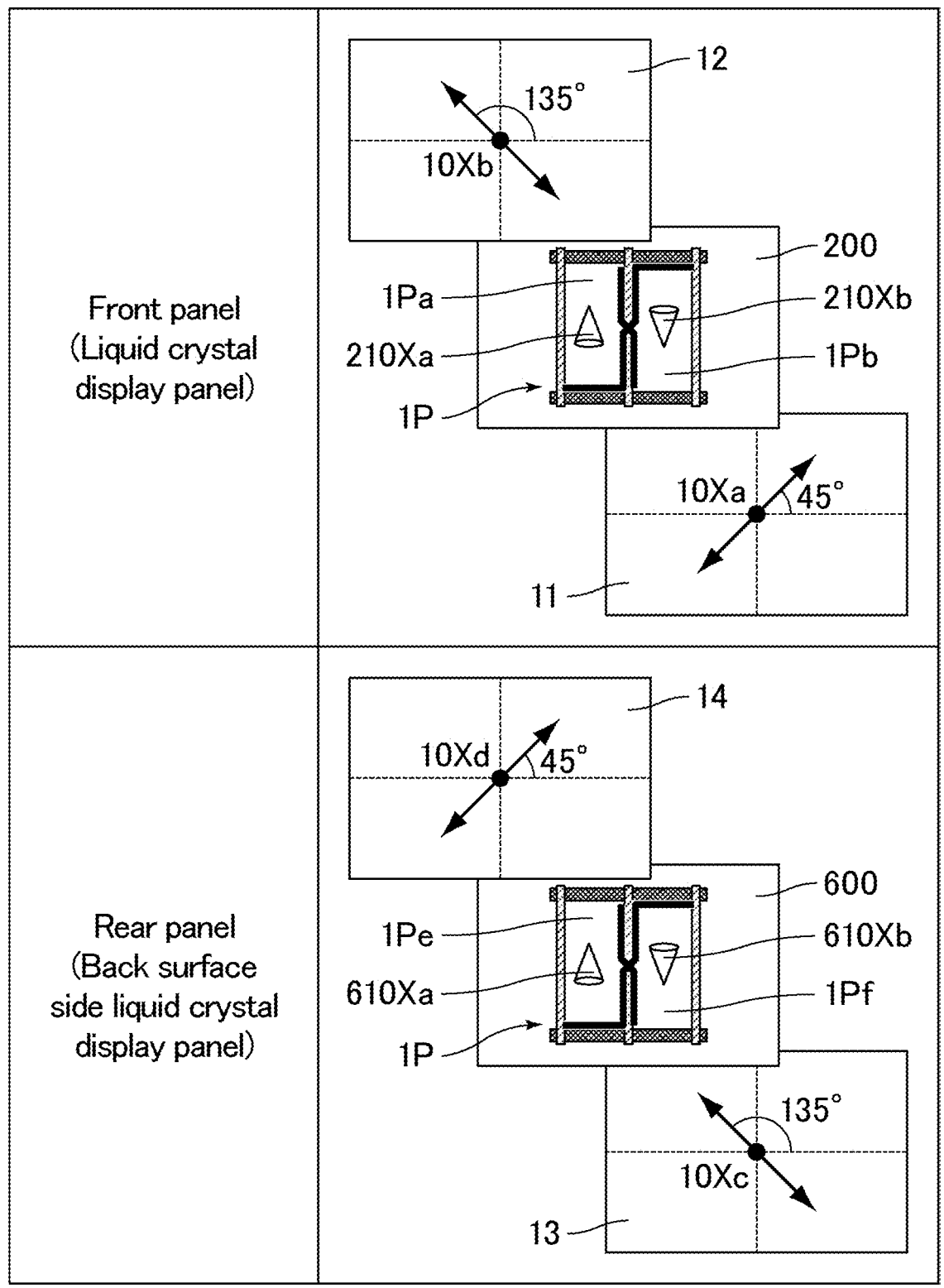
FIG. 47 includes front schematic views of display panels in the 3D display device of Embodiment 3 with the back surface side liquid crystal display panel in a 2D-ECB mode.
Figure 48:
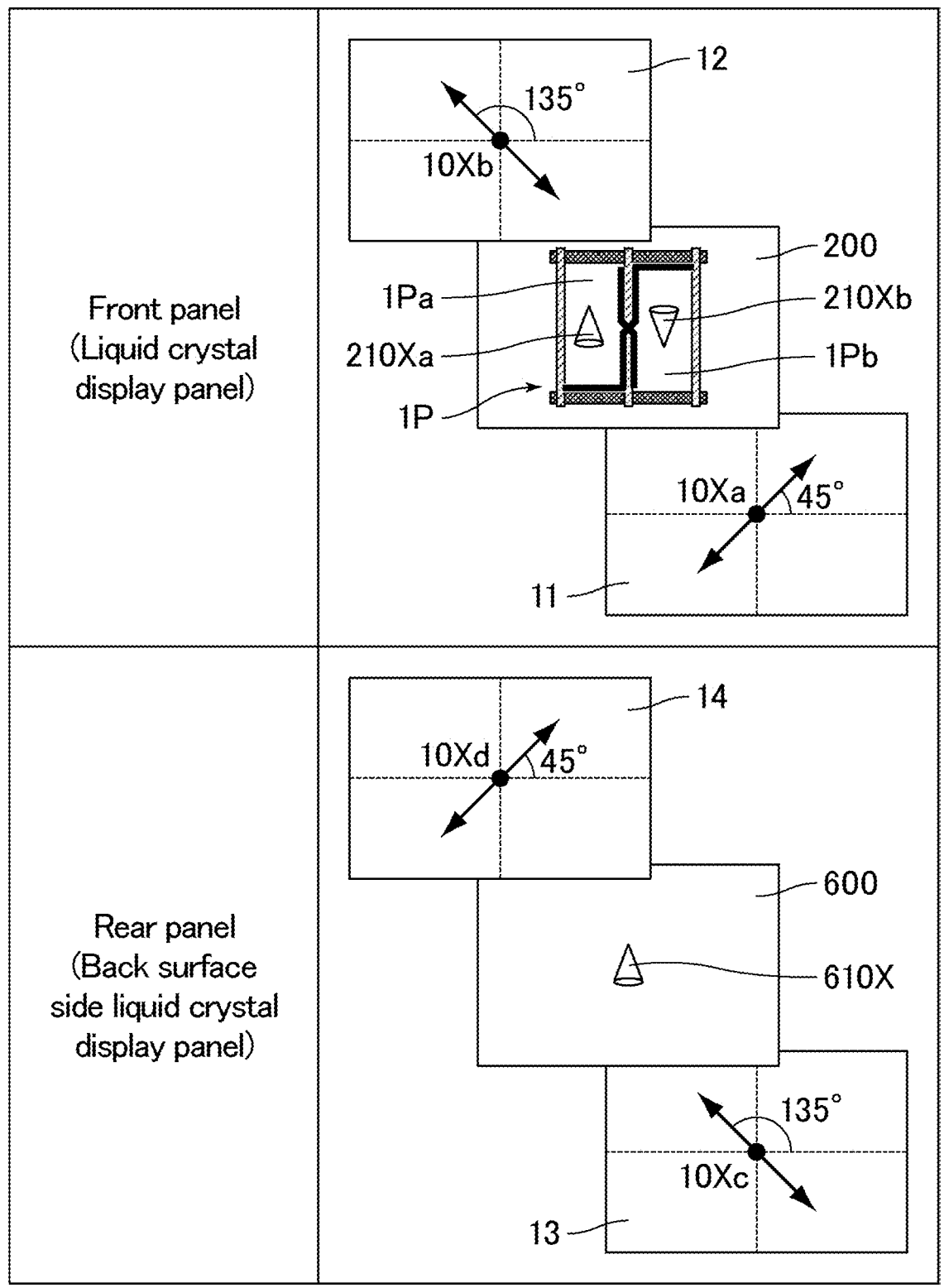
FIG. 48 includes front schematic views of display panels in the 3D display device of Embodiment 3 with the back surface side liquid crystal display panel in a 1D mode.

FIG. 45 is a schematic perspective view of a 3D display device of Embodiment 3. FIG. 46 is a schematic cross-sectional view of a back surface side liquid crystal display panel in the 3D display device of Embodiment 3. FIG. 47 includes front schematic views of display panels in the 3D display device of Embodiment 3 with the back surface side liquid crystal display panel in a 2D-ECB mode. FIG. 48 includes front schematic views of display panels in the 3D display device of Embodiment 3 with the back surface side liquid crystal display panel in a 1D mode.

A 3D display device 2000 of the present embodiment includes, as shown in FIG. 45 to FIG. 48, the liquid crystal display panel 1 and a back surface side liquid crystal display panel 4 at the back of the liquid crystal display panel 1. This configuration enables the image on the liquid crystal display panel 1 and the image on the back surface side liquid crystal display panel 4 to be superimposed with each other to form a 3D image (pop-out image). Also, the liquid crystal display panel 1, capable of preventing or reducing blurriness of a transmission image in the transparent display state as described above, can prevent or reduce blurriness of the image on the back surface side liquid crystal display panel 4 observed through the liquid crystal display panel 1. In addition, the liquid crystal display panel 1 sequentially includes, from the back surface side toward the viewing surface side, the first polarizing plate 11, the liquid crystal layer 200, and the second polarizing plate 12. The back surface side liquid crystal display panel 4 sequentially includes, from the back surface side toward the viewing surface side, the third polarizing plate 13, a back surface side liquid crystal layer 600, and the fourth polarizing plate 14. In a plan view, the polarization axis 10Xa of the first polarizing plate 11 is parallel to the polarization axis 10Xd of the fourth polarizing plate 14. This configuration enables reduction of a decrease in transmittance of the liquid crystal display panel 1. In a plan view, when the polarization axis of the first polarizing plate is shifted from the polarization axis of the fourth polarizing plate by 45°, the transmittance of the front panel is ½.

As described above, the 3D display device 2000 of the present embodiment includes the stack of the liquid crystal display panels to enable display of a 3D image. The liquid crystal display panel 1 on the viewing surface side is also referred to as a front panel. The back surface side liquid crystal display panel 4 on the back surface side is also referred to as a rear panel. In the 3D display device 2000 of the present embodiment, a 3D image can be achieved while a decrease in transmittance of the front panel is reduced and the blurriness of an image on the rear panel is reduced.

A polarization axis 10Xc of the third polarizing plate 13 and a polarization axis 10Xd of the fourth polarizing plate 14 may be perpendicular to each other (i.e., may be disposed in crossed Nicols) or may be parallel to each other (i.e., may be disposed in parallel Nicols), but are preferably perpendicular to each other.

In the 3D display device 2000 of the present embodiment, for example, the polarization axis 10Xa of the first polarizing plate 11 (for example, absorption axis) can be at an azimuth of 45°, the polarization axis 10Xb of the second polarizing plate 12 (for example, absorption axis) can be at an azimuth of 135°, the polarization axis 10Xc of the third polarizing plate 13 (for example, absorption axis) can be at an azimuth of 135°, and the polarization axis 10Xd of the fourth polarizing plate 14 (for example, absorption axis) can be at an azimuth of 45°.

In the 3D display device 2000, for example, the polarization axis 10Xa of the first polarizing plate 11 (for example, absorption axis) can be at an azimuth of 135°, the polarization axis 10Xb of the second polarizing plate 12 (for example, absorption axis) can be at an azimuth of 45°, the polarization axis 10Xc of the third polarizing plate 13 (for example, absorption axis) can be at an azimuth of 45°, and the polarization axis 10Xd of the fourth polarizing plate 14 (for example, absorption axis) can be at an azimuth of 135°.

The "azimuth" as used herein means the direction when the target direction is projected onto the screen of the liquid crystal display panel and is expressed as the angle (azimuth angle) between the direction above and the reference azimuth. Here, the reference azimuth (0°) is set to the right in the horizontal direction of the screen of the liquid crystal display panel. The angle and azimuth angle are measured as positive angles in the counterclockwise direction from the reference azimuth and as negative angles in the clockwise direction from the reference azimuth. The counterclockwise and clockwise directions are rotational directions when the screen of the liquid crystal display panel is observed from the viewing surface side (front). Also, the angle represents a value measured in a plan view of the liquid crystal display panel. Two straight lines (including axes and directions) being perpendicular to each other mean that they are perpendicular to each other in a plan view of the liquid crystal display panel.

In the liquid crystal display panel 1, the liquid crystal alignment axis 210Xa in the first domain 1Pa and the liquid crystal alignment axis 210Xb in the second domain 1Pb preferably form an angle of 42° or greater and 48° or smaller, more preferably 43° or greater and 47° or smaller, still more preferably 44° or greater and 46° or smaller, particularly preferably 45°, with the azimuths of the polarization axis 10Xa of the first polarizing plate 11 and the polarization axis 10Xb of the second polarizing plate 12. Here, based on approximation of the change in transmittance due to the angle formed as above to the sine curve, a change in transmittance due to a change in the angle by 3° is as small as 0.14%.

The 3D display device 2000 includes a light source 3 that irradiates the liquid crystal display panel 1 with light. The liquid crystal display panel 1 employs the field-sequential color (FSC) system to display an image. The light source 3 includes light-emitting elements that emit light rays of colors different from each other. This configuration enables color display even without color filters disposed in the liquid crystal display panel 1, improving the color gamut. The liquid crystal display panel 1 and the light source 3 define the see-through display 1000. Although the light source 3 is at the surface end of the liquid crystal display panel 1 in FIG. 45, the position of the light source 3 is not limited. The light source 3 may be on the back surface of the back surface side liquid crystal display panel 4, for example.

Here, typically, in a liquid crystal display device providing color display, a single pixel is divided into three sub-pixels, namely a red pixel in which a color filter that transmits red light is disposed, a green pixel in which a color filter that transmits green light is disposed, and a blue pixel in which a color filter that transmits blue light is disposed. The color filters disposed in the three sub-pixels enable color display. About ⅔ of the backlight illumination applied to the liquid crystal display panel is absorbed by these color filters. A liquid crystal display device employing the color filter system therefore has a low light use efficiency. In contrast, since the liquid crystal display panel 1 employs the FSC system to display an image and the light source 3 includes light-emitting elements that emit light rays of colors different from each other, the liquid crystal display panel 1 can provide color display without color filters. Thus, the liquid crystal display panel 1 exhibits a higher light use efficiency, a higher luminance, and a lower power consumption than the display device employing the color filter system. Also, since no color filters are used, the display device can be reduced in thickness.

Figure 49:
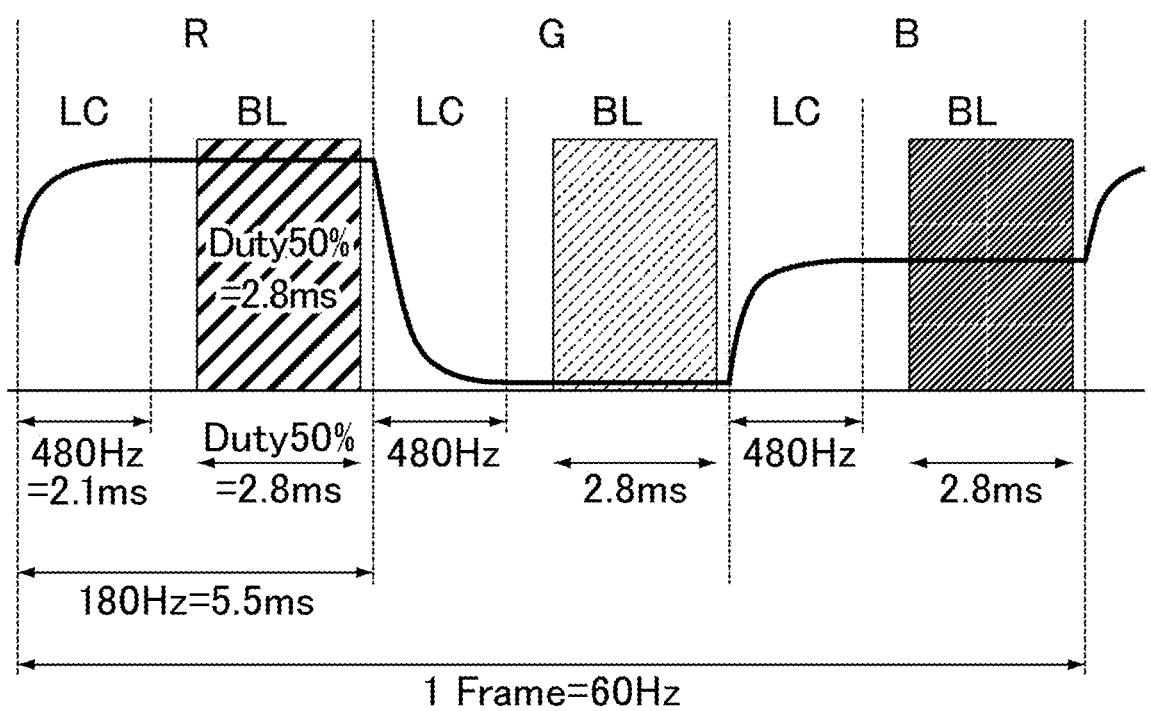
FIG. 49 shows the FSC driving of the liquid crystal display panel in the 3D display device of Embodiment 3.

FIG. 49 shows the FSC driving of the liquid crystal display panel in the 3D display device of Embodiment 3. In the liquid crystal display panel 1 employing the FSC system to display an image, as shown in FIG. 49, a single frame period, which is a display period of a single screen image, is divided into multiple fields. A field is also called a sub-frame. Throughout the following description, the term "field" is used. For example, a single frame period is divided into a field that displays a red screen image based on the red color component in an input image signal (red field), a field that displays a green screen image based on the green color component in the input image signal (green field), and a field that displays a blue screen image based on the blue color component in the input image signal (blue field). The primary colors are displayed one by one as described above to display a color image on the liquid crystal display panel.

As described above, the liquid crystal display panel 1 employing the FSC system to display an image provides color display by dividing a single frame period into multiple fields such that different colors are displayed in different fields. This enables elimination of color filters. The liquid crystal display panel employing the FSC system to display an image therefore has a light use efficiency that is about triple the light use efficiency of the liquid crystal display panel employing the color filter system to display an image. Thus, the liquid crystal display panel employing the FSC system to display an image is suitable for an increase in luminance and reduction in power consumption.

The liquid crystal display panel 1, as shown in FIG. 10, includes the light shielding member 130 in the boundary between the first domain 1Pa and the second domain 1Pb such that a dark line is generated under the light shielding member 130, i.e., the dark line portion is shielded from light. This enables alignment without dark lines. As a result, the mode efficiency can be increased to, for example, 100%.

As shown in FIG. 46, the back surface side liquid crystal display panel 4 sequentially includes, from the back surface side toward the viewing surface side, the third polarizing plate 13, a third substrate 500 including pixel electrodes 520 arranged in a matrix pattern in the row direction and the column direction, the third alignment film 23, a back surface side liquid crystal layer 600 containing liquid crystal molecules 610, the fourth alignment film 24, a fourth substrate 700 including a common electrode 720, and the fourth polarizing plate 14. The third substrate 500 includes an insulating substrate 510 on the back surface side of the pixel electrodes 520. The fourth substrate 700 includes an insulating substrate 710 on the viewing surface side of the common electrode 720.

The alignment of the liquid crystal molecules 610 is switched by applying voltage to the back surface side liquid crystal layer 600 using the pixel electrodes 520 and the common electrode 720. With no voltage applied between the pixel electrodes 520 and the common electrode 720, the third alignment film 23 and the fourth alignment film 24 control the initial alignment of the liquid crystal molecules 610. The expression "with no voltage applied between the pixel electrodes 520 and the common electrode 720" encompasses a state where voltage is not substantially applied between the pixel electrodes 520 and the common electrode 720, and refers to a state where the voltage applied to the back surface side liquid crystal layer 600 is lower than the threshold voltage.

The liquid crystal molecules 610 may be aligned substantially vertically or substantially horizontally, and preferably substantially vertically, to the main surface of the third substrate 500 or the fourth substrate 700 with no voltage applied.

Application of voltage between the pixel electrodes 520 and the common electrode 720 generates vertical electric fields in the back surface side liquid crystal layer 600, further significantly tilting the liquid crystal molecules 610 at the same tilt azimuth as in the state with no voltage applied.

Herein, the tilt azimuth of the liquid crystal molecules 610 is described as appropriate using an alignment vector in which in a plan view of the back surface side liquid crystal display panel 4, the third substrate 500 side long-axis end of each liquid crystal molecule 610 is defined as a start point (hereinafter, also referred to as the "liquid crystal director tail") 610S and the fourth substrate 700 side long-axis end of the liquid crystal molecule 610 as an end point (hereinafter, also referred to as the "liquid crystal director head") 610T. The alignment vector is in the same direction as the tilt azimuth of the liquid crystal molecules 610 relative to the third alignment film 23 on the third substrate 500 side and is in the opposite direction to the tilt azimuth of the liquid crystal molecules 610 relative to the fourth alignment film 24 on the fourth substrate 700 side. Voltage application to the liquid crystal molecules 610, aligned substantially vertically to a substrate (aligned at a slight angle) with no voltage applied, significantly tilts the liquid crystal molecules 610 at the same tilt azimuth as in the state with no voltage applied. Thus, the start point 610S and the end point 610T of the alignment vector may be determined while voltage is applied to the liquid crystal layer 600.

The back surface side liquid crystal display panel 4 of the present embodiment is preferably in the 2D-ECB/parallel alignment mode or 1D mode (specifically, TN mode). When the back surface side liquid crystal display panel 4 is in the 2D-ECB/parallel alignment mode, as shown in FIG. 47, the third alignment film 23 and the fourth alignment film 24 have been subjected to alignment treatment such that a third domain 1Pe and a fourth domain 1Pf in which the alignment vectors are different from each other are arranged side by side (adjacent to each other) in the column direction. In a plan view of the third domain 1Pe and the fourth domain 1Pf, a liquid crystal alignment axis 610Xa in the third domain 1Pe and a liquid crystal alignment axis 610Xb in the fourth domain 1Pf are parallel to each other. This configuration can achieve a high luminance, a high contrast ratio, and a high color gamut, as well as favorable viewing angle characteristics. Specifically, the third alignment film 23 and the fourth alignment film 24 have been subjected to alignment treatment such that, in each pixel 1P superimposed with a single pixel electrode 520, the third domain 1Pe and the fourth domain 1Pf in which the alignment vectors are different from each other are arranged side by side (adjacent to each other) in the column direction.

In the present embodiment, the case is described where the third alignment film 23 and the fourth alignment film 24 have been subjected to alignment treatment such that the third domain 1Pe and the fourth domain 1Pf in which the alignment vectors are different from each other are arranged side by side (adjacent to each other) in the column direction inside each pixel 1P superimposed with a single pixel electrode 520. However, the third alignment film 23 and the fourth alignment film 24 may be subjected to alignment treatment such that only the third domain 1Pe is in one of a third pixel and a fourth pixel superimposed with respective pixel electrodes adjacent to each other in the column direction and only the fourth domain 1Pf is in the other of the third pixel and the fourth pixel.

In the present embodiment, inside each pixel 1P, the third domain 1Pe and the fourth domain 1Pf in which the alignment vectors are different from each other are arranged side by side (adjacent to each other) in the column direction. These domains can be formed by performing different alignment treatments on the third alignment film 23 and the fourth alignment film 24. With voltage applied, the liquid crystal molecules 610 in each domain are tilted at an angle according to the alignment vector of the domain.

In a plan view of the third domain 1Pe and the fourth domain 1Pf, preferably, the liquid crystal alignment axis 610Xa in the third domain 1Pe and the liquid crystal alignment axis 610Xb in the fourth domain 1Pf obliquely intersect the polarization axis 10Xc of the third polarizing plate 13 and the polarization axis 10Xd of the fourth polarizing plate 14.

In the back surface side liquid crystal display panel 4, the liquid crystal alignment axis 610Xa in the third domain 1Pe and the liquid crystal alignment axis 610Xb in the fourth domain 1Pf preferably form an angle of 42° or greater and 48° or smaller, more preferably 43° or greater and 47° or smaller, still more preferably 44° or greater and 46° or smaller, particularly preferably 45°, with the azimuths of the polarization axis 10Xc of the third polarizing plate 13 and the polarization axis 10Xd of the fourth polarizing plate 14. Here, based on approximation of the change in transmittance due to the angle formed as above to the sine curve, a change in transmittance due to a change in the angle by 3° is as small as 0.14%.

When the back surface side liquid crystal display panel 4 is in the 1D mode (specifically, TN mode), as shown in FIG. 48, the third alignment film 23 and the fourth alignment film 24 have been subjected to alignment treatment such that the alignment treatment directions are perpendicular to each other. This configuration can achieve a high luminance, a high contrast ratio, and a high color gamut.

As shown in FIG. 48, in the back surface side liquid crystal display panel 4, an average liquid crystal alignment axis 610X preferably forms an angle of 42° or greater and 48° or smaller, more preferably 43° or greater and 47° or smaller, still more preferably 44° or greater and 46° or smaller, particularly preferably 45°, with the azimuths of the polarization axis 10Xc of the third polarizing plate 13 and the polarization axis 10Xd of the fourth polarizing plate 14. Here, based on approximation of the change in transmittance due to the angle formed as above to the sine curve, a change in transmittance due to a change in the angle by 3° is as small as 0.14%.

The 3D display device 2000 includes a backlight 4A that irradiates the back surface side liquid crystal display panel 4 with light. The backlight 4A is one commonly used in the field of liquid crystal display devices. The back surface side liquid crystal display panel 4 includes color filters and allows light from the backlight 4A to pass through the color filters to provide color display.

The distance between the liquid crystal display panel 1 and the back surface side liquid crystal display panel 4 is preferably 1 cm or longer. This enables a 3D image more effectively. The distance between the liquid crystal display panel 1 and the back surface side liquid crystal display panel 4 is preferably 5 cm or longer. This enables prevention or reduction of moiré due to optical interference in a stack of components with periodic patterns such as pixels. The upper limit of the distance between the liquid crystal display panel 1 and the back surface side liquid crystal display panel 4 is not limited. Yet, when the 3D display device 2000 is used as a display device, the distance between the liquid crystal display panel 1 and the back surface side liquid crystal display panel 4 is, for example, 5 cm or longer and 10 cm or shorter. When the 3D display device 2000 is used as a showcase, the distance between the liquid crystal display panel 1 and the back surface side liquid crystal display panel 4 is, for example, 10 cm or longer and 70 cm or shorter, particularly substantially 30 cm. When the 3D display device 2000 is used as a shop window, the distance between the liquid crystal display panel 1 and the back surface side liquid crystal display panel 4 is, for example, 70 cm or longer and 130 cm or shorter, particularly substantially 100 cm.

In this manner, in the present embodiment, the liquid crystal display panel 1 (front panel) having the see-through function is stacked together with the back surface side liquid crystal display panel 4 (rear panel) with a space in between, and the image on the liquid crystal display panel 1 and the image on the back surface side liquid crystal display panel 4 are superimposed with each other, so that the ray space is approximately produced based on the difference in focal length. This can produce a pop-out image effect similar to the autostereoscopic effect. The 3D display device 2000 of the present embodiment is applicable to amusement devices, for example.

When the 3D display device 2000 is used for an amusement device, the distance between the liquid crystal display panel 1 and the back surface side liquid crystal display panel 4 is preferably 1 cm or longer and 10 cm or shorter, more preferably 5 cm or longer and 7 cm or shorter.

Figure 50:
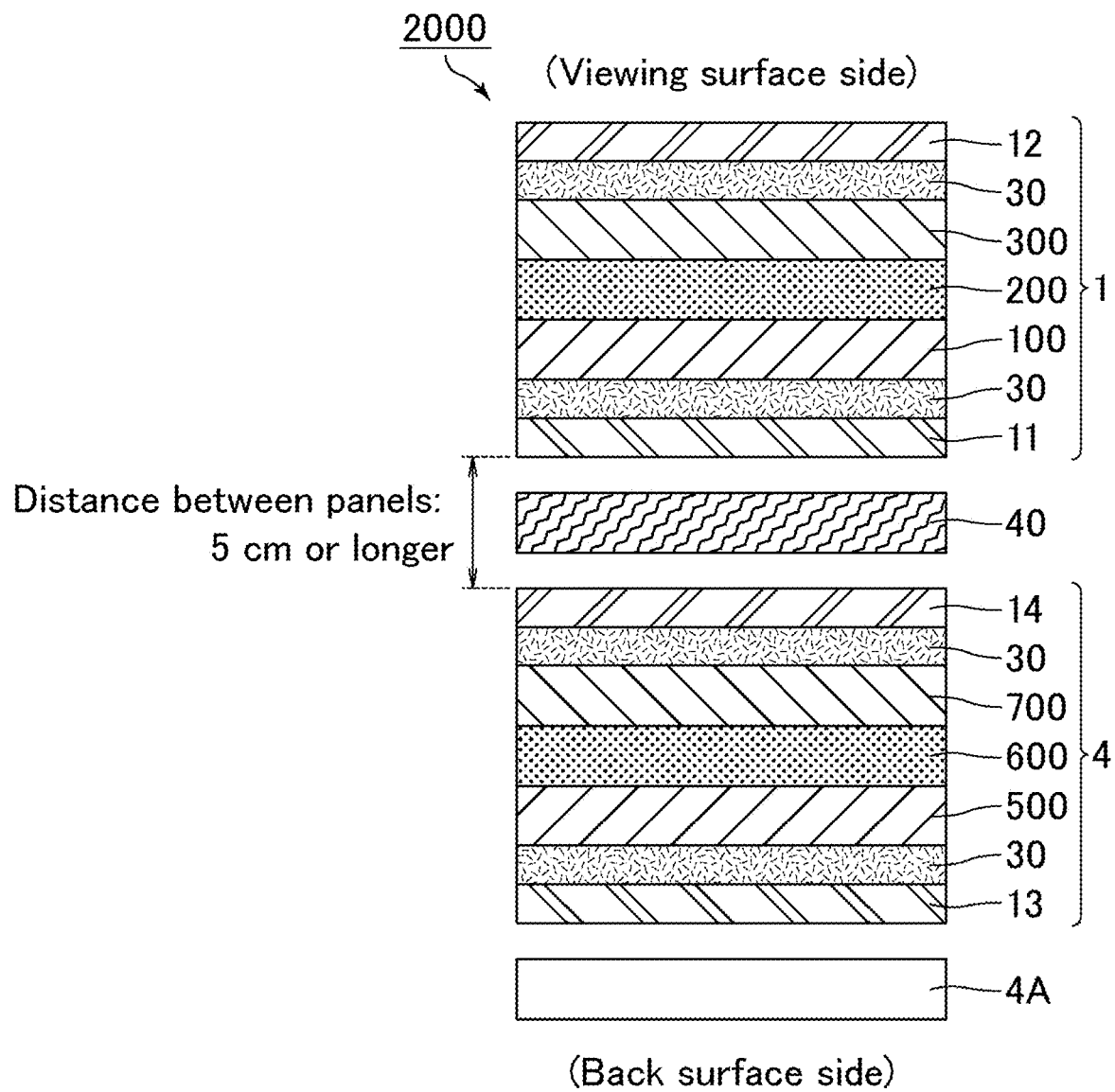
FIG. 50 is a schematic cross-sectional view of the structure of the 3D display device of Embodiment 3 in the case of including a scattering film.

FIG. 50 is a schematic cross-sectional view of the structure of the 3D display device of Embodiment 3 in the case of including a scattering film. The 3D display device 2000 preferably includes, as shown in FIG. 50, a scattering film 40 between the liquid crystal display panel 1 and the back surface side liquid crystal display panel 4. This enables prevention or reduction of moiré.

The scattering film 40 functions to scatter light. The scattering film 40 contains, for example, a light scattering agent. The light scattering agent is particles having a nature of scattering light and is roughly classified into inorganic fillers and organic fillers. Examples of the inorganic fillers include silica, aluminum hydroxide, aluminum oxide, zinc oxide, barium sulfate, magnesium silicate, and mixtures of any of these. Specific examples of materials of the organic fillers include acrylic resin, acrylonitrile resin, polyurethane, polyvinyl chloride, polystyrene, polyamide, polyacrylonitrile, and silicone resin. In particular, acrylic resin which has high transparency is preferred, and polymethyl methacrylate (PMMA) is particularly preferred.

The light scattering agent may have any shape such as a spherical shape, a cuboid shape, an acicular shape, a rod-like shape, a spindle shape, a plate shape, a scaly shape, or a fibrous shape. In particular, spherical beads which have excellent light diffusion properties are preferred.

The average particle size of the light scattering agent when the light scattering agent is an organic filler is preferably 0.5 to 6 µm, more preferably 1 to 6 µm, still more preferably 1 to 5 µm. The light scattering agent having an average particle size of smaller than 0.5 µm may not achieve a sufficient light scattering effect. The light scattering agent having an average particle size of 6 µm or greater may have a higher degree of surface unevenness to reduce the adhesion to a polarizing plate.

In the 3D display device 2000 in FIG. 50, a regular adhesive 30 is used between the first substrate 100 and the first polarizing plate 11, between the second substrate 300 and the second polarizing plate 12, between the third substrate 500 and the third polarizing plate 13, and between the fourth substrate 700 and the fourth polarizing plate 14 to bond them together.

The regular adhesive 30 is a transparent adhesive causing no light scattering. The regular adhesive 30 has a total light transmittance of 85% or higher and 95% or lower and a transmittance haze of 0% or higher and 5% or lower. For example, the regular adhesive 30 has a total light transmittance of 91% and a transmittance haze of 0%. The regular adhesive 30 has the property of glass, for example. The regular adhesive 30 has a function of bonding a substrate and a polarizing plate, and preferably has only the function of bonding a substrate and a polarizing plate.

There is a trade-off relationship between the moiré and the transmittance. A decrease in transmittance caused by using the scattering film 40 is preferably kept to 10% or less, more preferably to 5% or less.

Figure 51:
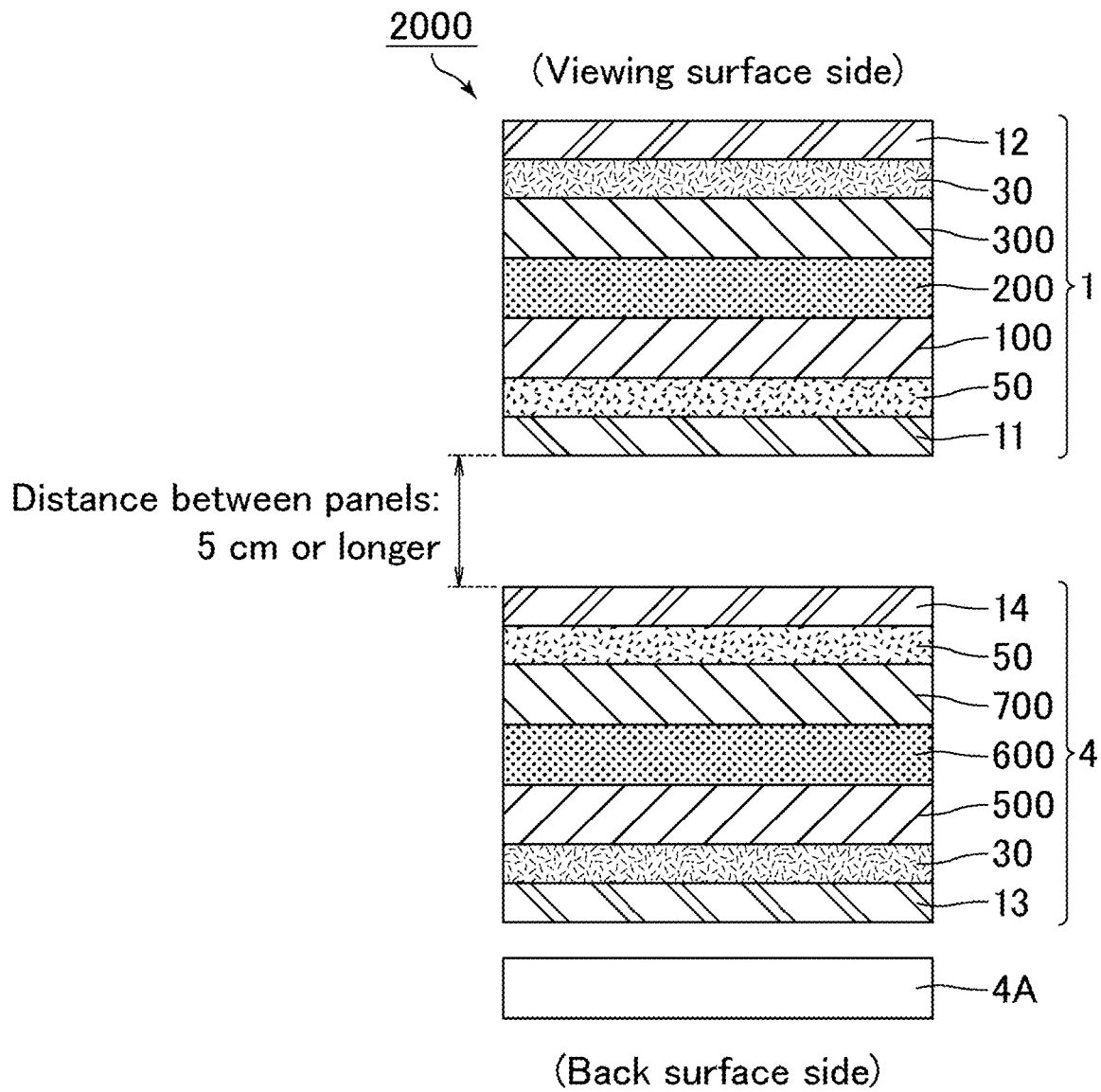
FIG. 51 is a schematic cross-sectional view of the structure of the 3D display device of Embodiment 3 in the case where the liquid crystal display panel and the back surface side liquid crystal display panel are bonded to each other with a diffusion adhesive.

FIG. 51 is a schematic cross-sectional view of the structure of the 3D display device of Embodiment 3 in the case where the liquid crystal display panel and the back surface side liquid crystal display panel are bonded to each other with a diffusion adhesive. The 3D display device 2000 preferably includes, as shown in FIG. 51, a diffusion adhesive 50 at least one of between the first polarizing plate 11 and the first substrate 100, between the second polarizing plate 12 and the second substrate 300, between the third polarizing plate 13 and the third substrate 500, and between the fourth polarizing plate 14 and the fourth substrate 700. This enables prevention or reduction of moiré. The diffusion adhesive 50 is more advantageous than the scattering film 40 in terms of the cost.

The diffusion adhesive 50 causes light scattering. The diffusion adhesive 50 has a total light transmittance of 85% or higher and 95% or lower and a transmittance haze of 65% or higher and 70% or lower. For example, the diffusion adhesive 50 has a total light transmittance of 91% and a transmittance haze of 67%. The diffusion adhesive 50 has not only a function of bonding but also a function of scattering transmitted light.

The 3D display device 2000 more preferably includes the diffusion adhesive 50 between the first polarizing plate 11 and the first substrate 100 and between the fourth polarizing plate 14 and the fourth substrate 700. This enables more effective prevention or reduction of moiré.

In the 3D display device 2000 in FIG. 51, the diffusion adhesive 50 is used to bond the first substrate 100 and the first polarizing plate 11 together and the fourth polarizing plate 14 and the fourth substrate 700 together, while the regular adhesive 30 is used to bond the second substrate 300 and the second polarizing plate 12 together and the third substrate 500 and the third polarizing plate 13 together.

There is a trade-off relationship between the moiré and the transmittance. A decrease in transmittance caused by using the diffusion adhesive 50 is preferably kept to 10% or less, more preferably to 5% or less.

The 3D display device 2000 of the present embodiment includes the back surface side liquid crystal display panel 4 at the back of the liquid crystal display panel 1. However, the display panel at the back of the liquid crystal display panel 1 is not limited to the back surface side liquid crystal display panel 4. For example, a spontaneous light display or a digital signage display, for example, can be used instead of the back surface side liquid crystal display panel 4 such that the display appears as the background.

The embodiments of the present invention have been described above. Each and every matter described above is applicable to the general aspects of the present invention.

EXAMPLES

Hereinbelow, the present invention is described in more detail based on examples and comparative examples. The present invention is not limited to these examples.

Example 1

A liquid crystal display panel of Example 1 was produced which had the same structure as the liquid crystal display panel of Embodiment 1 in FIG. 1 to FIG. 9. The pixel pitch was 120 μm×360 μm and the tilt angle was 88.6°. The pixel electrodes 120 were provided with no slit.

Comparative Example 1-1

A liquid crystal display panel of Comparative Example 1-1 was produced which had the same structure as that of Example 1, except that the 2D-ECB/mountain-shaped mode was employed.

Comparative Example 1-2

A liquid crystal display panel of Comparative Example 1-2 was produced which had the same structure as that of Example 1, except that the 4D-ECB/mountain-shaped mode was employed.

Comparative Example 1-3

A liquid crystal display panel of Comparative Example 1-3 was produced which had the same structure as that of Example 1, except that the 4D-RTN mode was employed.

Evaluation on Example 1 and Comparative Examples 1-1 to 1-3

Figure 16:
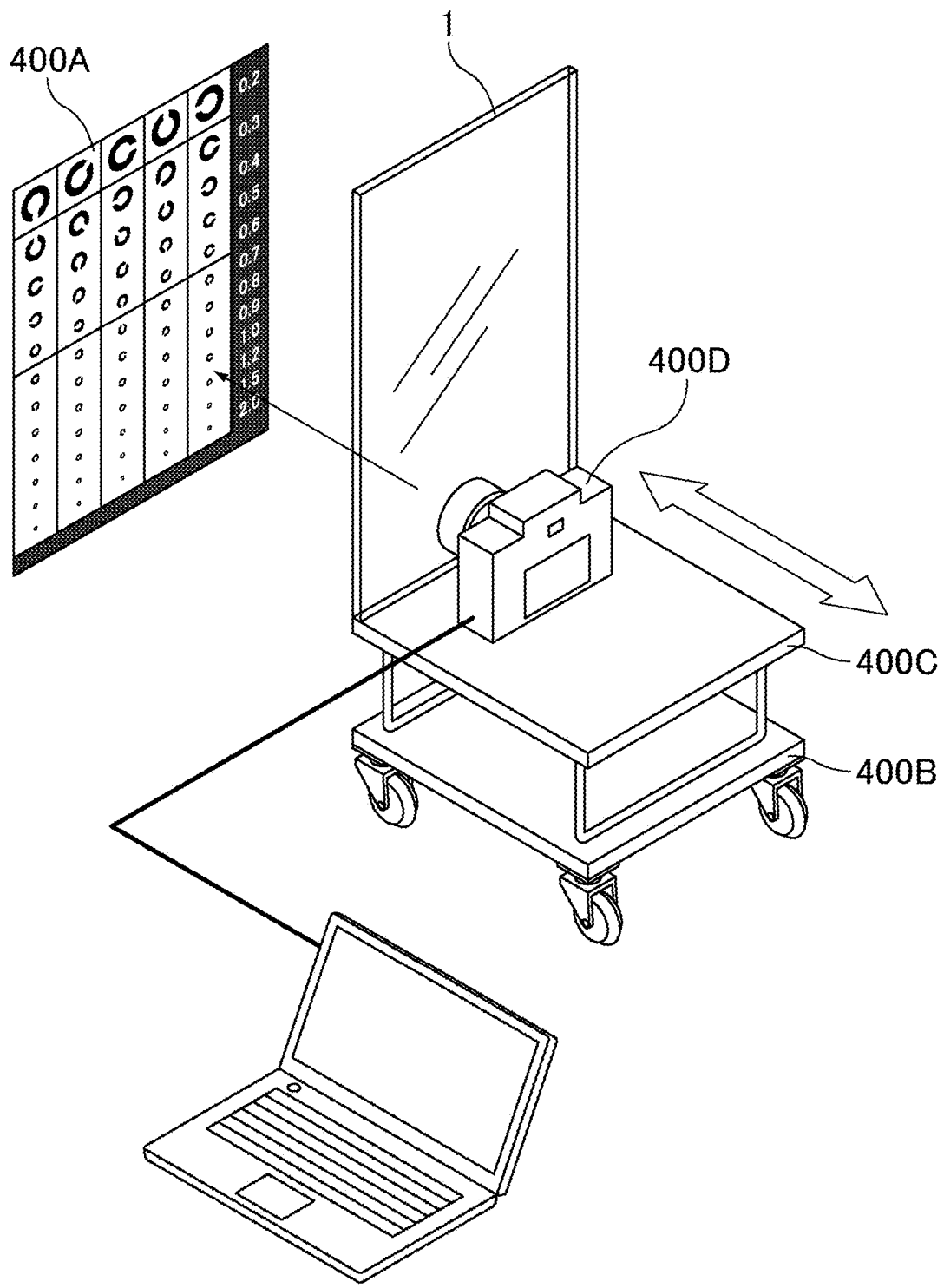
FIG. 16 is a schematic view of a system for evaluating blurriness of a transmission image.
Figure 17:
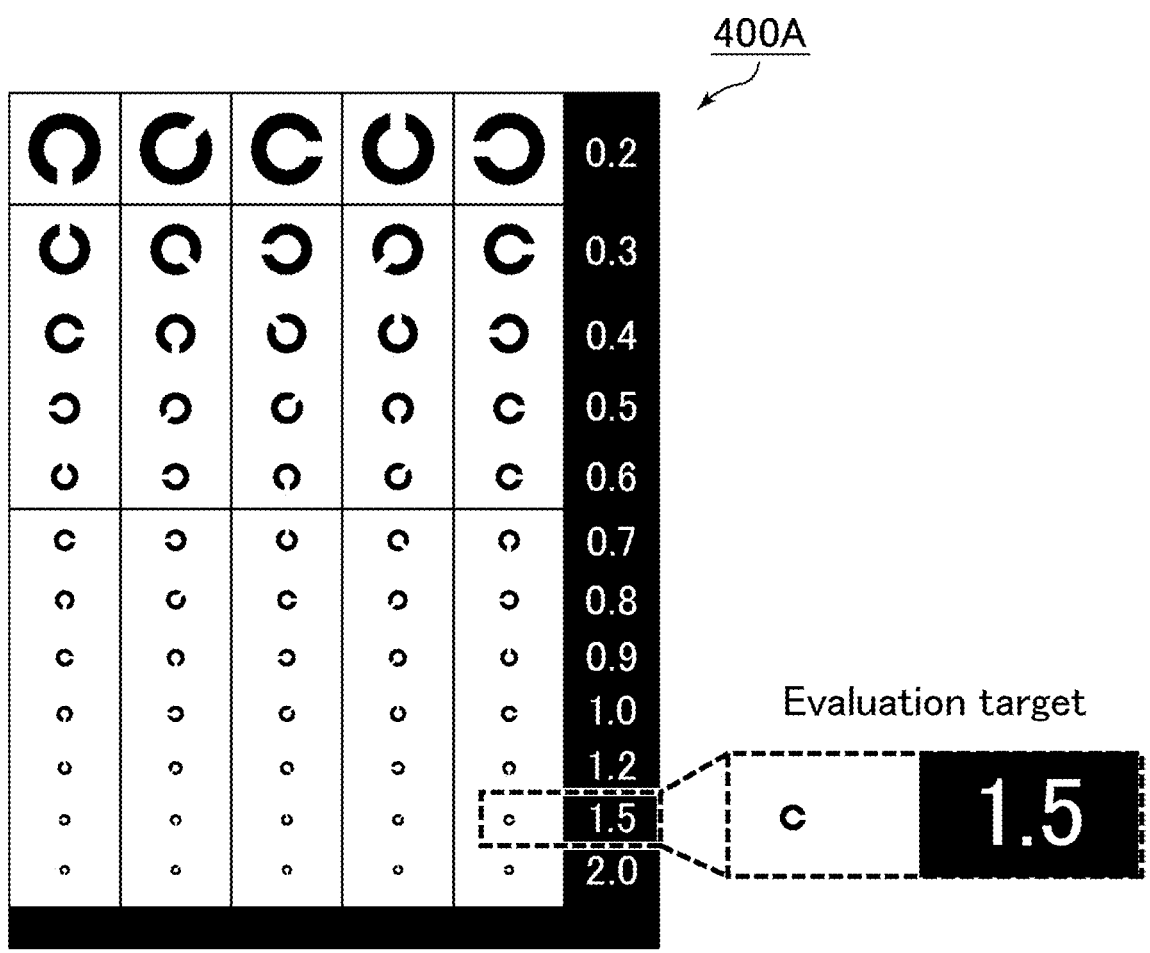
FIG. 17 shows the evaluation target of an eye test chart used to evaluate the blurriness of the transmission image.
Figure 18:
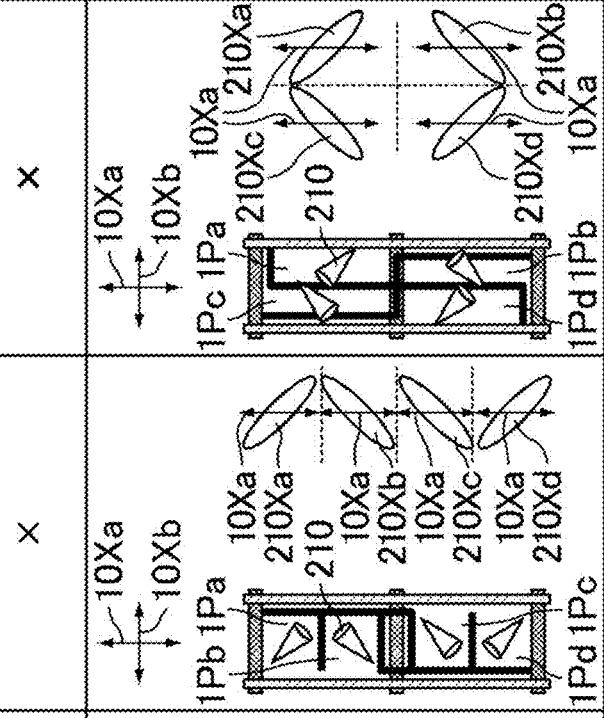
FIG. 18 is a comparison table of the evaluation results of the transmission image through the liquid crystal display panels of Example 1 and Comparative Examples 1-1 to 1-3.

FIG. 16 is a schematic view of a system for evaluating blurriness of a transmission image. FIG. 17 shows the evaluation target of an eye test chart used to evaluate the blurriness of the transmission image. The blurriness of a transmission image through each of the liquid crystal display panels of Example 1 and Comparative Examples 1-1 to 1-3 was evaluated using the evaluation system in FIG. 16. Specifically, an eye test chart 400A in FIG. 16 and FIG. 17 was attached to a light source (backlight), and the liquid crystal display panel 1 to be evaluated and a camera 400D were fixed to a jig 400C mounted on a cart 400B. The distance between the eye test chart 400A and the liquid crystal display panel 1 was varied to 10 cm, 50 cm, and 200 cm. The blurriness of the transmission image at each distance was evaluated. FIG. 18 shows the results.

FIG. 18 is a comparison table of the evaluation results of the transmission image through the liquid crystal display panels of Example 1 and Comparative Examples 1-1 to 1-3. The results in FIG. 18 confirmed that the 2D-ECB/parallel alignment eliminated the blurriness of the transmission image at any distance.

FIG. 19 is a graph of the sharpness of the transmission image through the liquid crystal display panels of Example 1 and Comparative Examples 1-1 to 1-3. With each of the liquid crystal display panels of Example 1 and Comparative Examples 1-1 to 1-3, the distance between the eye test chart (object) and the liquid crystal display panel was varied to determine the sharpness of the transmission image relative to the distance between the object and the panel. The sharpness represents the highest visual acuity with which the locations of the gaps of the Landolt rings are distinguishable. For example, when the locations of the gaps of the Landolt rings equivalent to visual acuity of 1.2 (equivalent to 20/16 vision) were distinguished but the locations of the gaps of the Landolt rings equivalent to visual acuity of 1.5 (equivalent to 20/13 vision) were not distinguished, the sharpness was determined as 1.2. FIG. 19 shows the results. The results in FIG. 19 confirmed that the 2D-ECB/parallel alignment eliminated the blurriness of the transmission image at any distance.

The results thus confirmed that the blurriness was eliminated when the liquid crystal alignment axes in the domains were parallel and were at azimuths different from each other by 180 degrees and the liquid crystal alignment axis/axes intersected the polarizing plate axis/axes at the same angle in each domain. At this time, the transmission image was not blurred regardless of the distance between the object and the panel.

A 1D mode causes inversion of the viewing angle, and thus requires 2 or more domains. According to Example 1 and Comparative Examples 1-1 to 1-3, the transmission image was blurred in a 4D mode, and thus a 2D mode should be selected. The results confirmed that the 2D-ECB/parallel alignment provided the conditions where the transmission image was not blurred.

Examples 2-1 to 2-2

A liquid crystal display panel of Example 2-1 was produced which had the same structure as the 2D-ECB/normally facing mode liquid crystal display panel of Embodiment 2 in FIG. 11 to FIG. 13.

A liquid crystal display panel of Example 2-2 was produced which had the same structure as the 2D-ECB/oppositely facing mode liquid crystal display panel of Embodiment 2 in FIG. 11 to FIG. 13.

Evaluation on Examples 1, 2-1 to 2-2 and Comparative Example 1-1

FIG. 20 is a comparison table of the evaluation results of a transmission image through the liquid crystal display panels of Example 1, Examples 2-1 and 2-2, and Comparative Example 1-1. The distance between the eye test chart and the liquid crystal display panel was set to 100 cm and the blurriness of the transmission image was evaluated. FIG. 20 shows the results.

As shown in FIG. 20, the 2D-ECB/normally facing mode and the 2D-ECB/oppositely facing mode did not blur the transmission image presumably because the liquid crystal alignment azimuth angles in the domains were different from each other by 180° and thus produced a single liquid crystal alignment axis. In contrast, the mode in which the liquid crystal alignment azimuth angles were different from each other by 90° as in Comparative Example 1-1 blurred the transmission image presumably because the mode produced two liquid crystal alignment axes.

Evaluation on Examples 1, 2-1 to 2-2 and Comparative Examples 1-1 to 1-3

Figure 21:
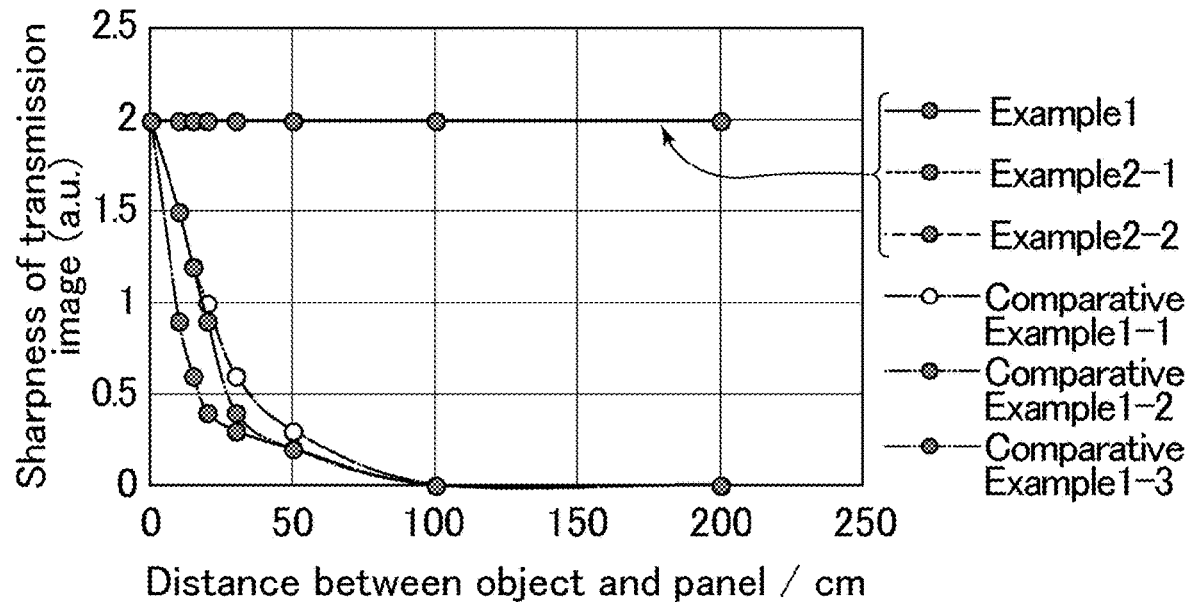
FIG. 21 is a graph of the sharpness of the transmission image through the liquid crystal display panels of Example 1, Examples 2-1 and 2-2, and Comparative Examples 1-1 to 1-3.

FIG. 21 is a graph of the sharpness of the transmission image through the liquid crystal display panels of Example 1, Examples 2-1 and 2-2, and Comparative Examples 1-1 to 1-3. With each of the liquid crystal display panels of Examples 1 and 2-1 to 2-2 and Comparative Examples 1-1 to 1-3, the distance between the eye test chart (object) and the liquid crystal display panel was varied to determine the sharpness of the transmission image relative to the distance between the object and the panel. FIG. 21 shows the results. The results in FIG. 21 confirmed that an alignment method producing a single liquid crystal alignment axis, such as the 2D-ECB/parallel alignment mode, the 2D-ECB/normally facing mode, or the 2D-ECB/oppositely facing mode, eliminated the blurriness of the transmission image at any distance.

Example 3-1

Figure 22:
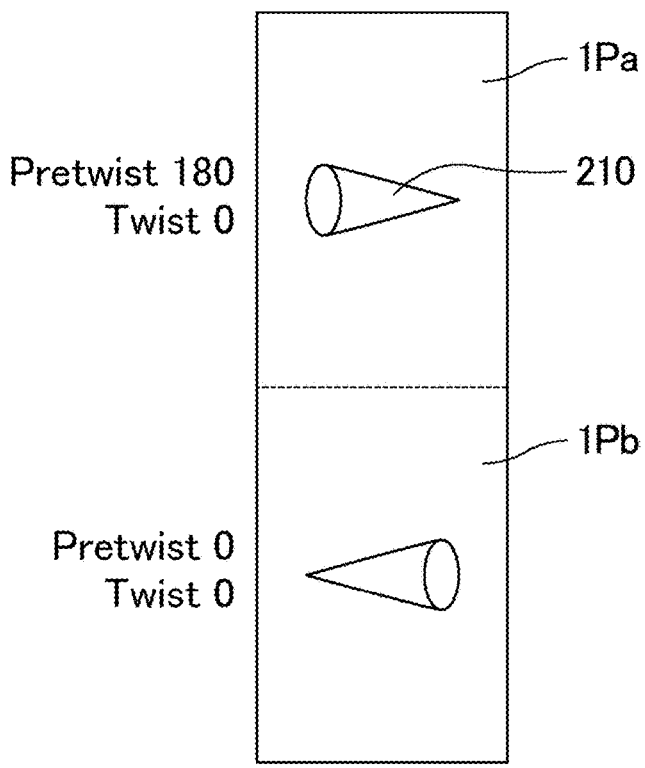
FIG. 22 is a schematic plan view of the liquid crystal alignment in a liquid crystal display panel of Example 3-1.

FIG. 22 is a schematic plan view of the liquid crystal alignment in a liquid crystal display panel of Example 3-1. The liquid crystal display panel of Example 3-1 in FIG. 22 was produced which had the same structure as the liquid crystal display panel of Example 1, except that the tilt angle was 85.0°. In FIG. 22, the direction to the right on the paper is 0°, the direction to the top is 90°, and the direction to the left is 180°. Pretwist indicates the azimuth angle at which the liquid crystal molecules tilt on the lower substrate (the side closer to the first substrate 100). Twist indicates the azimuth angle at which the liquid crystal molecules tilt on the upper substrate (the side closer to the second substrate 300) relative to Pretwist. In other words, "Twist 0" means that the azimuth angle at which the liquid crystal molecules tilt is the same on the lower substrate and the upper substrate. The azimuth angles at which the liquid crystal molecules tilt in the liquid crystal display panel of Example 1 were also the angles in FIG. 22 as in Example 3-1.

Evaluation on Examples 1 and 3-1

FIG. 23 shows the simulation results of dark lines in the liquid crystal display panels of Examples 1 and 3-1. FIG. 24 is a graph of transmittance versus applied voltage in the liquid crystal display panels of Examples 1 and 3-1. The dark lines and transmittance of the liquid crystal display panels of Examples 1 and 3-1 were evaluated by simulation. The transmittance was determined based on the transmittance of the screen with an entirely white image (grayscale value of 255) in the simulation being taken as a transmittance of 1. FIG. 23 and FIG. 24 show the results.

In Examples 1 and 3-1, the dark line width reduction effect of a small tilt material was evaluated by simulation. In the parallel alignment, no slit was formed in the boundary between domains. The results in FIG. 23 confirmed that the liquid crystal display panel of Example 3-1 having a smaller tilt angle more reduced the width of a dark line than the liquid crystal display panel of Example 1. The results in FIG. 24 confirmed that the smaller tilt material also achieved a higher transmittance.

Examples 3-2 to 3-5

Liquid crystal display panels of Examples 3-2, 3-3, 3-4, and 3-5 were produced which had the same structure as the liquid crystal display panel of Example 1, except that the tilt angles were 89.0°, 86.7°, 85.9°, and 82.1°, respectively.

Evaluation on Examples 3-2 to 3-5

Figure 25:
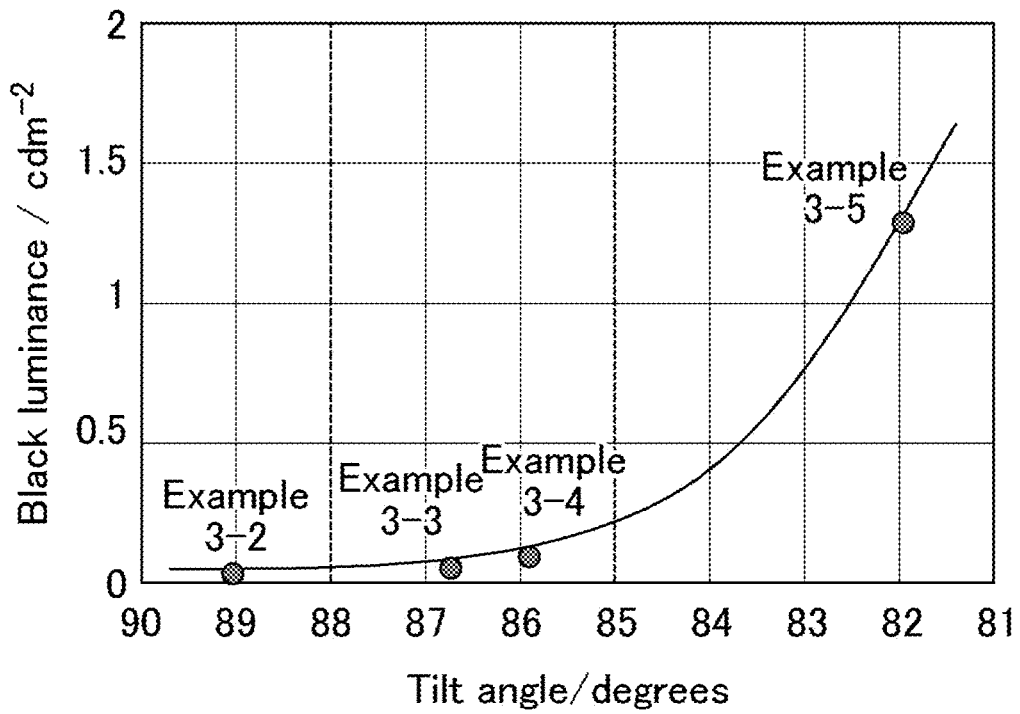
FIG. 25 is a graph of black luminance versus tilt angle in liquid crystal display panels of Examples 3-2 to 3-5.
Figure 26:
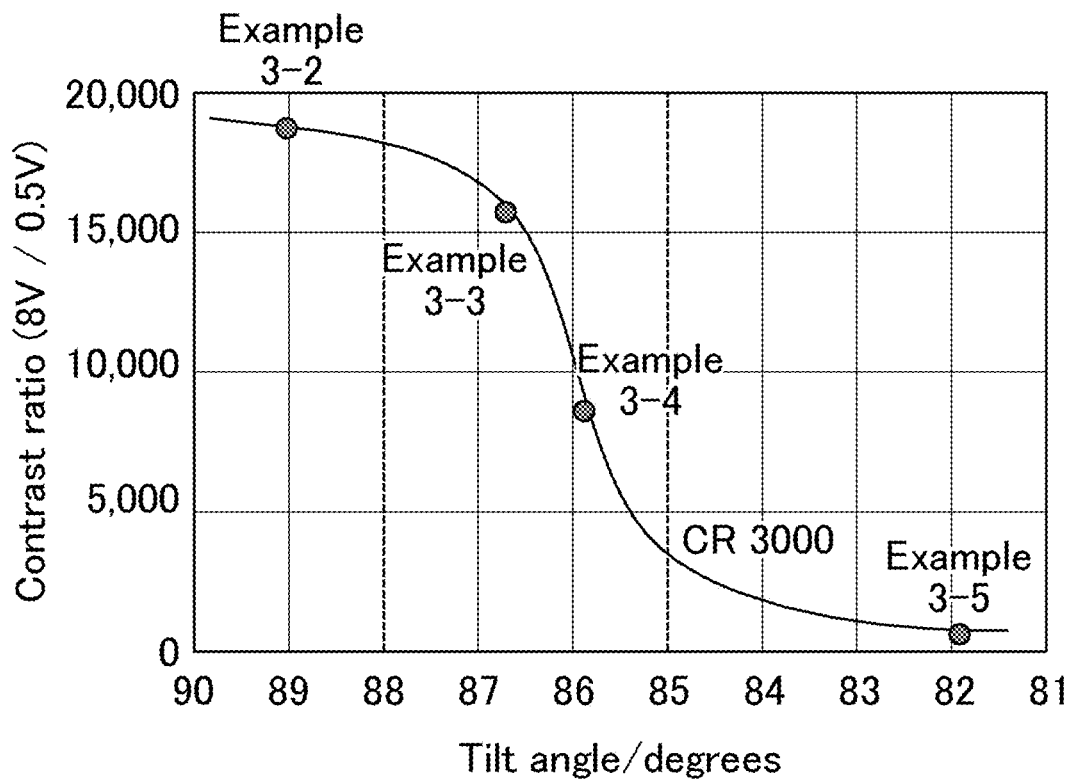
FIG. 26 is a graph of contrast ratio versus tilt angle in the liquid crystal display panels of Examples 3-2 to 3-5.
Figure 27:
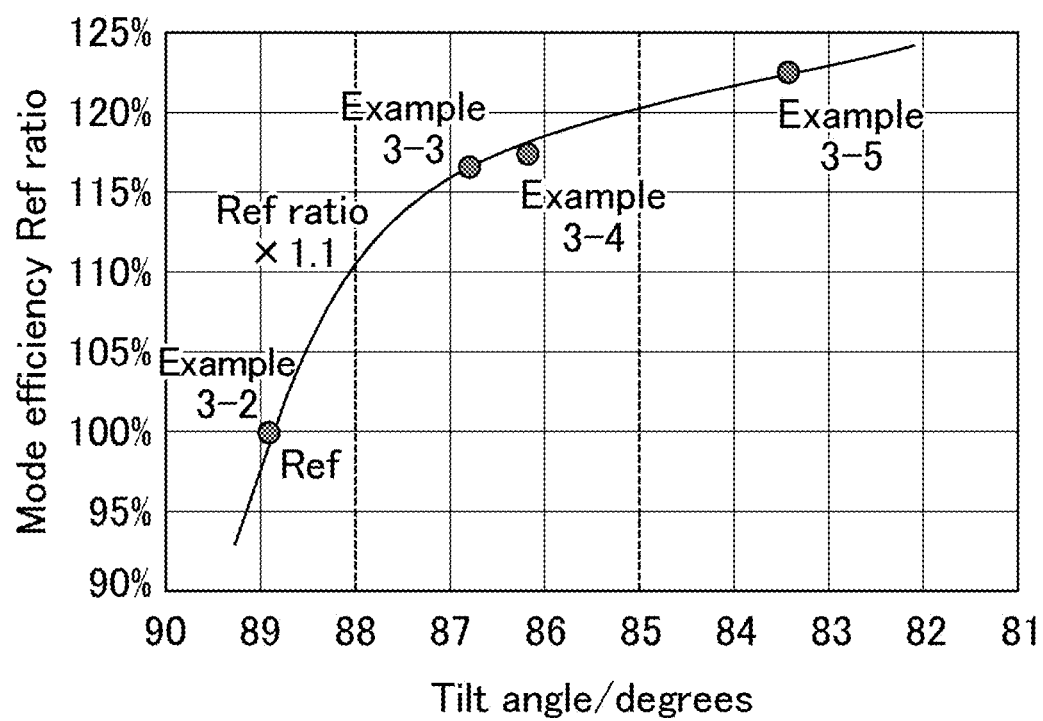
FIG. 27 is a graph of mode efficiency versus tilt angle in the liquid crystal display panels of Examples 3-2 to 3-5.

FIG. 25 is a graph of black luminance versus tilt angle in liquid crystal display panels of Examples 3-2 to 3-5. FIG. 26 is a graph of contrast ratio versus tilt angle in the liquid crystal display panels of Examples 3-2 to 3-5. FIG. 27 is a graph of mode efficiency versus tilt angle in the liquid crystal display panels of Examples 3-2 to 3-5.

The black luminance, contrast ratio, and mode efficiency of the liquid crystal display panels of Examples 3-2 to 3-5 were measured. FIG. 25, FIG. 26, and FIG. 27 show the results.

FIG. 25, FIG. 26, and FIG. 27 show that the preferred tilt angle was 81° or greater and 89° or smaller. The results also show that, in consideration of the trade-off relationship between the mode efficiency and the properties including the black luminance and the contrast ratio, the more preferred angle was 85° or greater and 88° or smaller. A smaller tilt angle results in a higher mode efficiency, but involves a higher black luminance and a lower contrast ratio. The results show that the tilt angle should be 88° or smaller to achieve a mode efficiency that is 1.1 times or more the reference value, and the tilt angle should be 85° or greater to achieve a contrast ratio of 3000 or higher.

Examples 4-1-1 to 4-1-3

Figure 28:
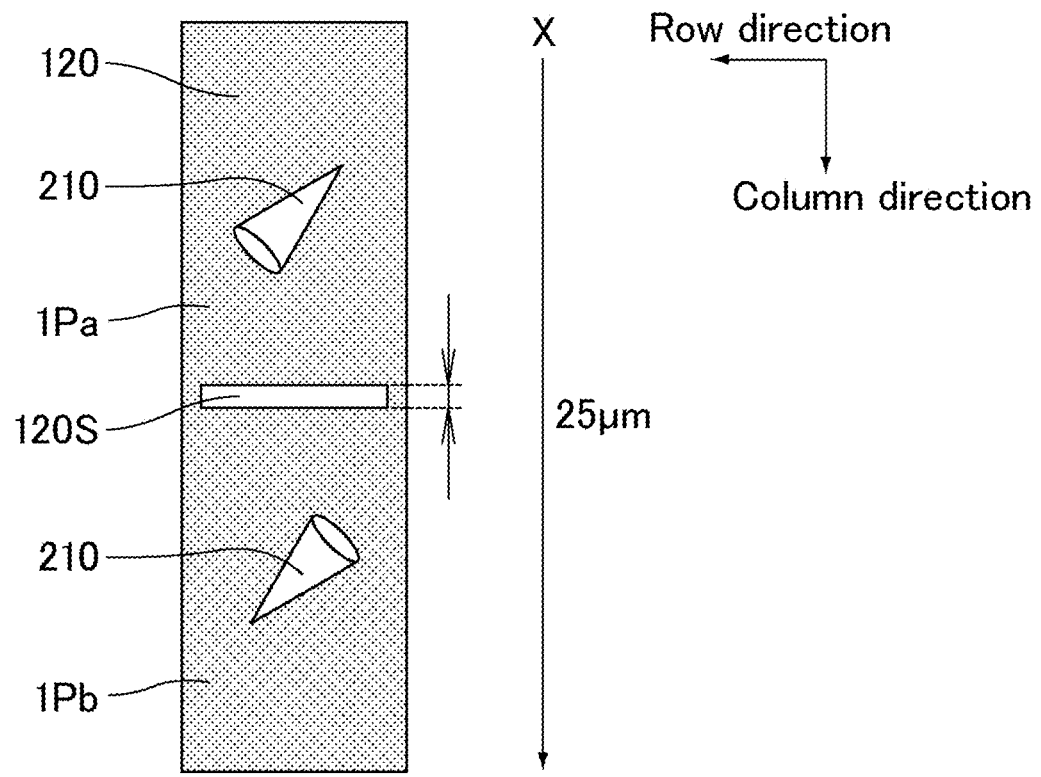
FIG. 28 is a schematic plan view of a pixel electrode in liquid crystal display panels of Examples 4-1-1 to 4-1-3.

FIG. 28 is a schematic plan view of a pixel electrode in liquid crystal display panels of Examples 4-1-1 to 4-1-3. The liquid crystal display panels of Examples 4-1-1 to 4-1-3 were produced which had the same structure as the liquid crystal display panel of Example 2-1, except that as shown in FIG. 28, the slit 120S was formed in the pixel electrode 120 in the short direction of the pixel electrode 120. The pixel electrodes 120 in the liquid crystal display panels of Examples 4-1-1 to 4-1-3 were provided with 3 μm, 4 μm, and 6 μm slits 120S, respectively.

Examples 4-2-1 to 4-2-3

Figure 29:
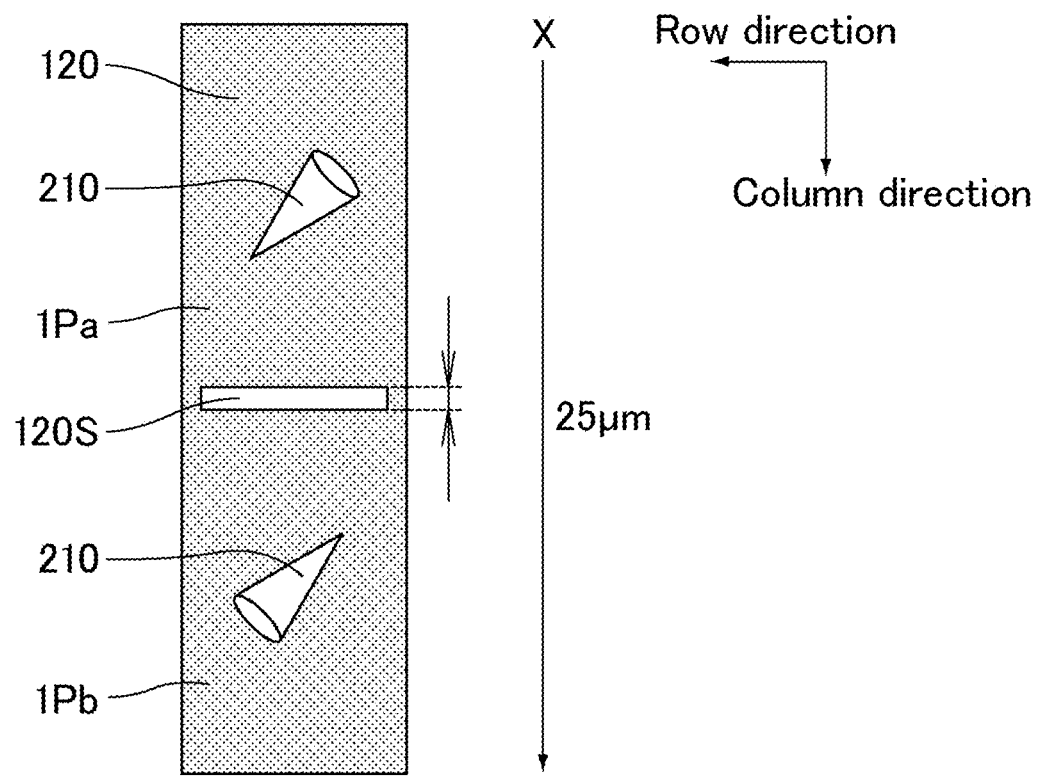
FIG. 29 is a schematic plan view of a pixel electrode in liquid crystal display panels of Examples 4-2-1 to 4-2-3.

FIG. 29 is a schematic plan view of a pixel electrode in liquid crystal display panels of Examples 4-2-1 to 4-2-3. The liquid crystal display panels of Examples 4-2-1 to 4-2-3 were produced which had the same structure as the liquid crystal display panel of Example 2-2, except that as shown in FIG. 29, the slit 120S was formed in the pixel electrode 120 in the short direction of the pixel electrode 120. The pixel electrodes 120 in the liquid crystal display panels of Examples 4-1-2 to 4-2-3 were provided with 3 μm, 4 μm, and 6 μm slits 120S, respectively.

Comparative Examples 2-1 to 2-3

Figure 30:
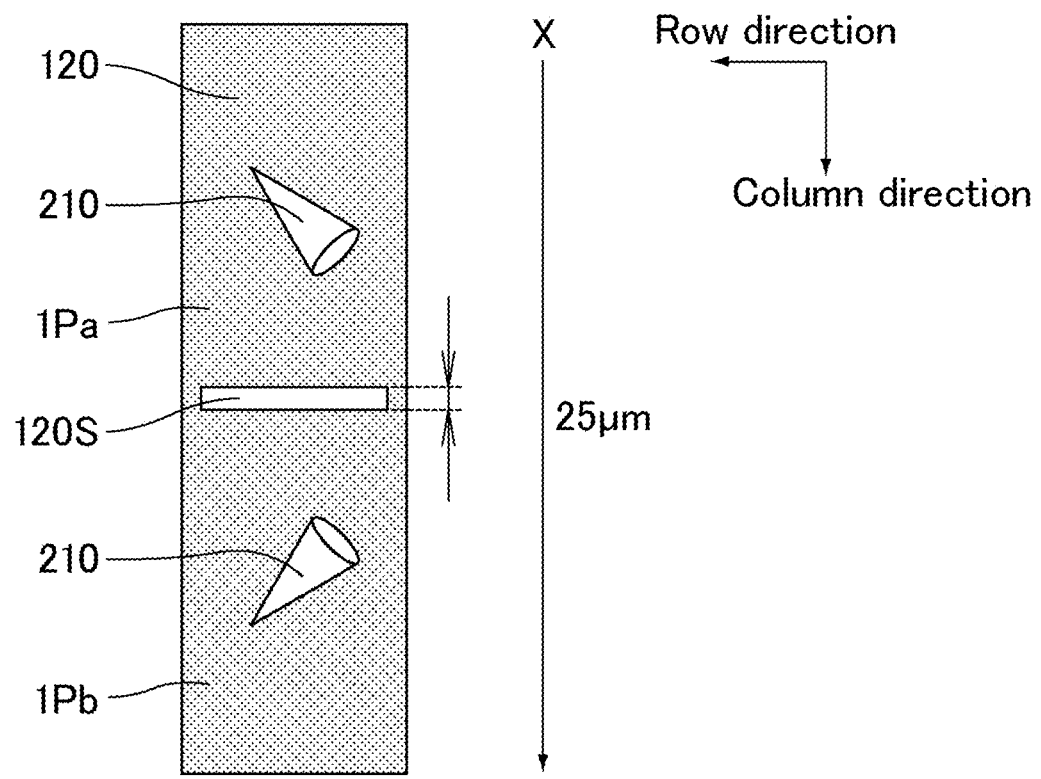
FIG. 30 is a schematic plan view of a pixel electrode in liquid crystal display panels of Comparative Examples 2-1 to 2-3.

FIG. 30 is a schematic plan view of a pixel electrode in liquid crystal display panels of Comparative Examples 2-1 to 2-3. The liquid crystal display panels of Comparative Examples 2-1 to 2-3 were produced which had the same structure as the liquid crystal display panel of Comparative Example 1-1, except that as shown in FIG. 30, the slit 120S was formed in the pixel electrode 120 in the short direction of the pixel electrode 120. The pixel electrodes 120 in the liquid crystal display panels of Comparative Examples 2-1 to 2-3 were provided with 3 μm, 4 μm, and 6 μm slits 120S, respectively.

Comparative Example 3

Figure 31:
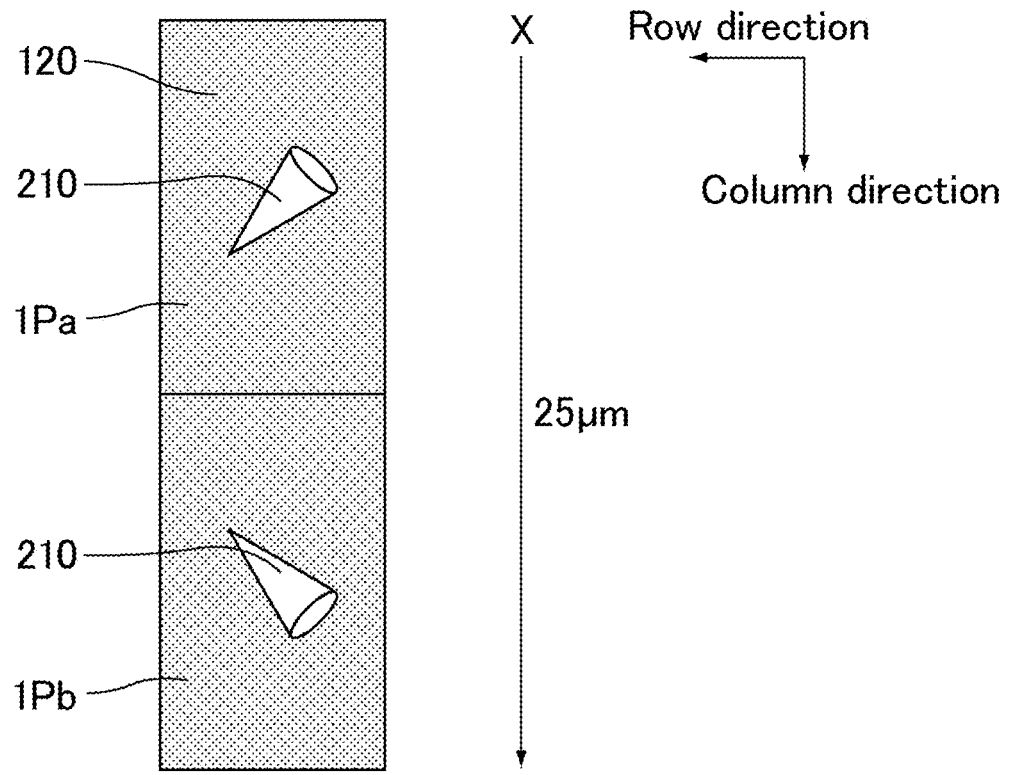
FIG. 31 is a schematic plan view of a pixel electrode in a liquid crystal display panel of Comparative Example 3.

FIG. 31 is a schematic plan view of a pixel electrode in a liquid crystal display panel of Comparative Example 3. The liquid crystal display panel of Comparative Example 3 was produced which had the same structure as that of Example 1, except that the 2D-ECB/valley-shaped mode was employed as shown in FIG. 31.

Comparative Examples 4-1 to 4-3

Figure 32:
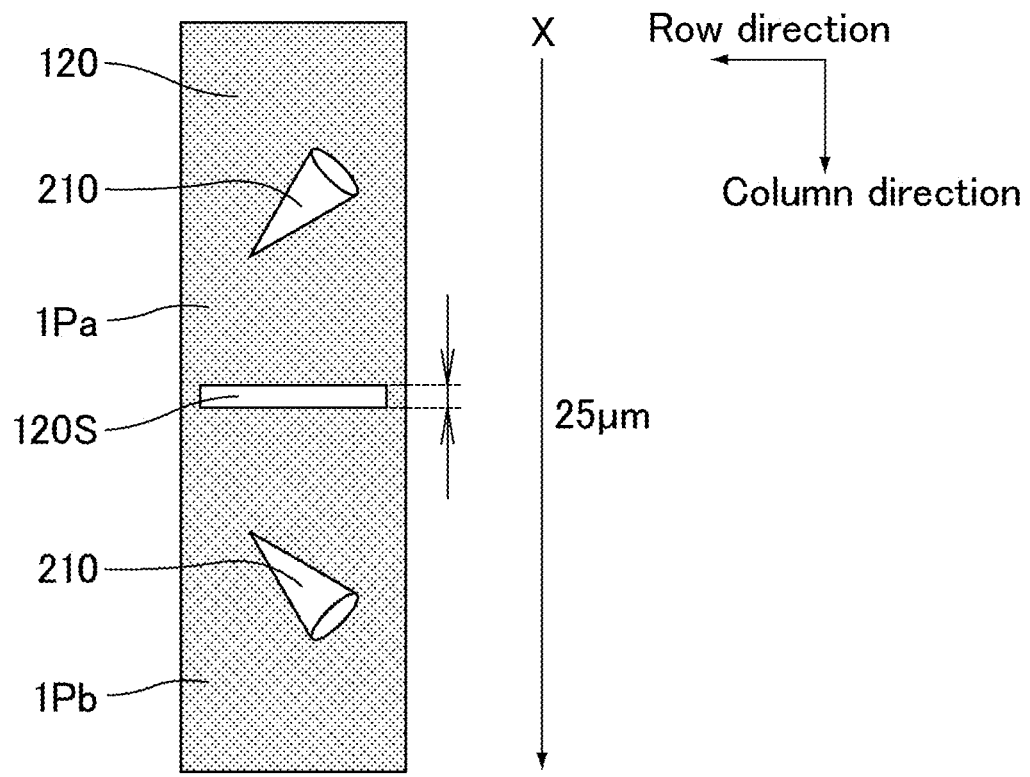
FIG. 32 is a schematic plan view of a pixel electrode in liquid crystal display panels of Comparative Examples 4-1 to 4-3.

FIG. 32 is a schematic plan view of a pixel electrode in liquid crystal display panels of Comparative Examples 4-1 to 4-3. The liquid crystal display panels of Comparative Examples 4-1 to 4-3 were produced which had the same structure as the liquid crystal display panel of Comparative Example 3, except that as shown in FIG. 32, the slit 120S was formed in the pixel electrode 120 in the short direction of the pixel electrode 120. The pixel electrodes 120 in the liquid crystal display panels of Comparative Examples 4-1 to 4-3 were provided with 3 µm, 4 µm, and 6 µm slits 120S, respectively.

Evaluation on Examples and Comparative Examples

Figure 33:
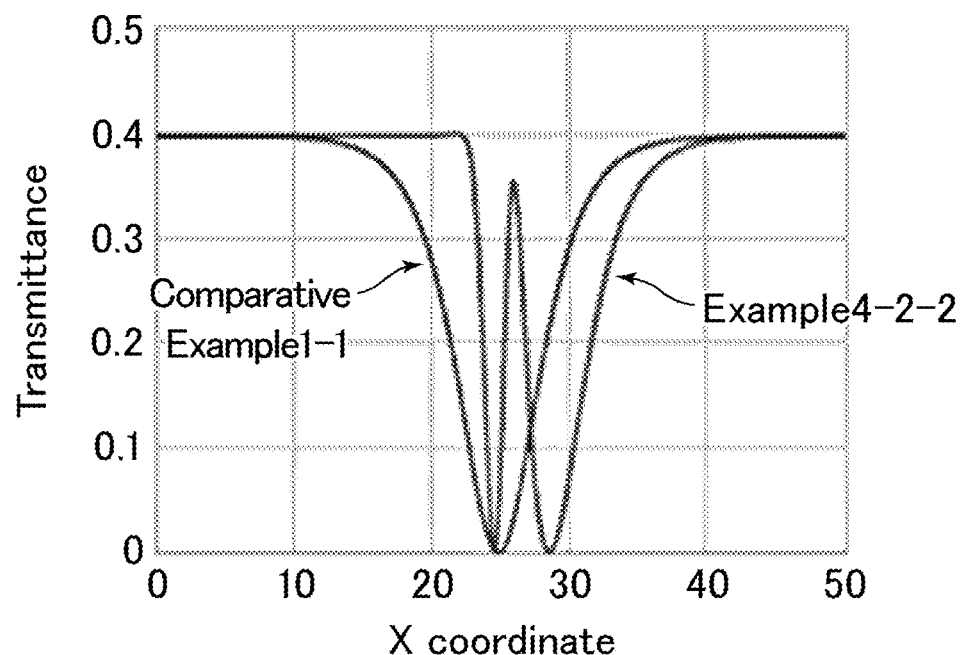
FIG. 33 is a graph of transmittance of dark line portions in the liquid crystal display panels of Example 4-2-2 and Comparative Example 1-1.
Figure 34:
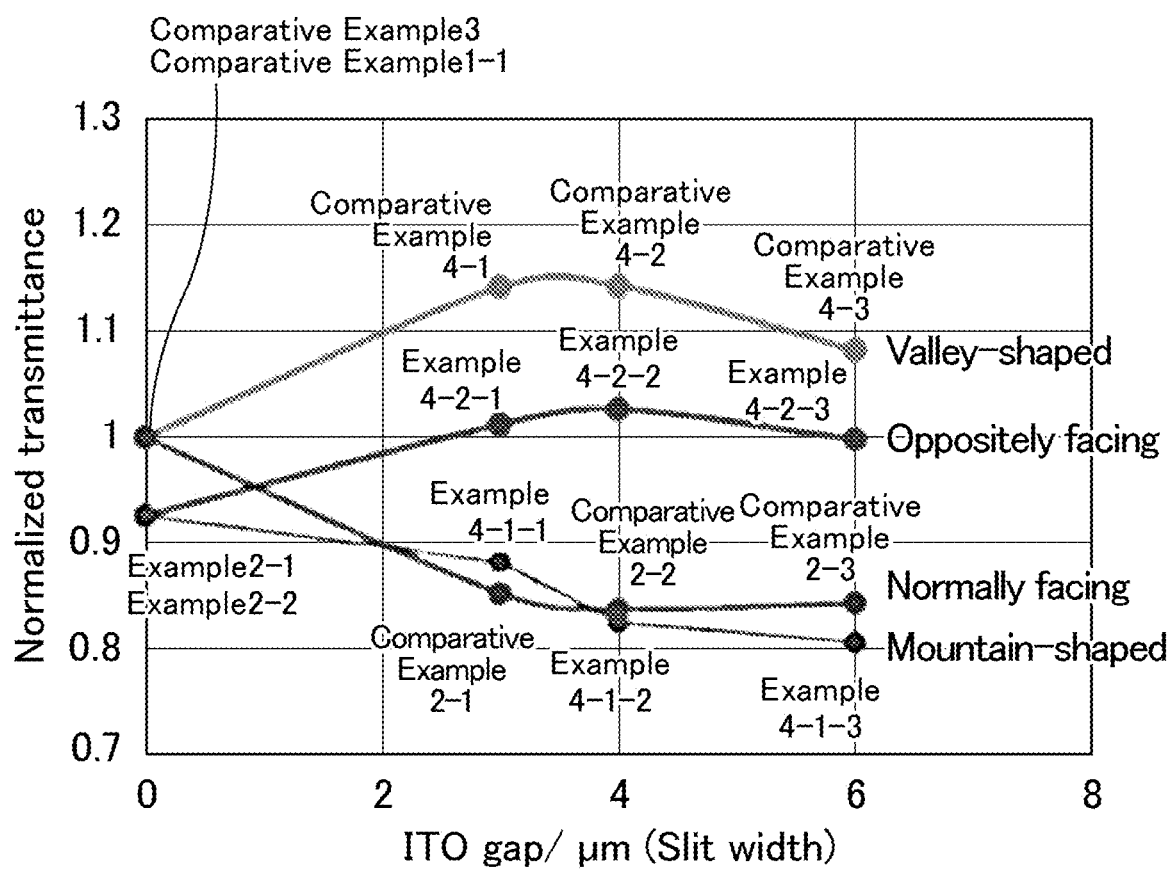
FIG. 34 is a graph of normalized transmittance of dark line portions in the liquid crystal display panels of examples and comparative examples.

The transmittance of the dark line portions in the liquid crystal display panels of Examples 2-1 and 2-2, 4-1-1 to 4-1-3, and 4-2-1 to 4-2-3, and Comparative Examples 1-1, 2-1 to 2-3, 3, and 4-1 to 4-3 was determined by simulation. FIG. 33 is a graph of transmittance of dark line portions in the liquid crystal display panels of Example 4-2-2 and Comparative Example 1-1. FIG. 34 is a graph of normalized transmittance of dark line portions in the liquid crystal display panels of examples and comparative examples. The X coordinate in FIG. 33 represents the length in the X-axis direction (column direction) in FIG. 28 to FIG. 32 in a unit of µm. The domain boundary is at X=25 µm. FIG. 34 shows the normalized transmittance (relative luminance ratio) of the transmittance of dark line portions in the liquid crystal display panel of Comparative Example 1-1 which was in the 2D-ECB/mountain-shaped mode and in which no slit was formed in each pixel electrode.

The effect of increasing the luminance by forming a slit in the domain boundary was evaluated by simulation. FIG. 33 and FIG. 34 show the results. Example 2-2 and Examples 4-2-1 to 4-2-3 show that when there is a single liquid crystal alignment axis in the 2D-ECB mode, forming a slit in the boundary between domains in the oppositely facing mode increased the luminance of the dark line portions. The results also show that 3 to 5 µm slits parallel to the dark lines worked well in the oppositely facing mode, and the transmittance of the dark line portions was 1.1 times the case with no slit.

In the normally facing mode in Example 2-1 and Examples 4-1-1 to 4-1-3 and the mountain-shaped mode in Comparative Example 1-1 and Comparative Examples 2-1 to 2-3, formation of a slit disturbed the alignment to decrease the luminance, which suggested that no slit was preferred in these modes.

Examples 5-1 to 5-3

Figure 35:
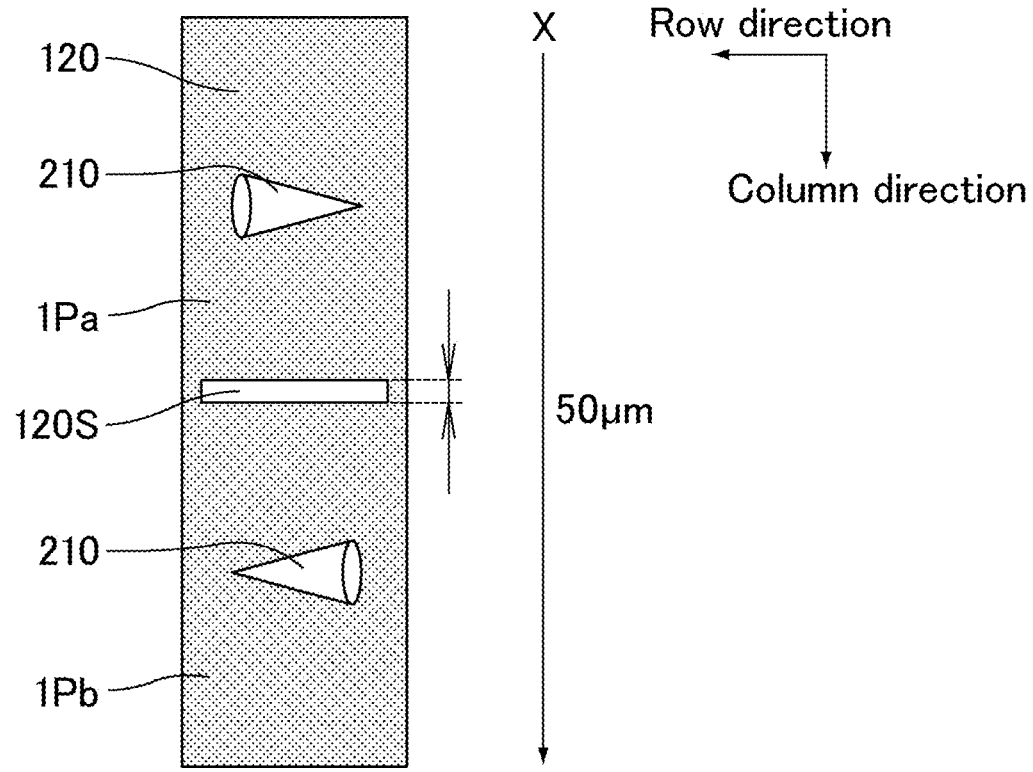
FIG. 35 is a schematic plan view of a pixel electrode in liquid crystal display panels of Examples 5-1 to 5-3.

FIG. 35 is a schematic plan view of a pixel electrode in liquid crystal display panels of Examples 5-1 to 5-3. The liquid crystal display panels of Examples 5-1 to 5-3 were produced which had the same structure as the liquid crystal display panel of Example 1, except that as shown in FIG. 35, the slit 120S was formed in the pixel electrode 120 in the short direction of the pixel electrode 120. The pixel electrodes 120 in the liquid crystal display panels of Examples 5-1 to 5-3 were provided with 2 µm, 4 µm, and 6 µm slits 120S, respectively.

Evaluation on Examples 1 and 5-1 to 5-3

Figure 36:
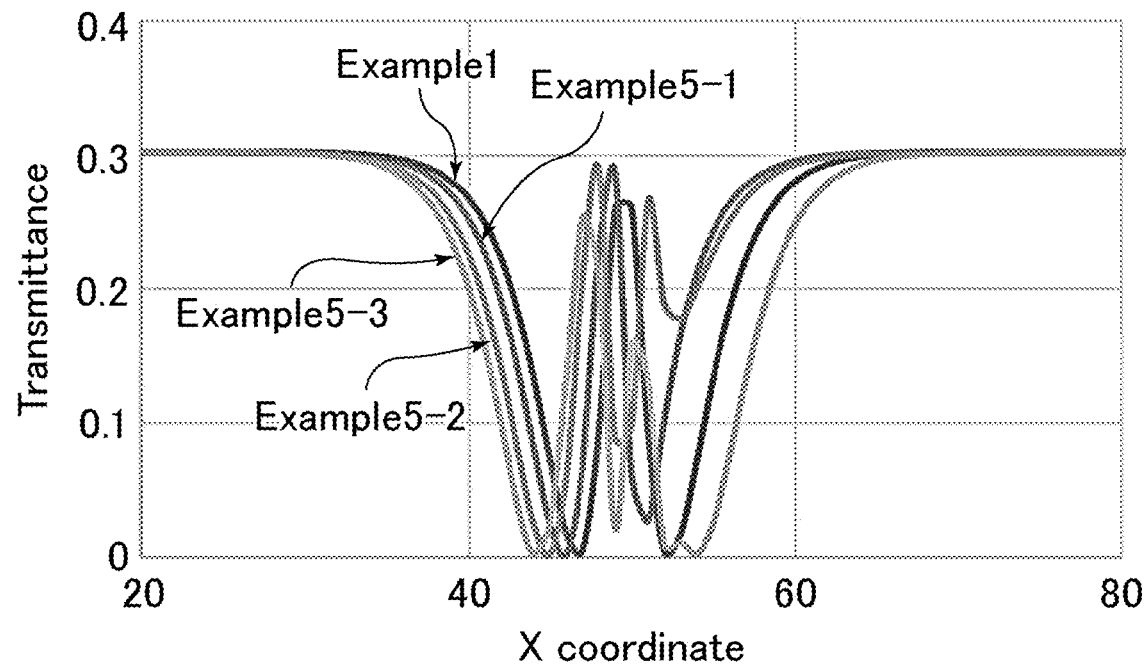
FIG. 36 is a graph of transmittance of dark line portions in the liquid crystal display panels of Example 1 and Examples 5-1 to 5-3.
Figure 37:
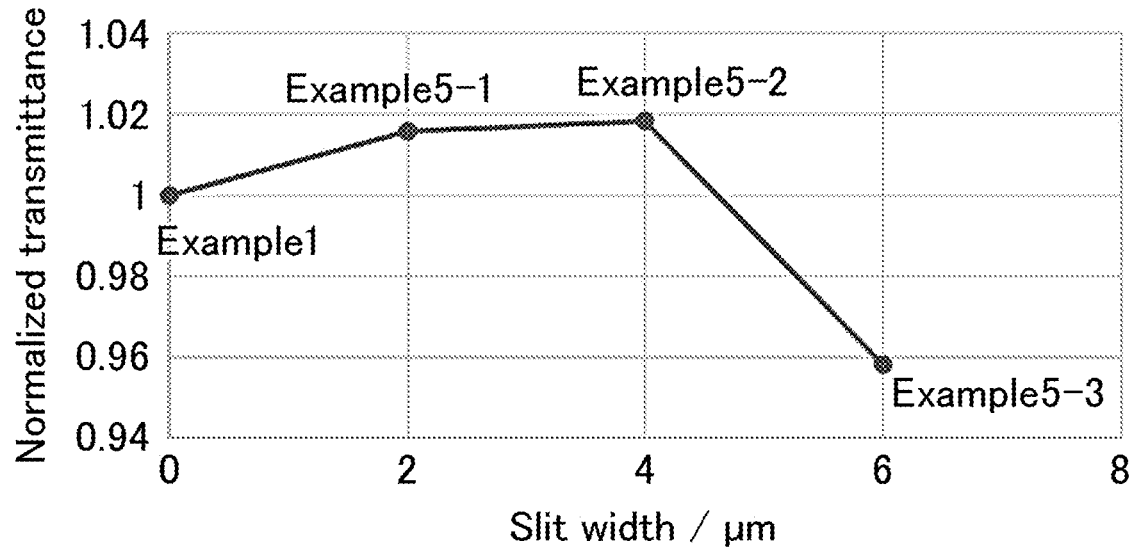
FIG. 37 is a graph of normalized transmittance of dark line portions in the liquid crystal display panels of Example 1 and Examples 5-1 to 5-3.
Figure 38:
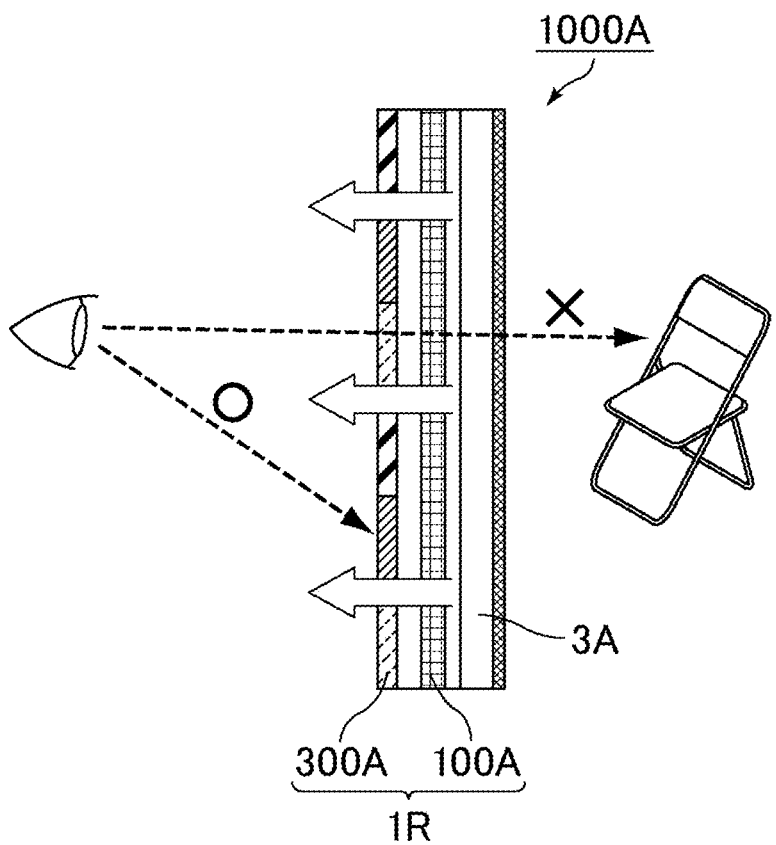
FIG. 38 is a schematic cross-sectional view of a typical liquid crystal display device.
Figure 39:
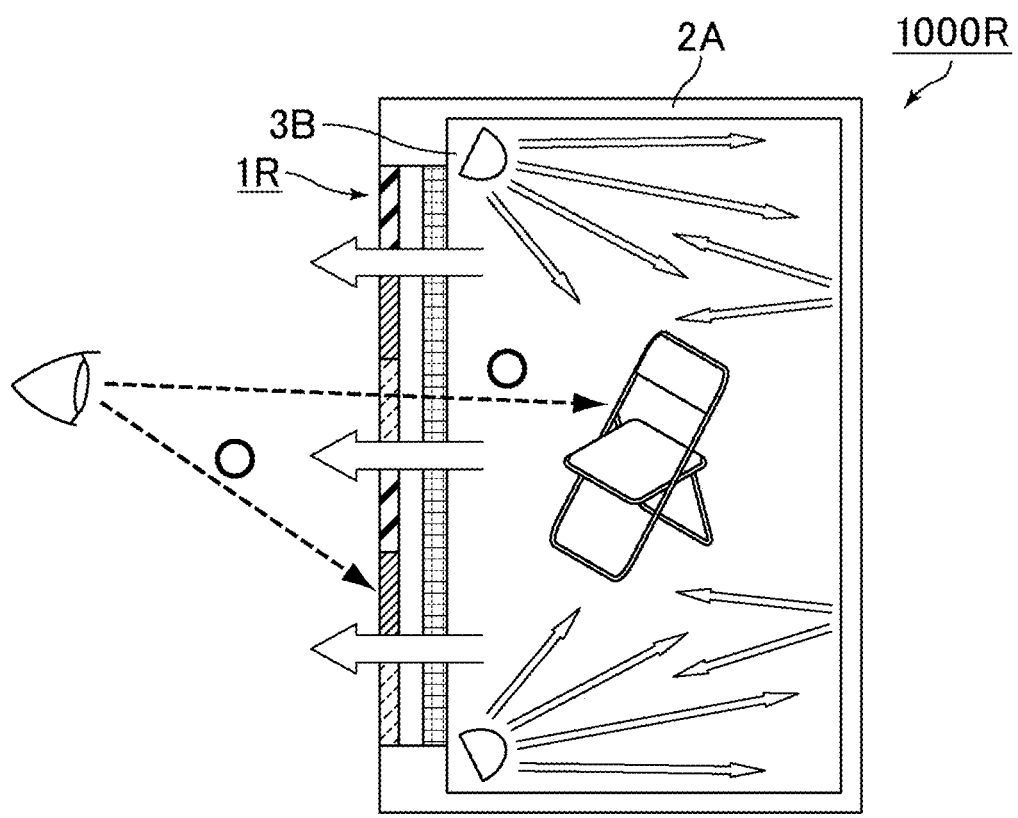
FIG. 39 is a schematic cross-sectional view of a see-through display.
Figure 42:
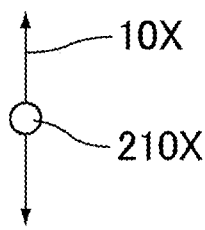
FIG. 42 is a schematic view of the relationship between the liquid crystal alignment axis and the polarization axes in a 4D-RTN mode normally white liquid crystal display panel.
Figure 43:
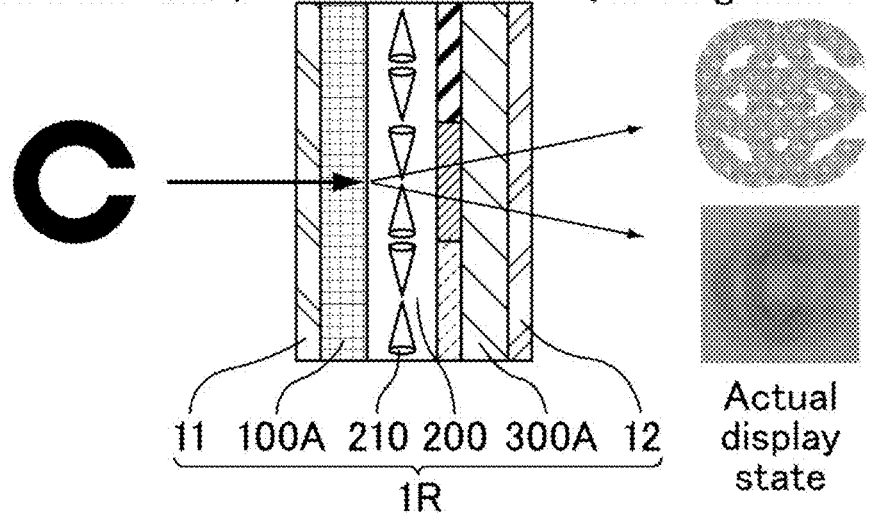
FIG. 43 shows the liquid crystal alignment in a 4D-RTN mode normally black liquid crystal display panel and a transmission image.
Figure 44:
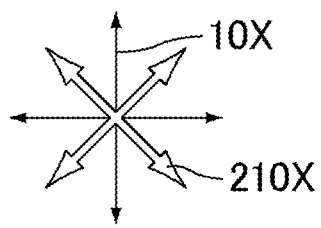
FIG. 44 is a schematic view of the relationship between the liquid crystal alignment axis and the polarization axes in the 4D-RTN mode normally black liquid crystal display panel.

FIG. 36 is a graph of transmittance of dark line portions in the liquid crystal display panels of Example 1 and Examples 5-1 to 5-3. FIG. 37 is a graph of normalized transmittance of dark line portions in the liquid crystal display panels of Example 1 and Examples 5-1 to 5-3. The effect of increasing the luminance by forming a slit in the domain boundary in the parallel alignment was evaluated by simulation. The transmittance (luminance) of the dark line portions was calculated by applying a voltage of 8 V to each of the mode with no slit (Example 1), the mode with a slit width of 2 µm (Example 5-1), the mode with a slit width of 4 µm (Example 5-2), and the mode with a slit width of 6 µm (Example 5-3). FIG. 36 shows the results. The normalized transmittance in Example 1 and Examples 5-1 to 5-3 was determined by taking the transmittance of the mode with no slit in Example 1 as 1. FIG. 37 shows the results.

The transmittance of the dark line portions in the modes with a slit width of up to about 4.5 µm was higher than that in the mode with no slit, with the transmittance being highest at about 4.0 µm. The results show that a transmittance that is 1.02 times the transmittance in the mode with no slit can be obtained. Thus, the results confirmed that the parallel mode can increase the luminance of the dark line portions when provided with a slit having a width of 0 to 4.5 µm, more preferably 3.8 to 4.2 µm.

Example 6

FIG. 52 is a schematic plan view of a pixel in a liquid crystal display panel (front panel) in a 3D display device of Example 6. FIG. 53 shows the simulation result of the viewing angle characteristics of the liquid crystal display panel (front panel) in the 3D display device of Example 6. FIG. 54 is a schematic plan view of a pixel in the back surface side liquid crystal display panel (rear panel) in the 3D display device of Example 6. FIG. 55 shows the simulation result of the viewing angle characteristics of the back surface side liquid crystal display panel (rear panel) in the 3D display device of Example 6.

The 3D display device 2000 of Example 6 was produced which corresponded to Embodiment 3 and had the structure shown in FIG. 52 to FIG. 55. The liquid crystal display panel 1 (front panel) in Example 6 was in the 2D-ECB/parallel alignment mode. The back surface side liquid crystal display panel 4 (rear panel) was in the 1D mode (specifically, TN mode). The alignment boundaries in the 2D-ECB/parallel alignment mode were shielded from light by the black matrix. The distance between the liquid crystal display panel 1 and the back surface side liquid crystal display panel 4 was 5 cm. The light source 3 to irradiate the liquid crystal display panel 1 with light was an FSC-driven light source including red LEDs, green LEDs, and blue LEDs.

The polarization axis 10Xa of the first polarizing plate 11 (specifically, absorption axis) was at an azimuth of 135°, the polarization axis 10Xb of the second polarizing plate 12 (specifically, absorption axis) was at an azimuth of 45°, the polarization axis 10Xc of the third polarizing plate 13 (specifically, absorption axis) was at an azimuth of 45°, and the polarization axis 10Xd of the fourth polarizing plate 14 (specifically, absorption axis) was at an azimuth of 135°. In a plan view, the polarization axis 10Xa of the first polarizing plate 11 was parallel to the polarization axis 10Xd of the fourth polarizing plate 14. The pair of polarizing plates (first polarizing plate 11 and second polarizing plate 12) between which the front panel in Example 6 was sandwiched was disposed such that their polarization axes formed a cross pattern. The pair of polarizing plates (third polarizing plate 13 and fourth polarizing plate 14) between which the rear panel was sandwiched was also disposed such that their polarization axes formed a cross pattern.

In the liquid crystal display panel 1, the liquid crystal alignment axis 210Xa in the first domain 1Pa and the liquid crystal alignment axis 210Xb in the second domain 1Pb were at an angle of 45° with the azimuths of the polarization axis 10Xa of the first polarizing plate 11 and the polarization axis 10Xb of the second polarizing plate 12. In the back surface side liquid crystal display panel 4, the liquid crystal alignment axis 610Xa in the third domain 1Pe and the liquid crystal alignment axis 610Xb in the fourth domain 1Pf were at an angle of 45° with the azimuths of the polarization axis 10Xc of the third polarizing plate 13 and the polarization axis 10Xd of the fourth polarizing plate 14.

The mode efficiency, contrast ratio, blurriness of a transmission image, tint, moiré, viewing angles, and image effect of the 3D display device 2000 of Example 6 were evaluated. Herein, the mode efficiency (also referred to as the mode transmittance) is determined by dividing the transmittance in crossed Nicols (when the polarization axes of the front and back polarizing plates are perpendicular) by the transmittance in parallel Nicols (when the polarization axes of the front and back polarizing plates are parallel). The mode efficiency represents the transmittance in white display of the target liquid crystal display panel when the transmittance in white display of a TN mode liquid crystal display panel is taken as 100%. The TN mode causes almost no decrease in transmittance even in crossed Nicols under the condition that the dark lines at the electrode ends are hidden by the black matrix, thus achieving a mode efficiency of almost 100%. The see-through properties of the front panel required to provide the 3D image visual effects are a high mode efficiency (for example, a mode efficiency of 100%), a high contrast ratio (for example, a contrast ratio of 10000:1), no blurriness of a transmission image, no change in tint (point W for standard illuminant D65) (i.e., no coloring), no moiré, and good viewing angle characteristics (particularly the viewing angle characteristics in the horizontal directions considering that the viewers would be seated when they watch the screen). Table 1 shows the results of evaluations on these items.

In the 3D display device 2000 of Example 6, the front panel and the rear panel were stacked with a physical space in between and the image on the front panel and the image on the rear panel were superimposed with each other, so that the ray space was approximately produced based on the difference in focal length. This can produce a pop-out image effect similar to the autostereoscopic effect. Such a 3D display device is suitably applicable to amusement devices.

Example 7

FIG. 56 is a schematic plan view of a pixel in a back surface side liquid crystal display panel (rear panel) in a 3D display device of Example 7. FIG. 57 shows the simulation result of the viewing angle characteristics of the back surface side liquid crystal display panel (rear panel) in the 3D display device of Example 7.

The 3D display device 2000 of Example 7 was produced as in Example 6, except that the back surface side liquid crystal display panel 4 in FIG. 56 and FIG. 57 was used as the rear panel. The back surface side liquid crystal display panel 4 (rear panel) in Example 7 was in the 2D-ECB/parallel alignment mode. In a plan view, the polarization axis 10Xa of the first polarizing plate 11 was parallel to the polarization axis 10Xd of the fourth polarizing plate 14. The pair of polarizing plates (first polarizing plate 11 and second polarizing plate 12) between which the front panel in Example 7 was sandwiched was disposed such that their polarization axes formed an X-shaped pattern. The pair of polarizing plates (third polarizing plate 13 and fourth polarizing plate 14) between which the rear panel was sandwiched was also disposed such that their polarization axes formed an X-shaped pattern. The mode efficiency, contrast ratio, blurriness of a transmission image, tint, moiré, viewing angles, and image effect of the 3D display device 2000 of Example 7 were evaluated. Table 2 shows the results.

TABLE 1

| | Example 6 | | | | Note |
|---|---|---|---|---|---|
| Mode | Liquid crystal display panel: 2D-ECB/parallel alignment mode (front panel) | | Back surface side liquid crystal display panel: 1D-TN mode (rear panel) | | — |
| Polarizing plate absorption axis | X-shaped pattern | | X-shaped pattern | | The axis was constant, so that the transmittance did not deteriorate. |
| 1. Mode efficiency | ◯ | 97.1% | ◎ | 100% | Almost 100% as in TN mode. |
| 2. Contrast ratio | ◎ | 16207 | ◎ | — | Achieved 10000:1 or higher. |
| 3. Transmission image | ◎ | Range with no blurriness 0 cm to ∞ | — | — | No reduction in pop-out image effect. |
| 4. Tint | ◎ | No coloring | — | — | ↑ |
| 5. Moiré | ◯ | Range with no moiré 5 cm to ∞ | — | — | ↑ |
| 6. Viewing angle | ◯ | Vertically/horizontally symmetrical No black inversion | X | Horizontally symmetrical Black inversion occurred | Horizontal viewing angle characteristics are important. The present method is suitable. |
| 7. Image effect | | | ◎ | | Pop-out image effect similar to autostereoscopic effect. |

◎: Excellent,
◯: Very good,
Δ: good,
X: Poor

TABLE 2

|  | Example 7 | | | | Note |
|---|---|---|---|---|---|
| Mode | Liquid crystal display panel: 2D-ECB/parallel alignment mode (front panel) | | Back surface side liquid crystal display panel: 2D-ECB/parallel alignment mode (rear panel) | | — |
| Polarizing plate absorption axis | X-shaped pattern | | X-shaped pattern | | The axes matched, so that the transmittance did not deteriorate. |
| 1. Mode efficiency | ○ | 97.1% | ○ | 97.1% | Almost 100% as in TN mode. |
| 2. Contrast ratio | ◎ | 16207 | ◎ | 16207 | Achieved 10000:1 or higher. |
| 3. Transmission image | ◎ | Range with no blurriness 0 cm to ∞ | — | — | No reduction in pop-out image effect. |
| 4. Tint | ◎ | No coloring | — | — | ↑ |
| 5. Moiré | ○ | Range with no moiré 5 cm to ∞ | — | — | ↑ |
| 6. Viewing angle | ○ | Vertically/horizontally symmetrical No black inversion | ○ | Vertically/horizontally symmetrical No black inversion | Horizontal viewing angle characteristics are important. The present method is suitable. |
| 7. Image effect | | | ◎ | | Pop-out image effect similar to autostereoscopic effect. |

◎: Excellent,
○: Very good,
Δ: good,
X: Poor

In the 3D display device 2000 of Example 7, the front panel and the rear panel were stacked with a physical space in between and the image on the front panel and the image on the rear panel were superimposed with each other, so that the ray space was approximately produced based on the difference in focal length. This can produce a pop-out image effect similar to the autostereoscopic effect. Such a 3D display device is suitably applicable to amusement devices.

Comparative Example 5

FIG. 58 is a schematic plan view of a pixel in a back surface side liquid crystal display panel (rear panel) in a 3D display device of Comparative Example 5. FIG. 59 shows the simulation result of the viewing angle characteristics of the back surface side liquid crystal display panel (rear panel) in the 3D display device of Comparative Example 5.

The 3D display device of Comparative Example 5 was produced as in Example 6, except that the back surface side liquid crystal display panel 4 in FIG. 58 and FIG. 59 was used as the rear panel. The back surface side liquid crystal display panel of Comparative Example 5 (rear panel) was in the 2D-ECB/mountain-shaped alignment mode. The polarization axis 10Xc of the third polarizing plate 13 (specifically, absorption axis) was at an azimuth of 90°, and the polarization axis 10Xd of the fourth polarizing plate 14 (specifically, absorption axis) was at an azimuth of 0°. In a plan view, the polarization axis 10Xa of the first polarizing plate 11 was not parallel to the polarization axis 10Xd of the fourth polarizing plate 14. The pair of polarizing plates (first polarizing plate 11 and second polarizing plate 12) between which the front panel in Comparative Example 5 was sandwiched was disposed such that their polarization axes formed an X-shaped pattern. The pair of polarizing plates (third polarizing plate 13 and fourth polarizing plate 14) between which the rear panel was sandwiched was disposed such that their polarization axes formed a cross pattern.

Comparative Example 6

FIG. 60 is a schematic plan view of a pixel in a liquid crystal display panel (front panel) in a 3D display device of Comparative Example 6. FIG. 61 shows the simulation results of the viewing angle characteristics of the liquid crystal display panel (front panel) in the 3D display device of Comparative Example 6. FIG. 62 is a schematic plan view of a pixel in the back surface side liquid crystal display panel (rear panel) in the 3D display device of Comparative Example 6. FIG. 63 shows the simulation result of the viewing angle characteristics of the back surface side liquid crystal display panel (rear panel) in the 3D display device of Comparative Example 6.

The 3D display device of Comparative Example 6 was produced as in Example 6, except that the liquid crystal display panel in FIG. 60 and FIG. 61 was used as the front panel and the back surface side liquid crystal display panel in FIG. 62 and FIG. 63 was used as the rear panel. The liquid crystal display panel (front panel) in Comparative Example 6 was in the 2D-ECB/mountain-shaped alignment mode. The back surface side liquid crystal display panel (rear panel) was in the 2D-ECB/parallel alignment mode.

The polarization axis 10Xa of the first polarizing plate 11 (specifically, absorption axis) was at an azimuth of 90°, the polarization axis 10Xb of the second polarizing plate 12 (specifically, absorption axis) was at an azimuth of 0°, the polarization axis 10Xc of the third polarizing plate 13 (specifically, absorption axis) was at an azimuth of 45°, and the polarization axis 10Xd of the fourth polarizing plate 14 (specifically, absorption axis) was at an azimuth of 135°. In a plan view, the polarization axis 10Xa of the first polarizing plate 11 was not parallel to the polarization axis 10Xd of the fourth polarizing plate 14. The pair of polarizing plates (first polarizing plate 11 and second polarizing plate 12) between which the front panel in Comparative Example 6 was sandwiched was disposed such that their polarization axes formed a cross pattern. The pair of polarizing plates (third polarizing plate 13 and fourth polarizing plate 14) between which the rear panel was sandwiched was disposed such that their polarization axes formed an X-shaped pattern.

Comparative Example 7

FIG. 64 is a schematic plan view of a pixel in a liquid crystal display panel (front panel) of a 3D display device of Comparative Example 7. FIG. 65 shows the simulation result of the viewing angle characteristics of the liquid crystal display panel (front panel) in the 3D display device of Comparative Example 7.

The 3D display device of Comparative Example 7 was produced as in Example 6, except that the liquid crystal display panel in FIG. 64 and FIG. 65 was used as the front panel. The liquid crystal display panel (front panel) in Comparative Example 7 was in the 2D-ECB/mountain-shaped alignment mode.

The polarization axis 10Xa of the first polarizing plate 11 (specifically, absorption axis) was at an azimuth of 90°, the polarization axis 10Xb of the second polarizing plate 12 (specifically, absorption axis) was at an azimuth of 0°, the polarization axis 10Xc of the third polarizing plate 13 (specifically, absorption axis) was at an azimuth of 45°, and the polarization axis 10Xd of the fourth polarizing plate 14 (specifically, absorption axis) was at an azimuth of 135°. In a plan view, the polarization axis 10Xa of the first polarizing plate 11 was not parallel to the polarization axis 10Xd of the fourth polarizing plate 14. The pair of polarizing plates (first polarizing plate 11 and second polarizing plate 12) between which the front panel in Comparative Example 7 was sandwiched was disposed such that their polarization axes formed a cross pattern. The pair of polarizing plates (third polarizing plate 13 and fourth polarizing plate 14) between which the rear panel was sandwiched was disposed such that their polarization axes formed an X-shaped pattern.

Comparative Example 8

FIG. 66 is a schematic plan view of a pixel in a back surface side liquid crystal display panel (rear panel) in a 3D display device of Comparative Example 8. FIG. 67 shows the simulation result of the viewing angle characteristics of the back surface side liquid crystal display panel (rear panel) in the 3D display device of Comparative Example 8.

The 3D display device of Comparative Example 8 was produced as in Example 6, except that the back surface side liquid crystal display panel in FIG. 66 and FIG. 67 was used as the rear panel. The back surface side liquid crystal display panel (rear panel) in Comparative Example 8 was in the 4D mode. Specifically, the back surface side liquid crystal display panel in Comparative Example 8 was in the UV2A mode having a structure with each single pixel 1P divided into four alignment regions of 2 rows×2 columns (third domain 1Pe, fourth domain 1Pf, fifth domain 1Pg, sixth domain 1Ph) and including four liquid crystal alignment axes (liquid crystal alignment axes 610Xa, 610Xb, 610Xc, 610Xd).

The polarization axis 10Xa of the first polarizing plate 11 (specifically, absorption axis) was at an azimuth of 135°, the polarization axis 10Xb of the second polarizing plate 12 (specifically, absorption axis) was at an azimuth of 45°, the polarization axis 10Xc of the third polarizing plate 13 (specifically, absorption axis) was at an azimuth of 0°, and the polarization axis 10Xd of the fourth polarizing plate 14 (specifically, absorption axis) was at an azimuth of 90°. In a plan view, the polarization axis 10Xa of the first polarizing plate 11 was not parallel to the polarization axis 10Xd of the fourth polarizing plate 14. The pair of polarizing plates (first polarizing plate 11 and second polarizing plate 12) between which the front panel in Comparative Example 8 was sandwiched was disposed such that their polarization axes formed an X-shaped pattern. The pair of polarizing plates (third polarizing plate 13 and fourth polarizing plate 14) between which the rear panel was sandwiched was disposed such that their polarization axes formed a cross pattern.

Comparative Example 9

FIG. 68 is a schematic plan view of a pixel in a back surface side liquid crystal display panel (rear panel) in a 3D display device of Comparative Example 9. FIG. 69 shows the simulation results of the viewing angle characteristics of the back surface side liquid crystal display panel (rear panel) in the 3D display device of Comparative Example 9.

The 3D display device of Comparative Example 9 was produced as in Example 6, except that the back surface side liquid crystal display panel in FIG. 68 and FIG. 69 was used as the rear panel. The back surface side liquid crystal display panel (rear panel) in Comparative Example 9 was in the 4D mode. Specifically, the back surface side liquid crystal display panel in Comparative Example 9 was in the UV2AII mode having a structure with each single pixel 1P divided into four alignment regions of 1 row×4 columns (third domain 1Pe, fourth domain 1Pf, fifth domain 1Pg, sixth domain 1Ph) and including four liquid crystal alignment axes (liquid crystal alignment axes 610Xa, 610Xb, 610Xc, 610Xd). Although the back surface side liquid crystal display panel in Comparative Example 9 had a structure in which each single pixel 1P was divided into four alignment regions of 1 row×4 columns, the same effect can be achieved even when the back surface side liquid crystal display panel has a structure in which each single pixel 1P is divided into four alignment regions of 4 rows×1 column because each single pixel 1P is a square pixel.

The polarization axis 10Xa of the first polarizing plate 11 (specifically, absorption axis) was at an azimuth of 135°, the polarization axis 10Xb of the second polarizing plate 12 (specifically, absorption axis) was at an azimuth of 45°, the polarization axis 10Xc of the third polarizing plate 13 (specifically, absorption axis) was at an azimuth of 0°, and the polarization axis 10Xd of the fourth polarizing plate 14 (specifically, absorption axis) was at an azimuth of 90°. In a plan view, the polarization axis 10Xa of the first polarizing plate 11 was not parallel to the polarization axis 10Xd of the fourth polarizing plate 14. The pair of polarizing plates (first polarizing plate 11 and second polarizing plate 12) between which the front panel in Comparative Example 9 was sandwiched was disposed such that their polarization axes formed an X-shaped pattern. The pair of polarizing plates (third polarizing plate 13 and fourth polarizing plate 14) between which the rear panel was sandwiched was disposed such that their polarization axes formed a cross pattern.

Comparative Example 10

FIG. 70 is a schematic plan view of a pixel in a liquid crystal display panel (front panel) in a 3D display device of Comparative Example 10. FIG. 71 shows the simulation result of the viewing angle characteristics of the liquid crystal display panel (front panel) in the 3D display device of Comparative Example 10.

The 3D display device of Comparative Example 10 was produced as in Example 6, except that the liquid crystal display panel in FIG. 70 and FIG. 71 was used as the front panel and the back surface side liquid crystal display panel (rear panel) was in the 4D mode. The liquid crystal display panel (front panel) in Comparative Example 10 was in the 4D mode. Specifically, the liquid crystal display panel in Comparative Example 10 was in the UV2A mode having a structure with each single pixel 1P divided into four alignment regions of 2 rows×2 columns (1Pa, 1Pb, 1Pc, 1Pd) and including four liquid crystal alignment axes (liquid crystal alignment axes 210Xa, 210Xb, 210Xc, 210Xd).

The polarization axis 10Xa of the first polarizing plate 11 (specifically, absorption axis) was at an azimuth of 0°, the polarization axis 10Xb of the second polarizing plate 12 (specifically, absorption axis) was at an azimuth of 90°, the polarization axis 10Xc of the third polarizing plate 13 (specifically, absorption axis) was at an azimuth of 90°, and the polarization axis 10Xd of the fourth polarizing plate 14 (specifically, absorption axis) was at an azimuth of 0°. In a plan view, the polarization axis 10Xa of the first polarizing plate 11 was parallel to the polarization axis 10Xd of the fourth polarizing plate 14. The pair of polarizing plates (first polarizing plate 11 and second polarizing plate 12) between which the front panel in Comparative Example 10 was sandwiched was disposed such that their polarization axes formed a cross pattern. The pair of polarizing plates (third polarizing plate 13 and fourth polarizing plate 14) between which the rear panel was sandwiched was disposed such that their polarization axes also formed a cross pattern.

In Comparative Example 10, the image on the rear panel observed through the front panel was blurred, showing low see-through properties. The image on the rear panel was blurred presumably because the front panel was in the 4D mode.

Comparative Example 11

FIG. 72 is a schematic plan view of a pixel in a liquid crystal display panel (front panel) in a 3D display device of Comparative Example 11. FIG. 73 shows the simulation result of the viewing angle characteristics of the liquid crystal display panel (front panel) in the 3D display device of Comparative Example 11.

The 3D display device of Comparative Example 11 was produced as in Example 6, except that the liquid crystal display panel in FIG. 72 and FIG. 73 was used as the front panel and the back surface side liquid crystal display panel (rear panel) was in the 4D mode. The liquid crystal display panel (front panel) in Comparative Example 11 was in the 4D mode. Specifically, the liquid crystal display panel in Comparative Example 11 was in the UV2AII mode having a structure with each single pixel 1P divided into four alignment regions of 1 row×4 columns (1Pa, 1Pb, 1Pc, 1Pd) and including four liquid crystal alignment axes (liquid crystal alignment axes 210Xa, 210Xb, 210Xc, 210Xd).

The polarization axis 10Xa of the first polarizing plate 11 (specifically, absorption axis) was at an azimuth of 0°, the polarization axis 10Xb of the second polarizing plate 12 (specifically, absorption axis) was at an azimuth of 90°, the polarization axis 10Xc of the third polarizing plate 13 (specifically, absorption axis) was at an azimuth of 90°, and the polarization axis 10Xd of the fourth polarizing plate 14 (specifically, absorption axis) was at an azimuth of 0°. In a plan view, the polarization axis 10Xa of the first polarizing plate 11 was parallel to the polarization axis 10Xd of the fourth polarizing plate 14. The pair of polarizing plates (first polarizing plate 11 and second polarizing plate 12) between which the front panel in Comparative Example 11 was sandwiched was disposed such that their polarization axes formed a cross pattern. The pair of polarizing plates (third polarizing plate 13 and fourth polarizing plate 14) between which the rear panel was sandwiched was disposed such that their polarization axes formed a cross pattern.

In Comparative Example 11, the image on the rear panel observed through the front panel was blurred, showing low see-through properties. The image on the rear panel was blurred presumably because the front panel was in the 4D mode.

Comparative Example 12

FIG. 74 is a schematic plan view of a pixel in a liquid crystal display panel (front panel) in a 3D display device of Comparative Example 12. FIG. 75 shows the simulation result of the viewing angle characteristics of the liquid crystal display panel (front panel) in the 3D display device of Comparative Example 12.

The 3D display device of Comparative Example 12 was produced as in Example 6, except that the liquid crystal display panel in FIG. 74 and FIG. 75 was used as the front panel. The liquid crystal display panel (front panel) in Comparative Example 12 was in the 1D mode (specifically, TN mode). The back surface side liquid crystal display panel (rear panel) was in the 1D mode.

The polarization axis 10Xa of the first polarizing plate 11 (specifically, absorption axis) was at an azimuth of 135°, the polarization axis 10Xb of the second polarizing plate 12 (specifically, absorption axis) was at an azimuth of 45°, the polarization axis 10Xc of the third polarizing plate 13 (specifically, absorption axis) was at an azimuth of 45°, and the polarization axis 10Xd of the fourth polarizing plate 14 (specifically, absorption axis) was at an azimuth of 135°. In a plan view, the polarization axis 10Xa of the first polarizing plate 11 was parallel to the polarization axis 10Xd of the fourth polarizing plate 14. The pair of polarizing plates (first polarizing plate 11 and second polarizing plate 12) between which the front panel in Comparative Example 12 was sandwiched was disposed such that their polarization axes formed an X-shaped pattern. The pair of polarizing plates (third polarizing plate 13 and fourth polarizing plate 14) between which the rear panel was sandwiched was disposed such that their polarization axes also formed an X-shaped pattern.

In Comparative Example 12, the viewing angles were poor and the see-through properties were low. The viewing angle characteristics deteriorated presumably because the front panel was in the 1D mode.

Evaluation on Front Panel in Example 1, Example 2, Comparative Example 10 to Comparative Example 12

The mode efficiency, contrast ratio, a transmission image, tint, moiré, viewing angles, and image effect of the front panels in Example 1, Example 2, and Comparative Example 10 to Comparative Example 12 were evaluated. Table 3 shows the results. In the present evaluation, the structure of the rear panel is not limited.

TABLE 3

| | Evaluation item (amusement) | | | | | | | |
|---|---|---|---|---|---|---|---|---|
| Front panel | Mode efficiency | Contrast ratio | Transmission image | Tint | Moiré | Viewing angles | Image effect | Note |
| Examples 1, 2 2D-ECB/parallel alignment mode | ○ 97% | ◎ 10000 | ◎ No blurriness | ◎ | ○* | ○ | ◎ | Most improved the pop-out image effect. |

TABLE 3-continued

| | Evaluation item (amusement) | | | | | | | |
|---|---|---|---|---|---|---|---|---|
| Front panel | Mode efficiency | Contrast ratio | Transmission image | Tint | Moiré | Viewing angles | Image effect | Note |
| Comparative Examples 10, 11 4D mode (UV2A mode, UV2AII mode) | Δ | ○ | X | Δ | ○* | ◉ | X | Failed to exert pop-out image effect due to high degree of blurriness of transmission image. |
| Comparative Example 12 1D mode (TN mode) | ◉ 100% | ○ | ◉ | ○ | ○* | X | ○ | Failed to exert pop-out image effect at azimuth with black inversion. |

◉: Excellent,
○: Very good,
Δ: good,
X: Poor
*X with distance between front and rear panels of 5 cm or shorter Table 3 shows that a front panel in the 2D-ECB/parallel alignment mode improved the pop-out image effect. In contrast, a front panel in the 4D mode produced a more blurred transmission image, failing to exert the pop-out image effect. Also, a front panel in the 1D mode failed to exert the pop-out image effect at an azimuth where black inversion occurred.

Evaluation on Rear Panel in Example 1, Example 2, Comparative Example 5, Comparative Example 8, and Comparative Example 9

The mode efficiency, contrast ratio, tint, moiré, viewing angles, and image effect of the rear panel in Example 1, Example 2, Comparative Example 5, Comparative Example 8, and Comparative Example 9 were evaluated. Table 4 shows the results. In the present evaluation, the applicability of the rear panel to an amusement device when the front panel was in the 2D-ECB/parallel alignment mode was compared. In the examples and comparative examples in Table 4, since the front panels were in the 2D-ECB/parallel alignment mode, the blurriness of a transmission image was prevented or reduced. The properties of the rear panel required to provide the 3D image visual effects are the polarization axis of the fourth polarizing plate and the polarization axis of the first polarizing plate being parallel to each other, a high luminance, a high contrast ratio, a high color gamut, and good viewing angle characteristics (particularly the viewing angle characteristics in the horizontal directions considering that the viewers would be seated when they watch the screen).

TABLE 4

| | | Evaluation item (amusement) | | | | | | |
|---|---|---|---|---|---|---|---|---|
| Rear panel | Polarization axes of first polarizing plate and fourth polarizing plate | Mode efficiency | Contrast ratio | Tint | Moiré | Viewing angles | Image effect | Note |
| Example 2 2D-ECB/parallel alignment mode | Constant (parallel) | ◉ | ○ | ◉ | ○* | ○ | ◉ | Most improved the pop-out image effect. |
| Comparative Example 5 2D-ECB/mountain-shaped alignment mode | Not constant (not parallel) | X | X | Δ | ○* | ○ | X | Pop-out image effect decreased as transmittance decreased |
| Comparative Examples 8, 9 4D mode (UV2A mode, UV2AII mode) | Not constant (not parallel) | X | X | Δ | ○* | ◉ | X | ↑ |
| Example 1 1D mode (TN mode) | Constant (parallel) | ◉ | ○ | ○ | ○* | X | ○ | Failed to exert pop-out image effect at azimuth with black inversion. |

◉: Excellent,
○: Very good,
Δ: good,
X: Poor
*X with distance between front and rear panels of 5 cm or shorter Table 4 shows that, when the front panel is in the 2D-ECB/parallel alignment mode, the rear panel is preferably in the 2D-ECB/parallel alignment mode or 1D mode, more preferably in the 2D-ECB/parallel alignment mode. A rear panel in the 1D mode can achieve a high luminance, a high contrast ratio, and a high color gamut. A rear panel in the 2D-ECB/parallel alignment mode can achieve a high luminance, a high contrast ratio, and a high color gamut as well as good viewing angle characteristics.

The embodiments of the present invention described above may be combined as appropriate within the spirit of the present invention.

REFERENCE SIGNS LIST 1, 1R: liquid crystal display panel
1A: display portion
1P, 1P1, 1P2: pixel
1Pa, 1Pb, 1Pc, 1Pd, 1Pe, 1Pf, 1Pg, 1Ph: domain
2: case
2A: see-through display box
3: light source
3A, 4A: backlight
3B: LED
4: back surface side liquid crystal display panel
10X, 10Xa, 10Xb, 10Xc, 10Xd: polarization axis
11: first polarizing plate
12: second polarizing plate
13: third polarizing plate
14: fourth polarizing plate
21: first alignment film
22: second alignment film
23: third alignment film
24: fourth alignment film
30: regular adhesive
40: scattering film
50: diffusion adhesive
100: first substrate
100A: TFT substrate
110, 310, 510, 710: insulating substrate
120, 520, 1201, 1202: pixel electrode
120S: slit
130: light shielding member
200: liquid crystal layer
210, 610: liquid crystal molecule
210S, 610S: start point (liquid crystal director tail)
210T, 610T: end point (liquid crystal director head)
210V, 210Va, 210Vb: alignment vector
210X, 210Xa, 210Xb, 210Xc, 210Xd, 610X, 610Xa, 610Xb,
610Xc, 610Xd: liquid crystal alignment axis
300: second substrate
300A: CF substrate
320, 720: common electrode
400A: eye test chart
400B: cart
400C: jig
400D: camera
500: third substrate
600: back surface side liquid crystal layer
700: fourth substrate
1000, 1000R: see-through display
1000A: liquid crystal display device
2000: 3D display device

What is claimed is:
1. A 3D display device comprising:
a liquid crystal display panel; and
a back surface side liquid crystal display panel at a back of the liquid crystal display panel; wherein
the liquid crystal display panel sequentially includes, from the back surface side toward a viewing surface side:
a first polarizing plate;
a first substrate including pixel electrodes arranged in a matrix pattern in a row direction and a column direction;
a first alignment film;
a liquid crystal layer containing liquid crystal molecules;
a second alignment film;
a second substrate including a common electrode; and
a second polarizing plate,
the liquid crystal display panel being a normally black liquid crystal display panel capable of shifting into a transparent display state where a background is seen through the liquid crystal display panel,
the back surface side liquid crystal display panel sequentially includes, from the back surface side toward the viewing surface side:
a third polarizing plate;
a third substrate including pixel electrodes arranged in a matrix pattern in the row direction and the column direction;
a third alignment film;
a back surface side liquid crystal layer containing liquid crystal molecules;
a fourth alignment film;
a fourth substrate including a common electrode; and
a fourth polarizing plate,
the first alignment film and the second alignment film have been subjected to alignment treatment such that a first domain and a second domain in which alignment vectors are different from each other are arranged side by side in the column direction, where each of the alignment vectors is defined to point from a first substrate side long-axis end of each of the liquid crystal molecules as a start point to a second substrate side long-axis end of the liquid crystal molecule as an end point,
in a plan view of the first domain and the second domain, a liquid crystal alignment axis of the first domain and a liquid crystal alignment axis of the second domain obliquely intersect a polarization axis of the first polarizing plate and a polarization axis of the second polarizing plate and are parallel to each other,
in a plan view, the polarization axis of the first polarizing plate and a polarization axis of the fourth polarizing plate are parallel to each other,
the third alignment film and the fourth alignment film have been subjected to alignment treatment such that a third domain and a fourth domain in which alignment vectors are different from each other are arranged side by side in the column direction,
in a plan view of the third domain and the fourth domain, a liquid crystal alignment axis of the third domain and a liquid crystal alignment axis of the fourth domain obliquely intersect a polarization axis of the third polarizing plate and the polarization axis of the fourth polarizing plate and are parallel to each other,
the first domain and the second domain are aligned along a left and right direction of the liquid crystal display panel, the third domain and the fourth domain are aligned along a left and right direction of the back surface side liquid crystal display panel, in the liquid crystal display panel, the pixel electrodes and the common electrode generate vertical electric fields in the liquid crystal layer, and in the back surface side liquid crystal display panel, the pixel electrodes and the common electrode generate vertical electric fields in the back surface side liquid crystal layer.

2. The 3D display device according to claim 1, wherein the liquid crystal alignment axis of the first domain and the liquid crystal alignment axis of the second domain are parallel to the row direction.

3. The 3D display device according to claim 2, wherein in the liquid crystal display panel, each of the pixel electrodes is provided with a slit having a width of more than 0 μm and 4.5 μm or less in a boundary between the first domain and the second domain.

4. The 3D display device according to claim 1, wherein the liquid crystal alignment axis of the first domain and the liquid crystal alignment axis of the second domain are oblique to the row direction.

5. The 3D display device according to claim 4, wherein in the plan view of the first domain and the second domain, the start point of the alignment vector of the first domain and the start point of the alignment vector of the second domain oppose each other, and in the liquid crystal display panel, each of the pixel electrodes is provided with a slit having a width of 3 μm or more and 5 μm or less in a boundary between the first domain and the second domain.

6. The 3D display device according to claim 1, wherein in the liquid crystal display panel, the liquid crystal molecules have a pre-tilt angle of 81° or more and 89° or less.

7. The 3D display device according to claim 1, further comprising a light shielding portion in a boundary between the first domain and the second domain.

8. The 3D display device according to claim 1, wherein a distance between the liquid crystal display panel and the back surface side liquid crystal display panel is 5 cm or longer.

9. The 3D display device according to claim 1, further comprising a light source including light-emitting elements that irradiate the liquid crystal display panel with light and emit light rays of different colors, wherein the liquid crystal display panel displays an image based on a field-sequential color system.

10. The 3D display device according to claim 1, wherein in the liquid crystal display panel, the liquid crystal alignment axis of the first domain and the liquid crystal alignment axis of the second domain define an angle of 43° or greater and 47° or smaller.

11. The 3D display device according to claim 1, wherein in the back surface side liquid crystal display panel, the liquid crystal alignment axis of the third domain and the liquid crystal alignment axis of the fourth domain define an angle of 43° or greater and 47° or smaller.

12. The 3D display device according to claim 1, further comprising a scattering film between the liquid crystal display panel and the back surface side liquid crystal display panel.

13. A 3D display device comprising:

a liquid crystal display panel; and a back surface side liquid crystal display panel at the back of the liquid crystal display panel, wherein the liquid crystal display panel sequentially includes, from the back surface side toward a viewing surface side:

a first polarizing plate;

a first substrate including pixel electrodes arranged in a matrix pattern in a row direction and a column direction;

a first alignment film;

a liquid crystal layer containing liquid crystal molecules;

a second alignment film;

a second substrate including a common electrode; and a second polarizing plate, the liquid crystal display panel being a normally black liquid crystal display panel capable of shifting into a transparent display state where a background is seen through the liquid crystal display panel, the back surface side liquid crystal display panel sequentially includes, from the back surface side toward the viewing surface side:

a third polarizing plate;

a third substrate including pixel electrodes arranged in a matrix pattern in the row direction and the column direction;

a third alignment film;

a back surface side liquid crystal layer containing liquid crystal molecules;

a fourth alignment film;

a fourth substrate including a common electrode; and a fourth polarizing plate, the first alignment film and the second alignment film have been subjected to alignment treatment such that a first domain and a second domain in which alignment vectors are different from each other are arranged side by side in the column direction, where each of the alignment vectors is defined to point from a first substrate side long-axis end of each of the liquid crystal molecules as a start point to a second substrate side long-axis end of the liquid crystal molecule as an end point, in a plan view of the first domain and the second domain, a liquid crystal alignment axis of the first domain and a liquid crystal alignment axis of the second domain obliquely intersect a polarization axis of the first polarizing plate and a polarization axis of the second polarizing plate and are parallel to each other, in a plan view, the polarization axis of the first polarizing plate and a polarization axis of the fourth polarizing plate are parallel to each other, the third alignment film and the fourth alignment film have been subjected to alignment treatment such that alignment treatment directions are perpendicular to each other, in a plan view of the back surface side liquid crystal layer, an average liquid crystal alignment axis of the back surface side liquid crystal layer obliquely intersects a polarization axis of the third polarizing plate and the polarization axis of the fourth polarizing plate, the first domain and the second domain are aligned along a left and right direction of the liquid crystal display panel, and in the liquid crystal display panel, the pixel electrodes and the common electrode generate vertical electric fields in the liquid crystal layer.

14. The 3D display device according to claim 13,
wherein the liquid crystal alignment axis of the first domain and the liquid crystal alignment axis of the second domain are parallel to the row direction.

15. The 3D display device according to claim 14,
wherein in the liquid crystal display panel, each of the pixel electrodes is provided with a slit having a width of more than 0 µm and 4.5 µm or less in a boundary between the first domain and the second domain.

16. The 3D display device according to claim 13,
wherein the liquid crystal alignment axis of the first domain and the liquid crystal alignment axis of the second domain are oblique to the row direction.

17. The 3D display device according to claim 16, wherein
in the plan view of the first domain and the second domain, the start point of the alignment vector of the first domain and the start point of the alignment vector of the second domain oppose each other, and
in the liquid crystal display panel, each of the pixel electrodes is provided with a slit having a width of 3 µm or more and 5 µm or less in a boundary between the first domain and the second domain.

18. The 3D display device according to claim 13,
wherein in the liquid crystal display panel, the liquid crystal molecules have a pre-tilt angle of 81° or more and 89° or less.

19. The 3D display device according to claim 13, further comprising a light shielding portion in a boundary between the first domain and the second domain.

20. The 3D display device according to claim 13,
wherein a distance between the liquid crystal display panel and the back surface side liquid crystal display panel is 5 cm or longer.

21. The 3D display device according to claim 13, further comprising a light source including light-emitting elements that irradiate the liquid crystal display panel with light and emit light rays of different colors,
wherein the liquid crystal display panel displays an image based on a field-sequential color system.

22. The 3D display device according to claim 13,
wherein in the liquid crystal display panel, the liquid crystal alignment axis of the first domain and the liquid crystal alignment axis of the second domain define an angle of 43° or greater and 47° or smaller.

23. The 3D display device according to claim 13,
wherein in the back surface side liquid crystal display panel, the average liquid crystal alignment axis of the back surface side liquid crystal layer defines an angle of 43° or greater and 47° or smaller.

24. The 3D display device according to claim 13, further comprising a scattering film between the liquid crystal display panel and the back surface side liquid crystal display panel.

* * * * *